(12) United States Patent
Safir et al.

(10) Patent No.: US 11,814,563 B2
(45) Date of Patent: Nov. 14, 2023

(54) BIOREACHABLE CHIRAL DOPANTS FOR LIQUID CRYSTAL APPLICATIONS

(71) Applicants: Zymergen Inc., Emeryville, CA (US); Kent State University, Kent, OH (US)

(72) Inventors: Adam Safir, Berkeley, CA (US); Shilpa Naresh Raja, Emeryville, CA (US); Arjan Zoombelt, Emeryville, CA (US); Robert J. Twieg, Kent, OH (US); Pawan Nepal, Kent, OH (US); Ashani Wedige-Fernando, Kent, OH (US); Peter Palffy-Muhoray, Kent, OH (US)

(73) Assignees: Zymergen Inc., Emeryville, CA (US); Kent State University, Kent, OH (US)

( * ) Notice: Subject to any disclaimer, the term of this patent is extended or adjusted under 35 U.S.C. 154(b) by 0 days.

(21) Appl. No.: 17/299,777

(22) PCT Filed: Dec. 6, 2019

(86) PCT No.: PCT/US2019/065055
§ 371 (c)(1),
(2) Date: Jun. 3, 2021

(87) PCT Pub. No.: WO2020/159620
PCT Pub. Date: Aug. 6, 2020

(65) Prior Publication Data
US 2022/0025267 A1    Jan. 27, 2022

Related U.S. Application Data

(60) Provisional application No. 62/776,957, filed on Dec. 7, 2018.

(51) Int. Cl.
*C09K 19/58* (2006.01)
(52) U.S. Cl.
CPC ................................. *C09K 19/588* (2013.01)
(58) Field of Classification Search
CPC ...................................................... C09K 19/58
See application file for complete search history.

(56) References Cited

U.S. PATENT DOCUMENTS

| | | | |
|---|---|---|---|
| 6,280,653 B1 | 8/2001 | Jones et al. | |
| 8,969,395 B2 * | 3/2015 | Ribeiro Salvador | C07D 233/60 514/397 |
| 2018/0371274 A1 * | 12/2018 | Tan | C09D 11/033 |
| 2023/0203378 A1 | 6/2023 | Raja et al. | |

FOREIGN PATENT DOCUMENTS

| | | | | |
|---|---|---|---|---|
| EP | 2623927 A1 * | 8/2013 | ........... | C09K 19/586 |
| FR | 2633515 A * | 1/1990 | ........... | A61K 8/0295 |
| GB | 1403330 A * | 8/1975 | ........... | C07D 339/06 |
| JP | 2001288222 A * | 10/2001 | | |
| JP | 2018146978 A * | 9/2018 | | |
| WO | WO-2021248036 A1 * | 12/2021 | | |

OTHER PUBLICATIONS

Olga Yu et al. Oxidation of betulin and its acetates with dimethyldioxirane, Mendeleev Communications, vol. 14, Issue 5, 2004, pp. 221-223,https://doi.org/10.1070/MC2004v014n05ABEH001873. (Year: 2004).*
Semenenko,A.N.et al., "Synthesis, molecular and crystal structure of spirocyclopropyl derivatives of lupane series and their ability to induce cholesteric mesophase in nematic solvents, Journal of Molecular Structure," Journal of Molecular Structure,2018, vol. 1171, pp. 605-613) (Year: 2018).*
Production and Synthetic Modifications of Shikimic Acid; Nuno R. Candeias, Benedicta Assoah, and Svilen P. Simeonov; Chemical Reviews 2018 118 (20), 10458-10550; DOI: 10.1021/acs.chemrev.8b00350 (Year: 2018).*
Raffaella Gaggeri et al. Quick development of an analytical enantioselective high performance liquid chromatography separation and preparative scale-up for the flavonoid Naringenin, Journal of Chromatography A, vol. 1218, Issue 32, 2011,pp. 5414-5422,ISSN 0021-9673. (Year: 2011).*
Machine English Translation of JP2018146978 (Year: 2023).*
Machine English Translation of JP2001288222 (Year: 2023).*
Machine English Translation of FR2633515 (Year: 2023).*
Babak, N.L.et al., "Synthesis and Spatial Structure of New Chiral Dopants Fom Allobetuline Series for Cholestric Liquid-Crystal Composition," Struct. Chem., 2016 vol. 27, pp. 295-303.
International Preliminary Report on Patentability dated Jun. 8, 2021 in PCT/US2019/065055.
International Search Report and Written Opinion dated Sep. 24, 2020 from PCT/US2019/065055.
Matsuoka, Y.,et al., "AA-Isomerism of Mixed 1,3-Diketonate Complexes of Ru(III)-A Designed New Source of Chirality in Nematic Liquid Crystals," Chem. Mater., 2005, vol. 17, pp. 4910-4917.
Popov, p et al., "Chiral Nematic Liquid Crystal Microlenses," Scientific Reports, 2017 vol. 7, p. 1-9.
International Preliminary Report on Patentability dated Dec. 15, 2022, in PCT Application No. PCT/US2021/035956.
International Search Report and Written Opinion dated Sep. 16, 2021 in PCT Application No. PCT/US2021/035956.

(Continued)

*Primary Examiner* — Chanceity N Robinson
(74) *Attorney, Agent, or Firm* — Elaine Ramesh; Emily M. Haliday; Weaver Austin Villeneuve & Sampson LLP

(57) ABSTRACT

The disclosure discusses chiral dopants for liquid-crystalline materials. Chiral dopants can be bioreachable compounds, i.e. compounds produced from microbes through fermentation. Chiral dopants can also include bioreachable materials that are further modified by chemical synthetic steps. Chiral dopants as discussed herein can include biomolecules such as glycyrrhetinic acid (1), S-naringenin (2), shikimic acid (3), alpha-phellandrene (4), betulin (5), malic acid (6), valencene (7), or nootkatone (8), and any stereoisomers or chemically modified derivatives thereof. The disclosure further shows optical properties of such compounds in a liquid-crystalline material.

6 Claims, 3 Drawing Sheets

(56) References Cited

OTHER PUBLICATIONS

Mulder, D.J. et al., "Chiral-nematic Liquid Crystals as One Dimensional Photonic Materials in Optical Sensors", Journal of Materials Chemistry C, 2014, vol. 2, pp. 6695-6705.
U.S. Appl. No. 17/928,265, inventors Raja et al., filed Nov. 28, 2022.

* cited by examiner

BIOREACHABLE CHIRAL DOPANTS FOR LIQUID CRYSTAL APPLICATIONS

CROSS-REFERENCE TO RELATED APPLICATIONS

This application is a national stage application, filed under 35 U.S.C. § 371, of International Patent Application No. PCT/US2019/065055, filed on Dec. 6, 2019, which claims priority to and benefit of U.S. provisional application No. 62/776,957, filed on Dec. 7, 2018, each of which is hereby incorporated by reference in its entirety.

STATEMENT AS TO RIGHTS TO INVENTIONS MADE UNDER FEDERALLY SPONSORED RESEARCH AND DEVELOPMENT

This invention was made with Government support under Agreement No. HR0011-15-9-0014, awarded by DARPA. The Government has certain rights in the invention.

FIELD OF THE DISCLOSURE

The present invention relates generally to the area of optically active dopants, more specifically chiral dopants, with origin from biological resources.

BACKGROUND

Electromagnetic (EM) radiation is ubiquitous including X-rays through UV, visible, infrared, radio frequency, and low frequency waves. Shielding personnel and devices from unwanted radiation is an essential task. At optical frequencies, optical filters are used for this purpose. Optical filters are of two types: (i) absorptive filters, which absorb the unwanted radiation, and (ii) interference filters, which reflect rather than absorb. Interference filters are preferable in many applications, since absorbing the radiation can lead to damage and failure. Interference filters are typically layered structures, reflecting light from each interface in such a way that the propagating waves interfere destructively and cancel, while the reflected waves interfere constructively, and essentially all incident light is reflected, without damage to the filter.

Interference filters are expensive primarily due to the sophisticated processing required to construct precisely layered structures. Cholesteric liquid crystals are chiral liquids which self-assemble into such periodic structures. Furthermore, the layer spacing, and the optical properties of the self-assembled structure may be controlled by external fields. Cholesterics are therefore ideally suited for optical filter applications. They are used in displays, cosmetics, paints, coatings, chemical sensors, laser cavities and other photonic devices.

Due to their great inherent potential, the development of cholesteric filters for eye and other sensor protection is currently under way. However, material improvements are necessary before effective practical devices can be realized. Filters can be static, with fixed optical properties, or agile, where the filter may be switched on or off, or where the filter may be tuned to different wavelengths. Static filters require very high contrast, very low insertion loss, and relative insensitivity to changes in temperature. Agile filters require, in addition, switchability and/or tunability. These properties are already in place in cholesterics, but they need to be brought to a higher level of performance, e.g., response speed, rejection efficiency. These performance levels can be achieved by the effective design and production of improved materials.

Chiral nematic, also known as cholesteric, liquid crystalline materials are useful in a variety of applications including various liquid crystal (e.g.: LC) displays, electronic writers or tablets, electronic skins, reflective films, optical filters, polarizers, paints, and inks, among others. Methods for preparing such materials are well established. See for example: G. Gottarelli and G. Spada, *Mol. Cyst. Liq. Cryst.*, 123, 377 (1985); G. Spada and G. Proni, *Enantiomer*, 3, 301 (1998); E. Montbach, et al, *Proceedings of SPIE*, 7232, 723203, (2009). However, improvement is still needed. While early uses of chiral nematic compositions relied upon mixtures composed mostly of chiral components, more recently such materials are composed of nematic liquid crystal (LC) mixtures combined with small amounts of chiral dopants. In such new compositions, the properties of the nematic host material, for example: viscosity, birefringence, electrical anisotropy, and magnetic anisotropy among others, are tailored to the desired usage by altering the chemical composition of the nematic mixture and then a chiral dopant is incorporated to induce helical twisting so as to provide the desired chiral nematic pitch. It is apparent that the properties of this chiral nematic composition are therefore a combination of the properties of the nematic host plus those of the dopant.

Chiral nematic liquid crystals can be formulated to reflect various wavelengths of incident electromagnetic radiation, and it is well understood that the reflected light is circularly polarized, depending upon the sense of chirality of the helical pitch of the liquid crystal. Thus, a chiral nematic displaying a right-handed helical structure will reflect right-handed incident light. For many applications, it is useful to be able to reflect both right-handed and left-handed sense of circularly polarized light, for example, in a vertically layered structure. It is further well known that enantiomers of a chiral dopant structure induce the opposite polarity of helical rotation and, therefore, afford oppositely polarized light reflections. For this reason, the preparation of enantiomeric pairs of dopants for use in separate light modulating layers can be particularly useful.

For some applications, it is desirable to have liquid crystal mixtures that exhibit a strong helical twist and thus a short pitch length. A shorter pitch can be achieved by using higher amounts of dopant or by using a dopant with a higher helical twisting power. However, using chiral dopants in high amounts can negatively affect the properties of the liquid crystalline host mixture, for example; the dielectric anisotropy, the viscosity, and the driving voltage or the switching times among others. In liquid crystalline mixtures that are used in selectively reflecting cholesteric displays, the pitch has to be selected such that the maximum of the wavelength reflected by the cholesteric helix is in the range of visible light. Another possible application is polymer films with a chiral liquid crystalline phase for optical elements, such as cholesteric broadband polarizers or chiral liquid crystalline retardation films Such liquid crystalline materials can be used for the preparation of polymer films with a chiral liquid crystalline phase, for active and passive optical elements or color filters and for liquid crystal displays, for example STN, TN, AMD-TN, temperature compensation, guest-host or phase change displays, or polymer free or polymer stabilized cholesteric texture (PFCT, PSCT) displays. Such liquid crystal displays can include a chiral dopant in a liquid crystalline medium and a polymer film with a chiral liquid crystalline phase obtainable by (co)polymerizing a liquid crystalline material containing a chiral dopant and a polymerizable mesogenic compound.

Biological molecules are suitable as chiral dopant as they are naturally available with high optical purity. However, these compounds are not readily available and engineering a microbe to overexpress a chiral molecule from a set of tens of thousands of possible candidates requires a good understanding of the anticipated properties.

This disclosure introduces new inventive chiral dopants from bioreachable sources which provide these properties, can be prepared easily, have uniformly high helical twisting power, and do not have the disadvantages of the dopants of the state of the art as discussed above.

BRIEF DESCRIPTION OF THE DRAWINGS

The present disclosure may be better understood, and its numerous features and advantages made apparent to those skilled in the art by referencing the accompanying drawings.

SUMMARY OF THE DISCLOSURE

Figure 1A:
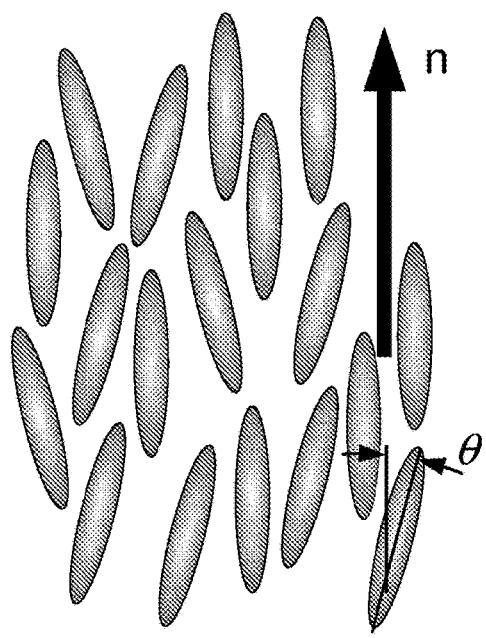
FIG. 1A illustrates liquid crystal molecules as ellipsoids, ordered more or less parallel in one direction in a nematic liquid.

In a first aspect, a chiral dopant can be selected from the group of following structures:

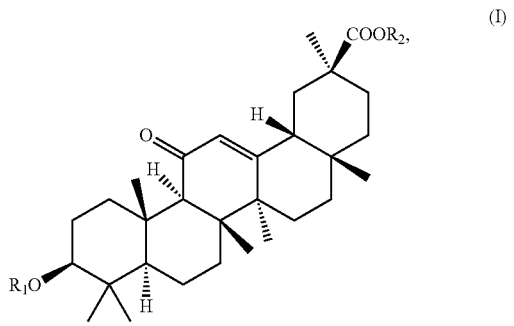

(I)

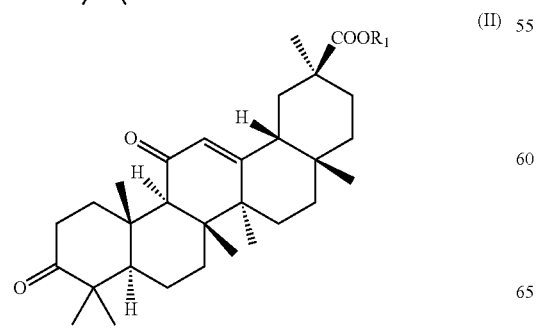

(II)

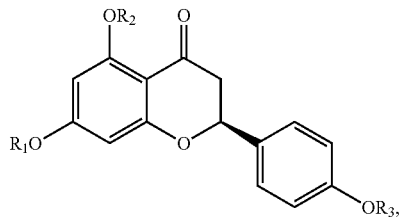

(III)

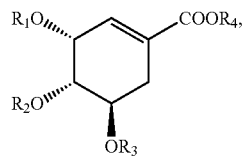

(IV)

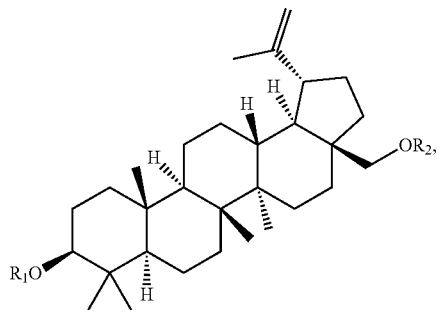

(V)

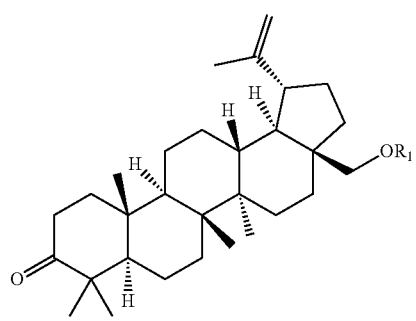

(VI)

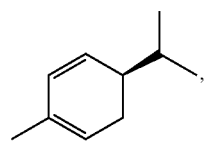

(VII)

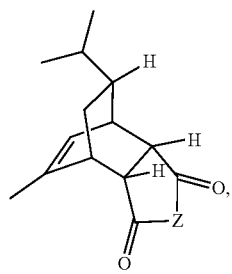

(VIII)

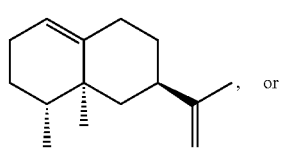

(IX)

, or

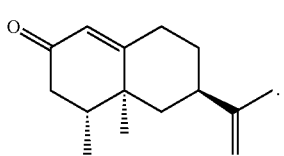

In the foregoing structures, (I) through (X), where applicable, $R_1$, $R_2$, $R_3$, and $R_4$ can be selected independently for each occasion from the group consisting of hydrogen, an aliphatic moiety, an aryl moiety, an arylalkylene moiety, an alkyl arylene moiety, an alkanoyl moiety, an arylalkanoyl moiety, and any halogenated derivative of the foregoing moieties.

Group Z can be selected from $C(H)R_5$, —$CR_5$—$CR_5$—, O, S, or $NR_5$, wherein $R_5$ is selected independently for each occasion from the group consisting of hydrogen, an aliphatic moiety, an aryl moiety, an arylalkylene moiety, an alkyl arylene moiety, an alkanoyl moiety, an arylalkanoyl moiety, and any halogenated derivative of the foregoing moieties.

In a second aspect, a liquid-crystalline material can include at least one chiral dopant as shown in structures (I) through (X).

In a third aspect, a liquid crystal display, optical element, or color filter can include a chiral dopant as shown in structures (I) through (X).

In a fourth aspect, a display can include a layer of liquid-crystalline material with a chiral dopant as shown in structures (I) through (X). The liquid-crystalline material can have a cholesteric pitch (P) and a thickness (d). In one embodiment, a ratio of d/P is at least 0.01, at least 0.02, at least 0.05, at least 0.1, or at least 0.15. In one embodiment, the liquid-crystalline material can include two, three, four, five, or more chiral dopants.

DETAILED DESCRIPTION

In a first aspect, a chiral dopant can be selected from the group of following structures:

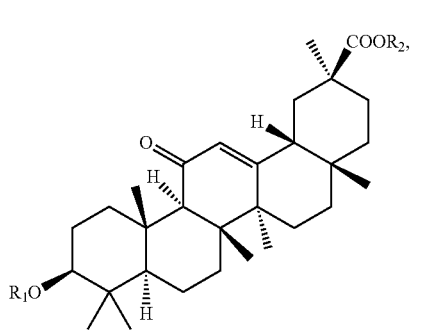

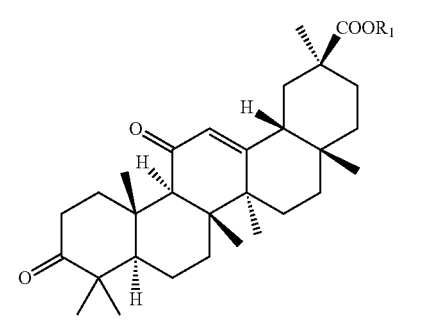

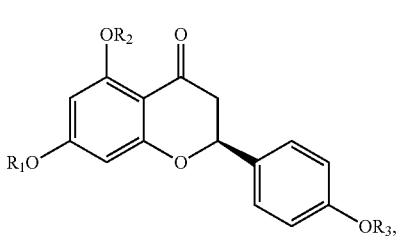

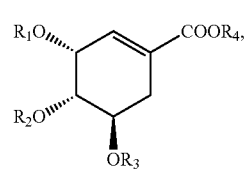

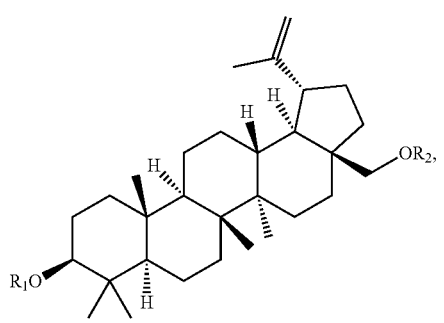

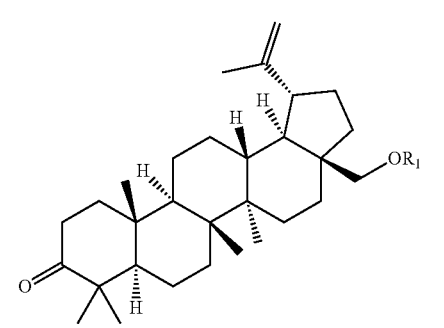

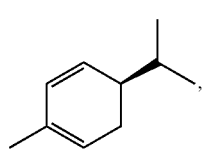

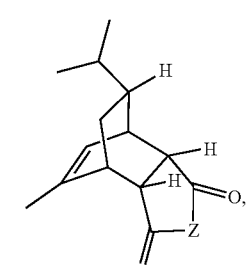

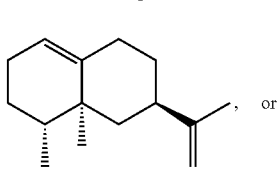

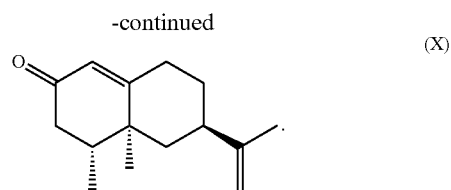

(X)

In the foregoing structures, (I) through (X), $R_1$, $R_2$, $R_3$, and $R_4$ can be selected independently for each occasion from the group consisting of hydrogen, an aliphatic moiety, an aryl moiety, an arylalkylene moiety, an alkyl arylene moiety, an alkanoyl moiety, an arylalkanoyl moiety, and any halogenated derivative of the foregoing moieties.

Group Z can be selected from $C(H)R_5$, $-CR_5=CR_5-$, O, S, or $NR_5$, wherein $R_5$ is selected independently for each occasion from the group consisting of hydrogen, an aliphatic moiety, an aryl moiety, an arylalkylene moiety, an alkyl arylene moiety, an alkanoyl moiety, an arylalkanoyl moiety, and any halogenated derivative of the foregoing moieties.

In one embodiment, the chiral dopant can be selected from structures (I), (II), (III), (IV), (V), (VI), (VII) or (VIII).

In another embodiment, the chiral dopant includes structures (I) through (X), wherein $R_1$, $R_2$, $R_3$, $R_4$, and $R_5$ is selected independently for each occasion from hydrogen, a methyl, an ethyl, a propyl, a butyl, a pentyl, a hexyl, a heptyl, an octyl, a nonyl, a decyl, a phenyl, a benzyl, a p-tolyl, a p-halophenyl, a p-biphenyl, a p-(4-halophenyl)phenylene, a p-(4-cyanophenyl)phenylene, an o-biphenyl, a 3,5-dimethoxyphenyl, an acetyl, a propionyl, a butanoyl, a pentanoyl, a hexanoyl, a heptanoyl, an octanoyl, a nonanoyl, a decanoyl, an undecanoyl, a dodecanoyl, a 1-naphthyl, a 2-naphthyl.

In a second aspect, a liquid-crystalline material can include at least one chiral dopant as shown in structures (I) through (X).

In one embodiment, the liquid liquid-crystalline material includes at least one chiral dopant present in an amount of at least 0.001 wt %, such as at least 0.002 wt %, at least 0.005 wt %, at least 0.01 wt %, at least 0.02 wt %, at least 0.05 wt %, at least 0.1 wt %, at least 0.2 wt %, at least 0.5 wt %, at least 1 wt %, at least 1.2 wt %, at least 1.5 wt %, at least 2 wt %, at least 2.5 wt %, at least 3 wt %, at least 3.5 wt %, at least 4 wt %, at least 4.5 wt %, at least 5 wt %, at least 6 wt %, at least 7 wt %, at least 8 wt %, at least 9 wt %, or at least 10 wt %, based on the weight of the liquid-crystalline material.

In another embodiment, the liquid-crystalline material includes at least one chiral dopant present in an amount of not greater than 20 wt %, such as not greater than 18 wt %, not greater than 16 wt %, not greater than 14 wt %, not greater than 12 wt %, not greater than 10 wt %, or not greater than 8 wt % based on the weight of the liquid-crystalline material. Further, in one embodiment, the chiral dopant can be present in an amount ranging from 0.0015 wt % to 17 wt %, such as from 0.01 wt % to 15 wt %, from 0.05 wt % to 13 wt %, or from 0.1 wt % to 11 wt % based on the weight of the liquid-crystalline material.

In yet one further embodiment, the liquid-crystalline material can further comprise at least one polymerizable mesogenic compound having at least one polymerizable functional group.

In one embodiment, the polymerizable functional group includes an epoxy group, a vinyl group, an allyl group, an acrylate, a methacrylate, an isoprene group, an alpha-amino carboxylate, or any combination thereof.

In yet one further embodiment, the liquid-crystalline material can include a nematic or a nematogenic substance. In one embodiment, the nematic or the nematogenic substance is selected from azoxybenzenes, benzylideneanilines, biphenyls, terphenyls, phenyl benzoates, cyclohexyl benzoates, phenyl esters of cyclohehexanecarboxylic acid, cyclohexyl esters of cyclohehexanecarboxylic acid, phenyl esters of cyclohexylbenzoic acid, cyclohexyl esters of cyclohexylbenzoic acid, phenyl esters of cyclohexylcyclohexanecarboxylic acid, cyclohexyl esters of cyclohexylcyclohexanecarboxylic acid, cyclohexylphenyl esters of benzoic acid, cyclohexylphenyl esters of cyclohexanecarboxylic acid cyclohexylphenyl esters of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenylpyrimidines, cyclohexylpyrimidines, phenylpyridines, cyclohexylpyridines, phenylpyridazines, cyclohexylpyridazines, phenyldioxanes, cyclohexyldioxanes, phenyl-1,3-dithianes, cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl) ethanes, 1-cyclohexyl-2-biphenylethanes, 1-phenyl2-cyclohexylphenylethanes, halogenated stilbenes, benzyl phenyl ether, tolanes, substituted cinnamic acids, or any combination thereof.

In a third aspect, a liquid crystal display, optical element, or color filter can include a chiral dopant as shown in structures (I) through (X).

In a fourth aspect, a display can include a layer of liquid-crystalline material with a chiral dopant as shown in structures (I) through (X). The liquid-crystalline material can have a cholesteric pitch (P) and a thickness (d). In one embodiment, a ratio of d/P is at least 0.01, at least 0.02, at least 0.05, at least 0.1, or at least 0.15.

In one embodiment, the display layer of liquid-crystalline material includes the ratio of d/P is not greater than 1, not greater than 0.8, not greater than 0.6, not greater than 0.4, not greater than 0.3, or not greater than 0.25. In one embodiment, the ratio of d/P can range from 0.01 to 0.9, such as from 0.02 to 0.7, from 0.03 to 0.5, or from 0.04 to 0.4.

In order to make an "agile optical filter device" a cholesteric (twisted nematic) media is required. This media must possess a variety of physical properties including a broad temperature cholesteric range (usually including ambient temperature) and a twist with minimal temperature dependence. The required cholesteric media can be created in a variety of ways. In this case, the medium is comprised of a molecule which is both mesogenic and intrinsically chiral. The individual molecules comprising the media contain one (pure enantiomer) or more (pure diastereomer) sites. It is also possible to mix different chiral nematic mesogens to create a medium with improved properties (attention must be paid to the relationship between the chiral centers and the resulting twist sense for each component). If an enantiomer of a molecule is mixed with its mirror image the twist will be reduced (a racemic mixture contains equal amounts of the two enantiomers and will behave as an achiral nematic). In this case the medium is comprised of a molecule that is mesogenic (nematic) but the molecule is not intrinsically chiral. Here again, it is possible to mix different achiral nematic mesogens to create a medium with improved properties (but it will never be cholesteric). An achiral nematic host can be converted into a cholesteric media by the addition of a twist agent. Alternatively, a cholesteric liquid crystal can serve as a twist agent when mixed into an achiral nematic mesogen.

Chiral Twisting Agents (Dopants)

A twist agent is a chiral molecule (often a pure enantiomer or diastereomer). The twist agent is added to the achiral nematic and the twist increases in proportion to the concentration. In many cases, the proportion of twist agent that can be added is limited by solubility or loss or cholesteric temperature range of the mixture.

The twisted cholesteric structure formed by the twisting agent is a self-assembled layered structure, which acts as an interference filter. Light can be regarded as being composed of right and left-handed circularly polarized modes, where the electric field of light rotates in space clockwise and counterclockwise. The cholesteric structure gives rise to destructive interference of forward-propagating light and constructive interference of backward propagating light of one handedness; resulting in essentially total reflection of one mode; the cholesteric behaves like a perfect mirror in a selected range of wavelengths—the photonic bandgap. Location and the width of the bandgap are determined by the refractive indices of the nematic, and the pitch of the cholesteric structure. The contrast is determined by the film thickness. Since the liquid crystal structure can be modified by applied fields, the filter can be switched on and off, and its location and bandwidth can be tuned. A polymer network may be used to stabilize the material, to reduce scattering and increase speed. The accessibility of enantiomerically pure chiral compounds through biology makes biomolecules excellent candidates as twist agents for application in cholesteric liquid crystal technology. Chemical modification of the bioreachables, such as shown below, will be necessary in order to achieve new molecules with anticipated utility in liquid crystal technology. Derivatization is often required to modify polar functional groups in the original biotarget materials to make them more physically compatible (miscible) with the host nematic materials (enhancing their interaction with the nematic components instead of themselves). Derivatization also provides for some chemical stability enhancement. Derivatization will also be particularly important in the case of large molecules (such as glycyrrhetinic acid) in order to lower the melting point and thus enhance solubility of the additive in the host nematic. The work reported herein describes the development of synthetic pathways towards successful derivatization of said bioreachables.

Scheme 1

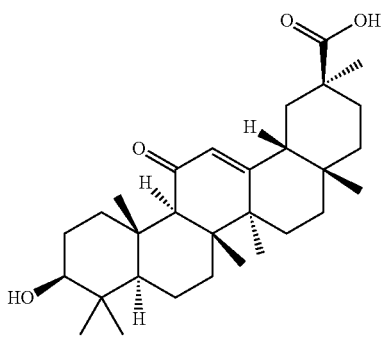

1

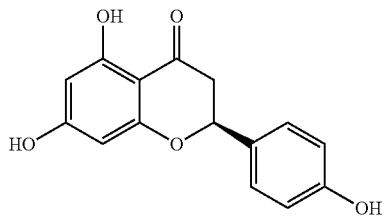

2

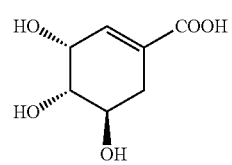

3

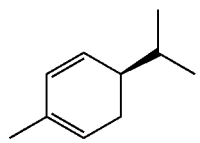

4

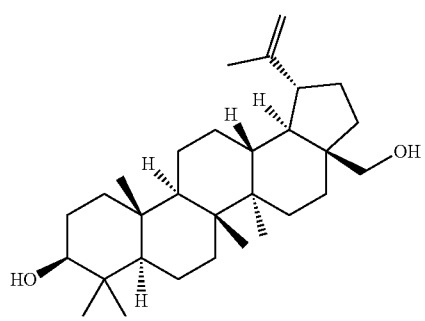

5

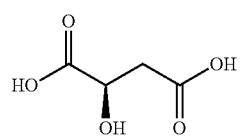

6

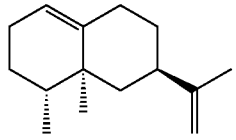

7

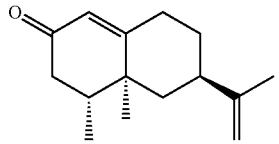

8

As depicted in Scheme 1, dopants can include biomolecules such as glycyrrhetinic acid (1), S-narigenin (2), shikimic acid (3), alpha-phellandrene (4), betulin (5), malic acid (6), valencene (7), or nootkatone (8). Also included are stereoisomers of biomolecules. For example, 3β,18β glycyrrhetinic acid (1') or R-narigenin (2') are also biomolecules within the scope of the herein described invention. The following structures display the general numbering of glycyrrhetinic esters and compound 1'

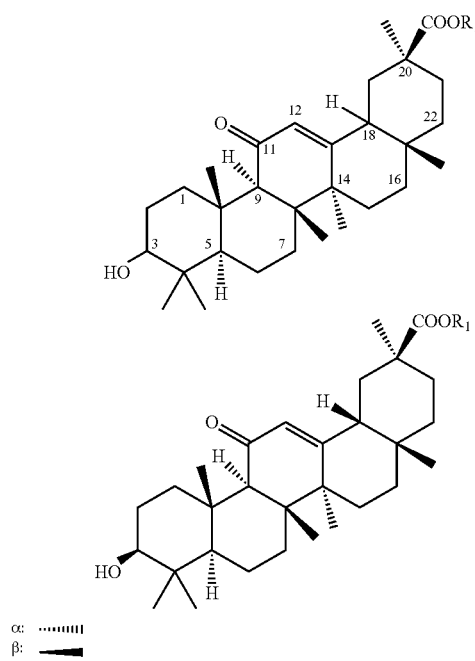

α: ⋯⋯⋯
β: ▬

Moreover, further biological or chemical modification of biomolecules are contemplated herein. Chemical modification can result in ethers or esters, comprising small or large moieties of saturated aliphatic, unsaturated aliphatic, saturated alicyclic, unsaturated alicyclic, aromatic, or a combination thereof. Likewise, hydroxyl groups or keto groups can be converted into amines or imines by ways of substitution reactions or conjugation reactions followed by reduction. Acids can be converted into amides.

Further modifications include oxidation or reduction reactions. For example, a primary alcohol can be converted into an aldehyde or carboxylic acid group, or a secondary alcohol can be converted into a keto group. As for reduction, a carboxy group can be converted into a C—OH group or ether group, a carbon-carbon double bond can be reduced to a single bond.

Moreover, other chemical modifications include reaction based on the nature of pi bonds present in the biomolecules. For example, alpha-phellandrene (as opposed to its beta constitutional isomer) is a diene that can be subjected to Diels-Alder reactions with appropriate dienophiles such as maleic acid anhydride, thereby enhancing the biomolecule with moieties that can be further modified.

In yet another aspect, a biomolecule can be a starting molecule for a larger dopant, for example malic acid is a diacid with one stereo center. This diacid can be cyclized with amines, forming an imide which can comprise groups suitable for liquid crystal dopant function.

Liquid Crystal Physical Parameters

Figure 1B:
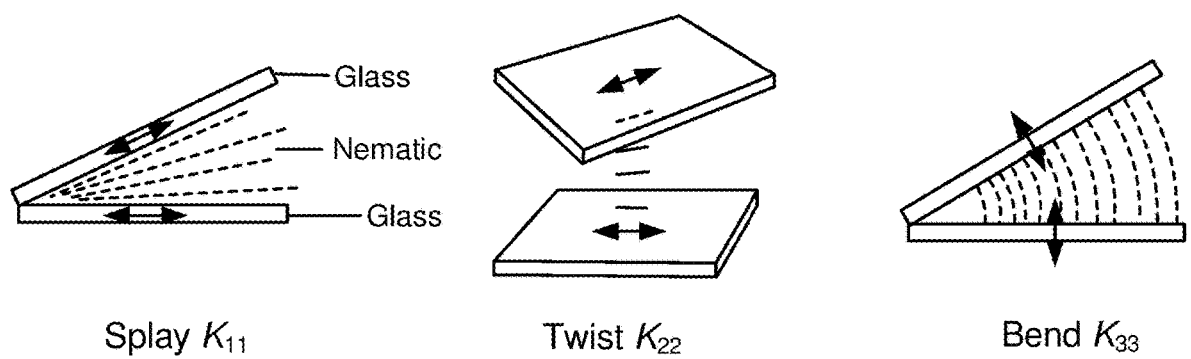
FIG. 1B illustrates the three independent modes of distortion in nematic liquid crystals each with its own unique elastic constant.

The simplest form of liquid crystal is the nematic phase. Organic molecules of rod-like shape are oriented on average along one direction, called the director n (see FIG. 1A). In the most stable state, n is the same everywhere in the volume. By applying a voltage, for example, the uniform distribution of n can be very easily distorted, but there is a minute elastic resistance. The distortion of n can always be split into three independent modes referred to as "Splay," "Twist," and "Bend" as illustrated in FIG. 1B. These modes have their own elastic constants: $K_{11}$, $K_{22}$ and $K_{33}$, respectively. To understand and design the electro-optic responses of liquid crystals, knowledge of these elastic constants is fundamental.

Most of the physical properties of a liquid crystal depend on the direction relative to the average orientation of the molecules. The dielectric constant for an electric field parallel to the average orientation is $\varepsilon_1$, and the dielectric constant for an electric field perpendicular to the average orientation is $\varepsilon_2$. Some liquid crystals have $\varepsilon_1 > \varepsilon_2$, and others have $\varepsilon_1 < \varepsilon_2$. The former property, $\varepsilon_1$, is called the positive dielectric anisotropy, and the latter, $\varepsilon_2$, is called negative dielectric anisotropy. Under electric fields, the larger the difference between $\varepsilon_1$ and $\varepsilon_2$, the more easily the orientation of the liquid crystal can be controlled by electric field. Liquid crystals with the positive dielectric anisotropy get oriented parallel to the electric field, while the negative ones are perpendicularly oriented. Since the magnitude of the dielectric constants determine the responsiveness and the mode of response, their control is one of the most important targets of materials design for liquid crystals.

Selective Reflection of Light from Cholesteric Liquid Crystals

Figure 2A:
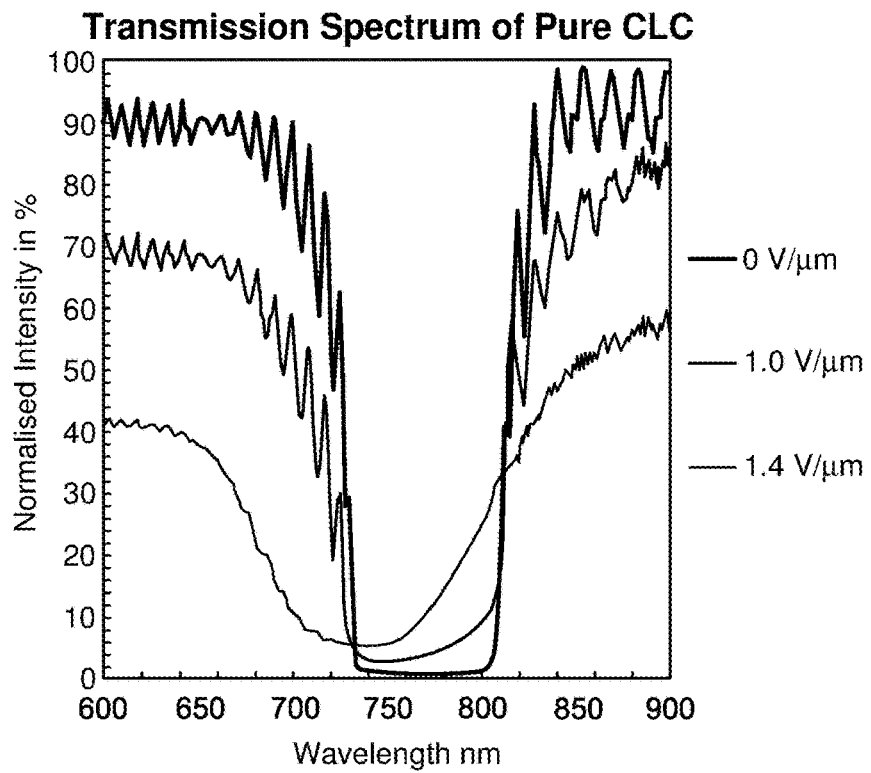
FIG. 2A illustrates selective reflection spectra from a planar cholesteric liquid crystal structure, showing a progressively deteriorated efficiency and sharpness of the band edge with the increase of applied electric field.

Cholesteric liquid crystals or chiral nematic liquid crystals possess a one-dimensional periodic structure based on the natural helical twisting power of these materials (see FIG. 1). The natural twist is associated with the molecular chirality of the liquid crystal molecules and/or of the doping agents. When the pitch of the helical twist falls in the range of the wavelength of visible light, the periodic structure gives rise to a Bragg reflection of light. Unlike a simple Bragg reflection from a multilayer interference filter, the reflection from cholesteric liquid crystals is more complicated because of the continuously twisted structure of optically anisotropic media. One consequence of this fact is the selective reflection of circularly polarized light, and the other is the appearance of a well-defined selective reflection band with a sharp band edge (see FIG. 2A). The sharpness of the reflection band depends on the magnitude of birefringence of the liquid crystal, and the uniformity of twist pitch. Also, structural anomalies could make the band edge less sharp.

Since the periodic twist structure is not perfect for the inherent softness of liquid crystals, there are many mechanisms to impact the efficiency of reflection. The insertion loss is the reduction of light energy before and after the reflection. Static defects can scatter light; thermal fluctuations of the molecular orientation are responsible for optical turbidity to waste the light energy during propagation. Smaller elastic constants lead to larger thermal fluctuations of the structure, thus resulting in a larger insertion loss. Since softness is beneficial for higher sensitivity, there always is a tradeoff between sensitivity, response speed and optical performance.

In one embodiment of the invention the liquid crystalline material is consisting of 2 to 25 components, such as 3 to 15 compounds, or 4 to 10 compounds, of which at least one is a chiral dopant originating from the herein discussed bioreachables. The other compounds can be low molecular weight liquid crystalline compounds selected from nematic or nematogenic substances. For example, the other compounds can be selected from the known classes of the azoxybenzenes, benzylideneanilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, cyclohexylphenyl esters of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenyl-cyclohexyl) ethanes, 1-cyclohexyl-2-biphenylethanes, 1-phenyl2-cyclohexylphenylethanes, optionally halogenated stilbenes, benzyl phenyl ether, tolanes, substituted cinnamic acids and further classes of nematic or nematogenic substances. The 1,4-phenylene groups in these compounds may also be fluorinated.

LC Property Determination Pitch and Helical Twisting Dower

Figure 2B:
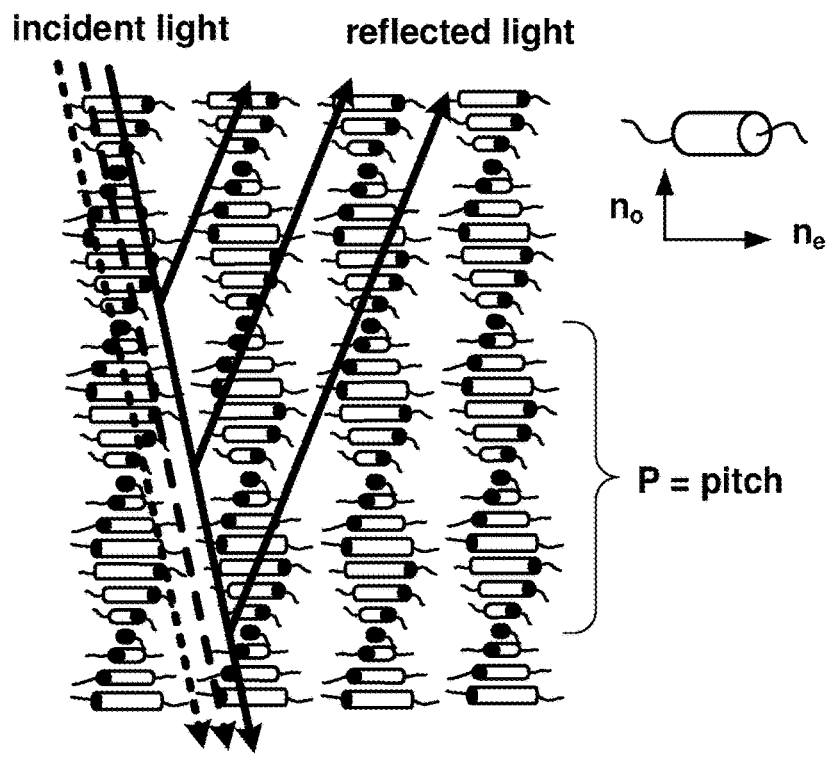
FIG. 2B is a schematic illustration of the planar structure of a cholesteric liquid crystal, showing a Bragg-type reflection for one color only.

The helical cholesteric structure shown in FIG. 2B is periodic in one dimension. It is characterized by its pitch P, which is the distance along the helix axis where the direction of average molecular orientation has rotated by an angle of 360°. The chiral dopant induces the helical structure; the pitch is inversely proportional to the concentration c of the chiral dopant. That is, $$HTP = \frac{1}{cP}$$

where c is the concentration expressed as weight fraction, and P is the cholesteric pitch.

EXPERIMENTALS

Glycyrrhetinic Acid Hexyl Ester (1a)

In a 100 ml recovery flask was placed 3β-18α Glycyrrhetinic acid ("18αβG") (0.470 g, 1.0 mmol), 1-iodohexane (0.232 g, 1.1 mmol) and anhydrous dimethylformamide (5 ml). The mixture was stirred until homogenous and then potassium carbonate (0.276 g, 2.0 mmol) was added. The mixture was stirred at room temperature overnight (although thin layer chromatography indicated the starting material was consumed within two hours). Ice water was added dropwise with stirring (20 ml) followed by 10% hydrochloric acid (5 ml) and then ice water were added to fill the flask. The solid was isolated by suction filtration, washed well with water and air dried. The compound was then absorbed on 15 cc of silica gel with 50 ml of ethyl acetate, the solvent was removed by rotary evaporation and the absorbed material was then placed on the top of a short silica gel column to elute (solvent: hexane/ethyl acetate 1:1). Concentration of the fractions containing pure product provided a white solid, which was recrystallized from isooctane (yield=0.348 g, 63%). Melting Point=98.2° C. 1H-NMR (CDCl$_3$, 400 MHz): δ=0.78 (s, 6H, H-24, 28), 0.86 (t, 3H, CH3CH2-), 1.00 (s, 3H, H-26), 1.13 (s, 3H, H-23), 1.14 (s, 3H, H-25), 1.15 (s, 3H, H-29), 1.27 (s, 3H, H-27), 2.34 (s, 1H, H-9), 2.79 (ddd, 1H, H-9), 3.22 (dd, H-3), 4.10 (m, 2H, —CH2O—), 5.65 (s, 1H, H-12). 13C-NMR (CDCl$_3$, 100 MHz): δ=14.1 (C-6'), 15.6 (C-24), 16.4 (C-23), 17.5 (C-6), 18.6 (C-26), 22.5 (C-5'), 23.4 (C-27), 25.6 (C-3'), 26.4 (2C-16,15), 27.3 (C-2), 28.1 (C-25), 28.4 (C-28), 28.5 (C-29), 28.7 (C-2'), 31.1 (C-21), 31.3 (C-4'), 31.8 (C-17), 32.7 (C-7), 37.0 (C-10), 37.7 (C-22), 39.1 (2C-1, 4), 41.0 (C-19), 43.2 (C-8), 44.0 (C-20), 45.4 (C-14), 48.3 (C-18), 54.9 (C-5), 61.8 (C-9), 64.5 (C-1'), 78.7 (C-3), 128.5 (C-12), 169.3 (C13), 176.5 (C-30), 200.2 (C-11).

Glycyrrhetinic Acid Methyl Ester (1b)

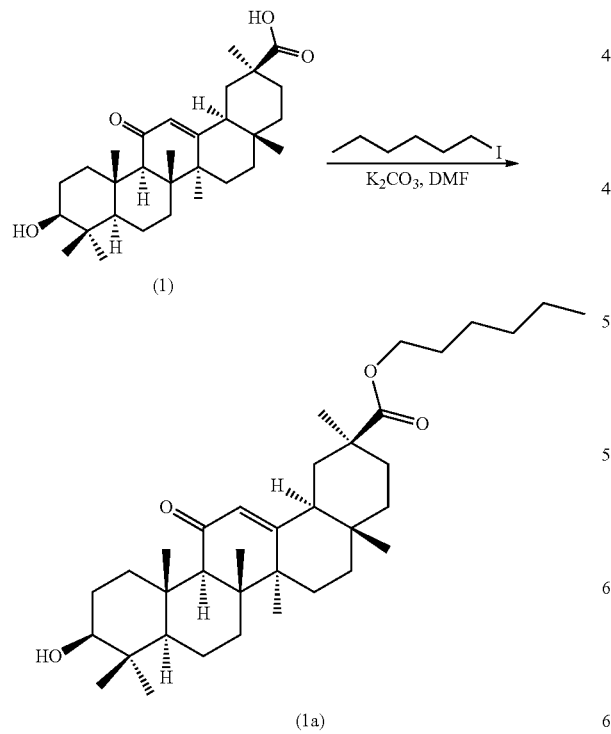

(1a)

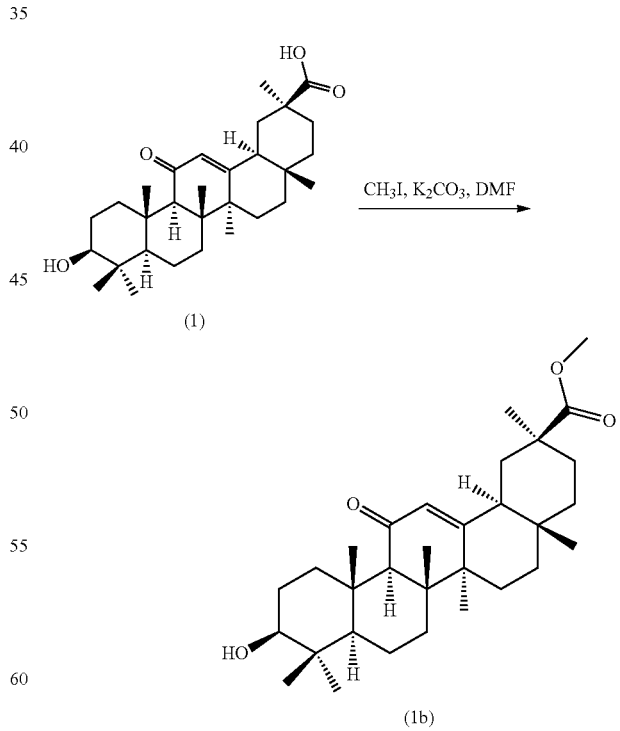

(1b)

In 100 ml recovery flask was placed 18αβG (0.470 g, 1.0 mmol), methyl iodide (1.470 g, 10.0 mmol) and anhydrous dimethylformamide (5 ml). The mixture was stirred until homogenous and then potassium carbonate (0.276 g, 2.0 mmol) was added. The mixture was stirred at room temperature for two hours. Ice water was added dropwise with stirring (20 ml) followed by 10% hydrochloric acid (5 ml) and then Ice water was added to fill the flask. The solid was isolated by suction filtration, washed with water and air-dried. Next, 50 ml of ethyl acetate was added, and the product was absorbed on 15 cc of silica gel. Absorbed material was placed on the top of a silica gel column made with hexane/ethyl acetate=3:1. The eluent hexane/ethyl acetate 3:1 was used initially and the polarity gradually increased up to hexane/ethyl acetate 1:1. Concentration of fractions containing the product provided a solid that was recrystallized from isooctane/1-propanol (yield=0.468 g, 97%). Melting Point=242-245° C. 1H-NMR (CDCl$_3$, 400 MHz): δ=5.66 (s, 1H, H-12), 3.69 (s, 3H, –O00CH3), 3.22 (dd, 1H, H-3), 2.79 (ddd, 2H, H-1), 2.34 (s, 1H, H-9), 2.07 (dd, 1H, H-18), 2.06-1.99 (m, 2H), 1.98-1.80 (m, 4H), 1.68-1.58 (m, 4H), 1.45-1.39 (m, 3H), 1.36 (s, 3H, H-27), 1.32-1.20 (m, 4H), 1.15 (s, 3H, H-28), 1.13 (s, 3H, H-26), 1.02 (m, 2H, H-15), 0.99 (s, 3H, H-23), 0.81 (s, 3H, H-24), 0.81 (s, 3H, H29), 0.69-0.72 (m, 2H).

Oxidation of Glycyrrhetinic Acid at the C3-Hydroxy Position to Form 1c up to 3:1 hexane/ethyl acetate). Concentration of the fractions containing pure product provided crystals that were recrystallized from isooctane (yield=0.441 g, 94%). Melting Point=293-297° C. 1H-NMR (CDCl$_3$, 400 MHz): δ=5.75 (s, 1H, H-12), 3.72-3.75 (m, 1H), 2.95-2.98 (m, 1H), 2.45 (s, 1H, H-9), 1.38 (s, 3H, H-27), 1.28 (s, 3H, H-29), 1.23 (s, 3H, H-25), 1.17 (s, 3H, H-26), 1.11 (s, 3H, H-26), 1.07 (s, 3H, H-24), 0.86 (s, 3H, H-28).

Methyl Ester of 1c (1d)

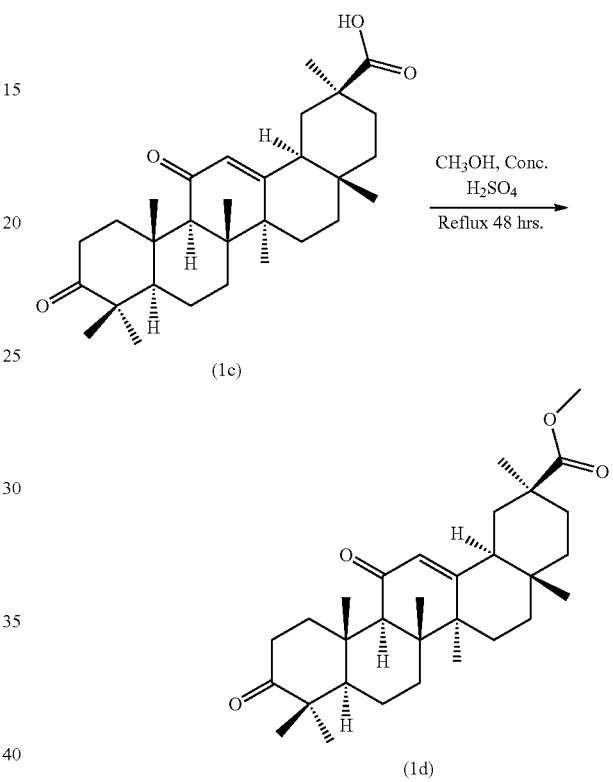

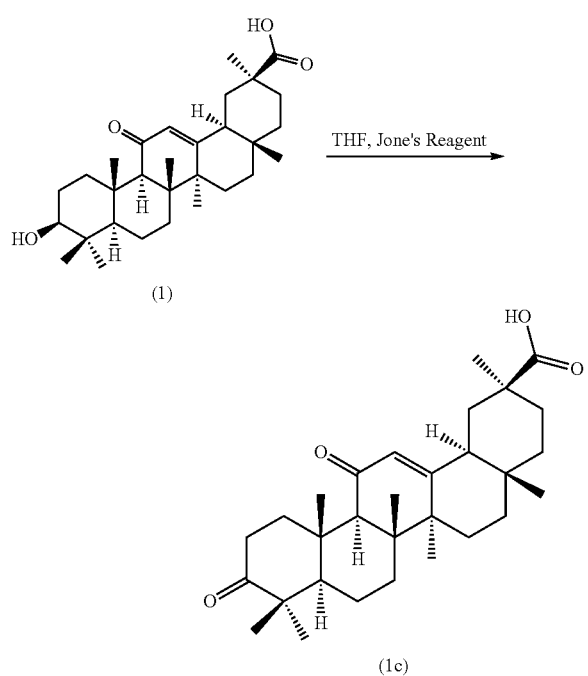

In 100 ml recovery flask was placed 18αβG (0.470 g, 1.0 mmol), tetrahydrofuran (5 ml) and Jones' Reagent (2.5M, 1 ml). The mixture was stirred in an ice bath and after an hour thin layer chromatography indicated all starting material was consumed. Ice water was added dropwise to fill the flask and solid was isolated by suction filtration, washed with cold water and air dried. Then the product was absorbed in 15 cc of silica gel with 50 ml of ethyl acetate. Absorbed material was placed on the top of the silica gel column made up of hexane/ethyl acetate 9:1 solvent to elute (solvent: hexane/ethyl acetate 9:1 at first and the polarity gradually increased In 100 ml recovery flask was placed 3,11-dioxo-olean-12-en-29-oic acid (0.1876 g, 0.4 mmol), anhydrous methanol (10 ml) and 5 drops of concentrated H$_2$SO$_4$. The mixture was refluxed for 48 hours after which time thin layer chromatography indicated all the starting material was consumed. Then 10 ml of water was added dropwise with stirring. The solid product was isolated by suction filtration, washed with water and air-dried. It was then absorbed on 15 cc of silica gel with 50 cc of ethyl acetate and the absorbed material was placed on the top of a silica gel column made with hexane/ethyl acetate 9:1 to elute (solvent: hexane/ethyl acetate 9:1 at first and the polarity was gradually increased up to 3:1 hexane/ethyl acetate). Concentration of the fractions containing pure product provided a white solid that was recrystallized form isooctane/1-propanol (yield=0.066 g, 34%). Melting Point=245-246° C. 1H-NMR (CDCl$_3$, 400 MHz): δ=5.71 (s, 1H, H-12), 3.70 (s, 3H, —COOCH$_3$), 2.98-2.94 (m, 1H), 2.67-2.60 (m, 1H), 2.44 (s, 1H, H9), 1.37 (s, 3H, H-29), 1.17 (s, 3H, H-25), 1.15 (s, 3H, H-26), 1.11 (s, 3H, H-23), 1.07 (s, 3H, H-24), 0.82 (s, 3H, H-28).

Hexyl Ester of 1c (1e)

Methyl Ether of 1b (1f)

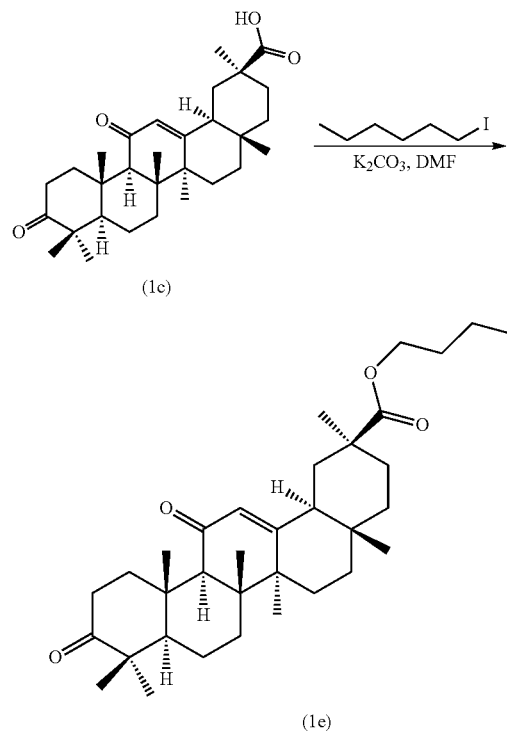

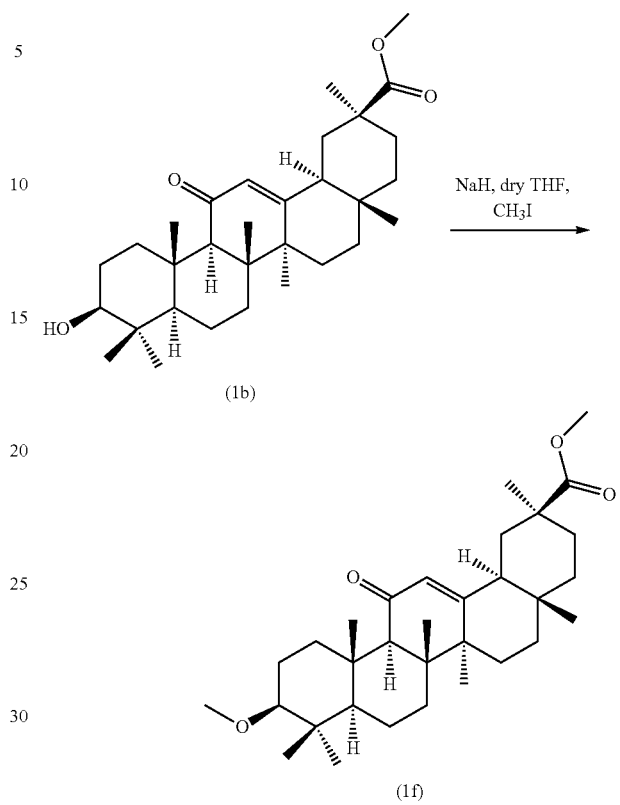

In 100 ml recovery flask was placed 3,11-dioxo-olean-12-en-29-oic acid (0.188 g, 0.4 mmol), anhydrous dimethylformamide (5 ml), potassium carbonate (0.111 g, 0.8 mmol) and 1-iodohexane (0.094 g, 0.4 mmol). The mixture was stirred for two hours after which time thin layer chromatography indicated no starting material remained. Then, 20 ml ice water was added dropwise, and 10% hydrochloric acid was added until it became slightly acidic and ice cold water was added dropwise to fill the flask. The solid compound was then isolated by suction filtration, washed with cold water and air-dried. The dried compound was absorbed on 15 cc of silica gel with 50 cc of ethyl acetate and the absorbed material was placed on the top of the silica gel column made up of hexane/ethyl acetate 9:1 to elute (Solvent: hexane/ethyl acetate 9:1 at first and the polarity of solvent increased gradually up to 3:1 hexane/ethyl acetate). Concentration of the fractions containing pure product provided a white solid that was recrystallized from isooctane (Yield=0.153 g, 69.8%). Melting Point=144° C. 1H-NMR (CDCl$_3$, 400 MHz): δ=5.69 (s, 1H, H-12), 4.07-4.11 (m, 2H, —OCH3), 2.99-2.94 (m, 1H), 2.60-2.69 (m, 1H), 2.44 (s, 1H, H-9), 1.37 (s, 3H, H-27), 1.27 (s, 3H, H-29), 1.17 (s, 3H, H-25), 1.15 (s, 3H, H-26), 1.11 (s, 3H, H-23), 1.07 (s, 3H, H-24), 0.82 (s, 3H, H-28). 13C-NMR (CDCl$_3$, 100 MHz): δ=14.0 (C-6'), 15.7 (C-25), 18.5 (C-26), 18.8 (C-6), 21.4 (C-5'), 22.5 (C-24), 23.3 (C-28), 25.6 (C-27), 26.4 (C-29), 26.5 (C-3'), 28.4 (C-16), 28.6 (C-15), 28.7 (C-2'), 31.1 (C21), 31.4 (C-4'), 31.8 (C-17), 32.1 (C-7), 34.2 (C-2), 36.7 (C-22), 37.7 (C-10), 39.8 (C-1), 41.1 (C-19), 43.3 (C-20), 44.0 (C-14), 45.2 (C-8), 47.8 (C-18), 48.3 (C-4), 55.4 (C-5), 61.1 (C-9), 64.6 (C-1'), 128.4 (C-12), 169.8 (C-13), 176.5 (C-30), 199.4 (C-11), 217.2 (C-3). IR ū (cm$^{-1}$)=2961.85 m, 2934.60 m, 2869.24 m, 1716.44 s, 1701.72 s, 1650.40 s, 1640 w 1155.38 s.

In 100 ml recovery flask was placed 3-hydroxy-11-oxo-18-olean-12-en-30-oic acid methyl ester (0.155 g, 0.32 mmol), dry tetrahydrofuran (10 ml) and sodium hydride (15.36 mg, 0.64 mmol). The mixture was stirred for 30 minutes at room temperature. Then, methyl iodide (0.136 g, 0.96 mmol, 3 eq.) was added and stirred for 5 hours at room temperature. After 5 hours, thin layer chromatography indicated no formation of product. Again, methyl iodide (0.094 g, 0.64 mmol) was added and the reaction mixture was refluxed for 30 hours. Thin layer chromatography indicated the formation of product and the mixture was allowed to cool down to room temperature. Cold water (10 ml) was added drop wise with stirring and the product was extracted with (10×3) ml of dichloromethane. The organic phase was separated using separatory funnel and then washed with water and dried with anhydrous magnesium sulfate. 15 cc of silica gel was added and the solvent was evaporator. Absorbed material was placed on the top of silica gel column made with hexane/ethyl acetate 4:1 solvent to separate the product (solvent: hexane/ethyl acetate 3:1). Concentration of the fraction containing the pure product provided a white solid, which was recrystallized from 1-PrOH (Yield=0.013 g, 8.2%). Melting Point=330-333° C. 1H-NMR (CDCl$_3$, 400 MHz): δ=5.67 (s, 1H, H-12), 3.69 (s, 3H, —OCH3), 3.36 (s, 3H, CH3O—), 2.82 (ddd, 1H, H-1), 2.67 (dd, 1H, H-3), 2.33 (s, 1H, H-9), 1.30 (m, 1H, H-21), 1.13 (s, 3H, H-25), 1.13 (s, 3H, H-29), 1.11 (s, 3H, H-26), 0.97 (s, 3H, H-23), 0.88 (m, 1H, H-10), 0.79 (s, 3H, H-28), 0.77 (s, 3H, H-24), 0.67 (m, 1H, H-5).

Acetyl Ester of 1b (1g)

Heptanoyl Ester of 1a (1h)

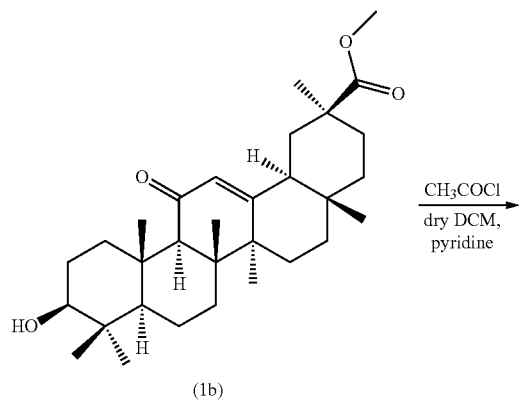

(1b)

(1g)

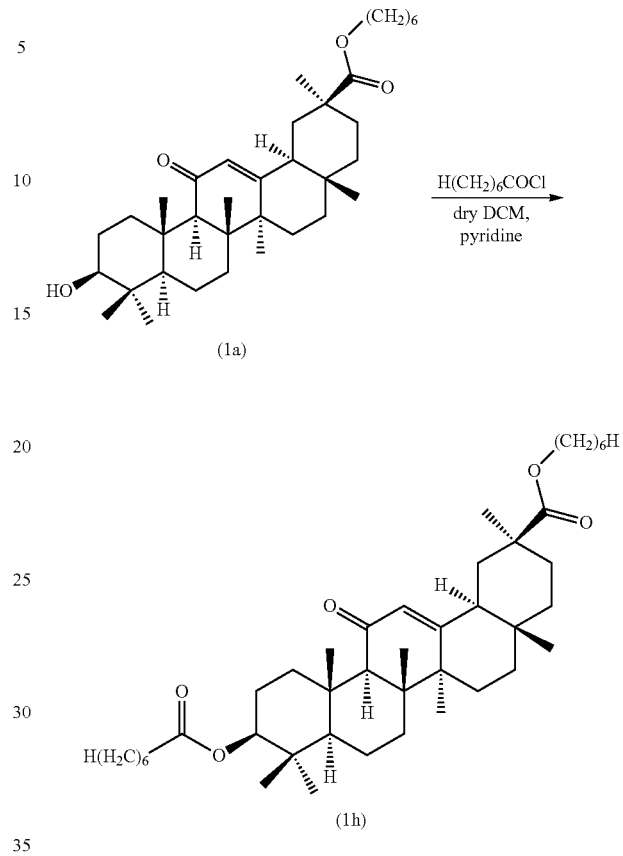

(1a)

(1h)

In a 100 ml recovery flask was placed 3-hydroxy-11-oxo-18-olean-12-en-30-oic acid methyl ester (0.155 g, 0.32 mmol), dry dichloromethane (5 ml), acetyl chloride (50.24 mg, 0.64 mmol) and pyridine (1 ml). The mixture was stirred under nitrogen atmosphere for 17 hours after which time thin layer chromatography indicated all the reactant consumed. Then 50 ml of ice-cold water was added dropwise with stirring. The product obtained was then extracted with dichloromethane (3×20 ml), washed with water and dried over magnesium sulfate. Solid obtained after evaporation of solvent was then absorbed on 15 cc of silica gel with 50 ml of ethyl acetate, the solvent was removed by rotatory evaporation. The absorbed material was placed on the top of the silica gel Column made up of hexane/ethyl acetate 4:1 to elute (solvent: hexane/ethyl acetate 4:1 at first and the polarity of solvent increased up to hexane/ethyl acetate 3:1). Concentration of the fractions containing pure compound provided white solid, which was recrystallized from methanol (Yield=0.082 g, 49%). Melting Point=292-295° C. 1H-NMR (CDCl$_3$, 400 MHz): δ=5.67 (s, 1H, H-12), 4.51 (dd, 1H, H-3), 3.69 (s, 3H, —OCH$_3$), 2.80 (ddd, 1H, H-1), 2.36 (s, 1H, H-9), 2.08 (m, 1H, H-18), 2.05 (s, 3H, —COOCH$_3$), 1.36 (s, 3H, H-27), 1.16 (s, 3H, H-25), 1.15 (s, 3H, H-29), 1.13 (s, 3H, H-26), 0.88 (s, 6H, H-23, 24), 0.81 (s, 3H, H-28), 0.80 (m, 1H, H-5).

In a 100 ml recovery flask with stir-bar was placed 3-hydroxy-11-oxo-12-en-30-oic acid hexyl ester (0.277 g, 0.5 mmol), dry dichloromethane (5 ml), heptanoyl chloride (0.082 g, 0.55 mmol) and pyridine (1 ml). The mixture was stirred at room temperature overnight. Thin layer chromatography showed all the reactant was consumed, then 50 ml cold water was added dropwise with stirring. The product was extracted with dichloromethane (20×3 ml), washed with water, dried over magnesium sulfate, and absorbed on 15 cc of silica gel with 50 cc of ethyl acetate. Absorbed material was placed on the top of the silica gel made up with hexane/ethyl acetate 9:1 to elute (solvent: hexane/ethyl acetate 9:1 at first and the polarity was gradually increased up to 3:1). Concentration of the fractions provided solid product, which was recrystallized from methanol (yield=0.123 g, 37%). Melting Point=143.0-144.0° C. 1H-NMR (CDCl$_3$, 400 MHz): δ=5.66 (s, 1H, H-12), 4.51 (dd, 1H, H-3), 4.9 (t, 2H, —OCH2-), 2.80 (ddd, 1H, H-1), 2.36 (s, 1H, H-9), 2.30 (t, 2H, —OCOOCH3-), 1.75-2.15 (m, 5H), 1.57-1.75 (m, 10H), 0.80-1.57 (m, 47H). 13C-NMR (CDCl$_3$, 100 MHz): δ=14.0, 14.0, 16.4, 16.8, 17.4, 18.7, 22.5, 22.5, 23.3, 23.6, 25.1, 25.6, 26.4, 26.5, 28.0 28.4, 28.5, 28.6, 28.8, 31.1, 31.4, 31.5, 31.8, 32.7, 34.9, 36.9, 37.8, 38.1, 38.8, 41.0, 43.2, 44.0, 45.4, 48.4, 55.0, 61.7, 64.6, 80.3, 128.5, 169.3, 173.7, 176.5, 200.1.

Methyl Ether of 3β-18β-glycyrrhethinic Acid Methyl Ester (1i)

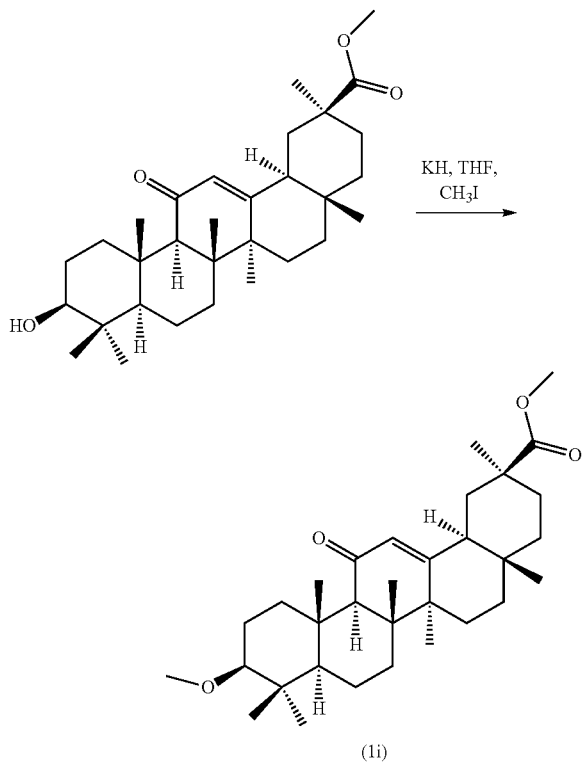

In a 100 ml recovery flask with stir bar was placed 3-hydroxy-11-oxo-18-olean-12-en-30-oic acid methyl ester (0.484 g, 1.0 mmol), dry tetrahydrofuran (10 ml) and potassium hydride (0.400 g, 3.0 mmol, 3 equiv., 30% dispersed in mineral oil). The mixture was cooled to 0° C. in an ice bath. Then, methyl iodide (0.426 g, 3.0 mmol, 3 equiv.) was added and the ice bath was removed. The mixture was stirred for one hour in an inert atmosphere of nitrogen. After this time the reaction was monitored by thin layer chromatography, which indicated the complete consumption of reactant to give one less polar product. Concentrated hydrochloric acid (0.2 ml) was added and the mixture was diluted with 50 ml cold water. The precipitate obtained after the addition of water was isolated by suction filtration, air dried and absorbed on 15 cc of silica gel with 50 ml of ethyl acetate. The absorbed material was placed on the top of the silica gel column made up with ethyl acetate/hexane 1:9 to elute (Solvent: ethyl acetate/hexane 1:9, polarity of the solvent was gradually increased up to 1:3). Concentration of the fractions provided solid product, which was recrystallized from 1-PrOH (Yield=0.338 g, 68%). Melting Point=329.5-332.5° C. 1H-NMR (CDCl$_3$, 400 MHz): δ=5.67 (s, 1H, H-12), 3.69 (s, 3H, —OCH$_3$), 3.36 (s, 3H, CH3O-), 2.84 (ddd, 1H, H-1), 2.67 (dd, 1H, H-3), 2.33 (s, 1H, H-9), 1.36 (s, 3H), 1.15 (s, 3H, H-25), 1.14 (s, 3H, H-29), 1.12 (s, 3H, H-26), 0.99 (s, 3H, H-23), 0.80 (s, 3H, H-28), 0.79 (s, 3H, H24), 0.67-0.79 (m, 1H, H-5).

Benzyl Ether of 3β-18β-Glycyrrhethinic Acid Hexyl Ester (1j)

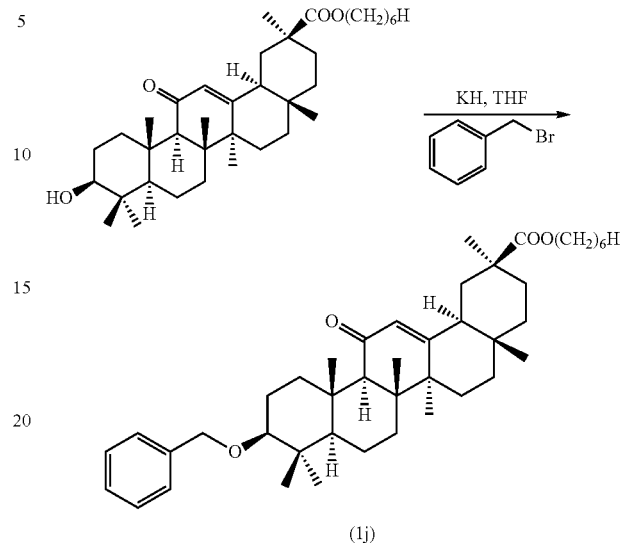

(1j)

In a 100 ml recovery flask with stir bar was placed the hydroxy ester (0.554 g, 1.0 mmol), dry tetrahydrofuran (10 ml), potassium hydride (0.226 g, 2.0 mmol, 30% dispersed in mineral oil, 2 equiv.) and benzyl bromide (0.342 g, 2.0 mmol). The mixture was stirred at room temperature under inert atmosphere of nitrogen overnight. Thin layer chromatography indicated formation of one new product and some starting material left unreacted. Then again benzyl bromide (0.171 g, 1.0 mmol) and potassium hydride (0.113 g, 1.0 mmol, 30% dispersed in mineral oil) was added and stirred overnight. Again, the reaction was monitored by thin layer chromatography but the same result, two spots of starting material and product, was observed. Then the reaction was made acidic by adding 10% hydrochloric acid (5.0 ml) and quenched by adding 50 ml of cold water. The ppt. obtained was then isolated by suction filtration and was absorbed on 15 cc of silica gel with 50 ml of ethyl acetate. The absorbed material was placed on the top of the silica gel column made up with ethyl acetate/hexane 1:3 to elute (solvent: ethyl acetate/hexane 1:3, the polarity of the solvent was gradually increased and reached up to 1:1). Concentration of the respective fractions provided two solids (one product and one starting material). The product was recrystallized from isooctane and obtained 0.106 g and 0.095 g in two crops totaling 0.201 g (Yield=31.2%). The amount of the starting material recovered was 0.233 g. Melting point=193-194° C. 1H-NMR (CDCl$_3$, 400 MHz): δ=7.24-7.31 (m, 5H), 5.65 (s, 1H), 4.55 (dd, 1H), 4.10 (m, 2H), 2.94 (dd, 1H), 2.85 (ddd, 1H), 2.33 (s, 3H), 1.16 (s, 3H), 1.15 (s, 3H), 1.13 (s, 3H), 1.12 (s, 3H), 0.86 (s, 3H), 0.80 (s, 6H). 13C-NMR (CDCl$_3$, 100 MHz): δ=14.0, 16.4, 16.6, 17.5, 18.7, 22.5, 22.7, 23.4, 25.7, 26.4, 26.5, 28.3, 28.5, 28.6, 28.7, 31.2, 31.4, 31.8, 32.7, 37.1, 37.8, 39.0, 39.2, 41.1, 43.2, 44.0, 45.4, 48.3, 55.5, 61.9, 64.6, 71.1, 86.1, 127.2, 127.5 (×2C), 128.2 (×2C), 128.6, 139.5, 169.2, 176.5, 200.

Benzyl Ether of 3β-18β-Glycyrrhethinic Acid Methyl Ester (1k),

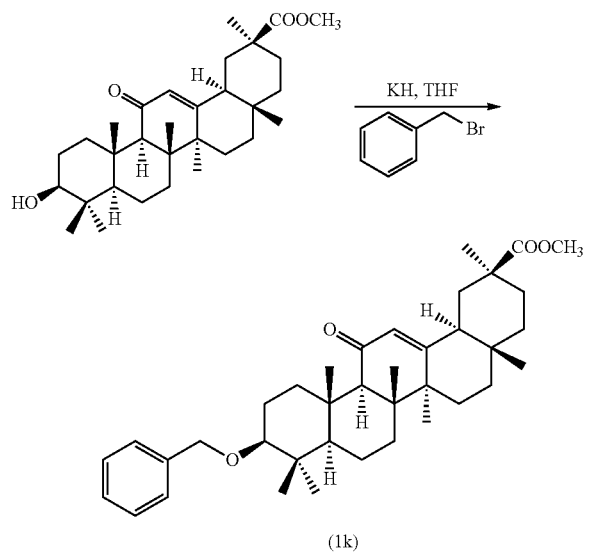

In a 100 ml recovery flask with stir bar was placed hydroxy methyl ester (0.484 g, 1.0 mmol), dry tetrahydrofuran (10 ml), potassium hydride (0.400 g, 3.0 mmol, 30% dispersed in mineral oil) and benzyl bromide (0.342 g, 2.0 mmol). The mixture was stirred at room temperature under nitrogen atmosphere overnight. Thin layer chromatography indicated all the starting material consumed to give one less polar product. Then 5 ml of 10% hydrochloric acid was added and the mixture was diluted with 50 ml of ice-cold water. The precipitate obtained was isolated by suction filtration and absorbed on 15 cc of silica gel with 50 ml of ethyl acetate. The solvent was evaporated to dryness and the absorbed material was placed on the top of the silica gel column made up with ethyl acetate/hexane 1:3 to elute (solvent: ethyl acetate/hexane 1:3). Concentration of the fractions containing the product provided white solid which was recrystallized from toluene (Yield=0.367 g, 64%). Melting point=300-302° C. 1H-NMR (CDCl$_3$, 400 MHz): δ=7.20-7.35 (m, 5H), 5.67 (s, 1H, olefinic), 4.69 (d, 1H, benzylic), 4.41 (d, 1H, benzylic), 3.69 (s, 3H, —OCH3), 2.93 (dd, 1H), 2.83 (dt, 1H), 1.85-2.09 (m, 6H), 1.36 (s, 3H), 1.15 (s, 3H), 1.14 (s, 3H), 1.12 (s, 3H), 1.00 (s, 3H), 0.87 (s, 3H), 0.80 (s, 3H).

Allylation of 1c' (18-β Isomer of 1c) to Make Allyl Ester (1m')

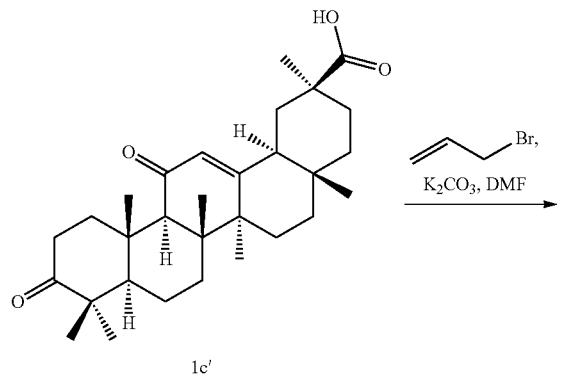

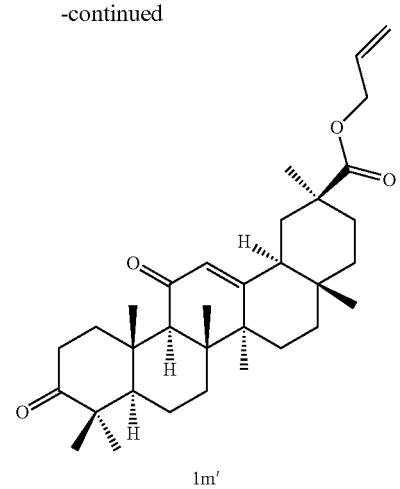

In a 100 ml recovery flask with stir bar was placed 3,11-dioxo-olean-12-en-29-oic acid (0.469 gm, 1.0 mmol), anhydrous dimethylformamide (10 ml), potassium carbonate (0.276 gm, 2.0 mmol) and allyl bromide (0.334 gm, 2.8 mmol). The mixture was stirred at room temperature under a nitrogen atmosphere for 30 minutes. Thin layer chromatography indicated all the starting material was consumed to give a single less polar product. Then 50 ml ice cold water was added dropwise with stirring and the mixture was made acidic by adding 10% hydrochloric acid. The precipitate obtained was isolated by suction filtration, washed with water and air dried. The product was absorbed on 15 cc of silica gel with 50 ml of ethyl acetate. Solvent was removed and the absorbed material was placed at the top of a column made up with ethyl acetate/hexane 1:3 to elute (solvent: ethyl acetate/hexane 1:3). Concentration of fractions provided a solid product which was recrystallized from isooctane (yield=0.365 gm, 74%). Melting point: 150-152° C. 1H-NMR (CDCl$_3$, 400 MHz): δ=0.82 (s, 3H), 1.07 (s, 3H), 1.11 (s, 3H), 1.19 (s, 6H), 1.27 (s, 3H), 1.37 (s, 3H), 2.33-2.39 (m, 1H), 2.44 (s, 1H), 2.60-2.67 (m, 1H), 2.94-2.98 (m, 1H), 4.58-4.66 (m, 2H, —OCH2-), 5.25 (dd, 1H, alkene H), 5.34 (dd, 1H, alkene H), 5.69 (s, 1H), 5.87-5.97 (m, 1H, Hz). 13C-NMR (CDCl$_3$, 100 MHz): δ=15.7, 18.5, 18.8, 21.4, 23.3, 26.4 (2×C), 26.5, 28.4, 28.6, 31.1, 31.9, 32.1, 34.2, 36.7, 37.7, 39.8, 41.1, 43.3, 44.0, 45.2, 47.8, 48.3, 55.4, 61.1, 65.1, 118.5, 128.5, 132.2, 169.7, 176.0, 199.5, 217.2

Trifluoroethyl Ester (1n) of 1c

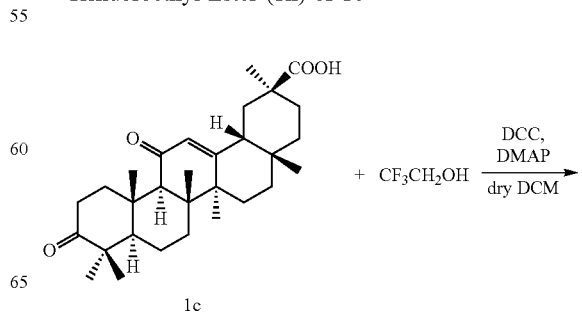

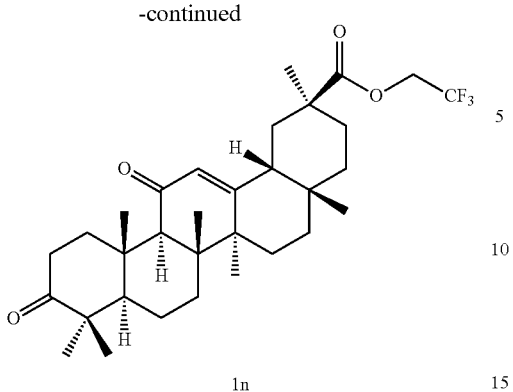

1n

In a 100 ml recovery flask with stir bar was placed 3,11-dioxo-olean-12-en-29-oic acid (0.469 gm, 1.0 mmol), dry dichloromethane (10 ml), 2,2,2-trifluoroethanol (0.110 gm, 1.1 mmol), N,N'-dicyclohexylcarbodiimide (0.226 gm, 1.1 mmol), 4-dimethylaminopyridine (1.2 mg, 0.1 mmol). The mixture was stirred at room temperature under nitrogen atmosphere overnight. Thin layer chromatography indicated two spots (one less polar product and one polar starting material). Again 2,2,2-tifluoropropanol (0.110 gm, 1.1 mmol), N,N'-dicyclohexylcarbodiimide (0.226 gm, 1.1 mmol), 4-dimethylaminopyridine (1.2 mg, 0.1 mmol) was added to ensure the completion of reaction. The mixture was stirred at room temperature overnight and 50 ml of ice-cold water was added dropwise with stirring. No precipitate was observed even after making the mixture acidic by adding 10% HCl and so the product was extracted with ethyl acetate (25×3 ml), washed and dried over MgSO$_4$. The product was then absorbed on 15 cc of silica gel with 50 ml of ethyl acetate. The absorbed material was placed on the top of the silica gel column made up with ethyl acetate/hexane 1:3 to elute (solvent: ethyl acetate/hexane 1:3). Concentration of the fractions provided 0.180 gm starting material and a solid product. The solid product was recrystallized from isooctane (yield=0.116 gm, 21.1%). Melting Point: 151-153° C. 1H-NMR (CDCl$_3$, 400 MHz): δ=0.86 (s, 3H), 1.07 (s, 3H, H-24), 1.10 (s, 3H, H-23), 1.16 (s, 3H, H-23), 1.23 (s, 3H, H-25), 1.28 (s, 3H, H-29), 1.39 (s, 3H, H-27), 2.45 (s, 1H, H-9), 2.95-2.98 (m, 1H), 4.41-4.51 (m, 2H, —CH$_2$CF$_3$), 4.53-4.63 (m, 2H, —OCH$_2$—), 5.69 (s, 1H, H-12). 13C-NMR (CDCl$_3$, 100 MHz): δ=15.7, 18.5, 18.8, 21.4, 23.4, 26.4, 26.5, 28.1, 28.5, 29.7, 31.0, 31.8, 32.1, 34.2, 36.7, 37.5, 39.8, 40.9, 43.3, 44.3, 45.2, 47.8, 48.2, 55.4, 59.9, 60.2, 61.1, 128.6, 169.0, 174.8, 199.4, 217.2.

Isobutyl Ester (1o) of 1c

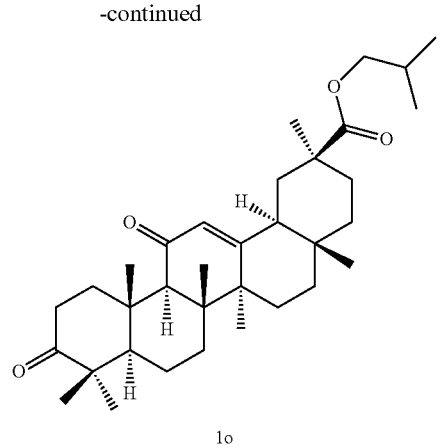

1o

In a 100 ml recovery flask with stir bar was placed 3,11-dioxo-olean-12-en-29-oic acid (0.430 gm, 0.92 mmol,), anhydrous dimethylformamide (5 ml) and potassium carbonate (0.248 gm, 1.8 mmol) and 1-iodo-2-methylpropane (0.184 gm, 1.0 mmol). The mixture was stirred under nitrogen atmosphere overnight. Reaction was monitored by thin layer chromatography which indicated the formation of a new less polar product with complete consumption of the starting material. Then, 20 ml ice water was added dropwise, solution was made slightly acidic by adding 10% hydrochloric acid and ice-cold water was added dropwise to fill the flask. The solid precipitate obtained was isolated by suction filtration, washed with cold water and air dried. The dried compound was absorbed 15 cc of silica gel with 50 cc of ethyl acetate and the absorbed material was placed at the top of the silica gel column made up of ethyl acetate/hexane 1:3 to elute (Solvent: ethyl acetate/hexane 1:3). Concentration of the fractions provided a solid product which was recrystallized from isooctane (yield=0.146 gm, 30.3%). Melting Point: 182-183° C. 1H-NMR (CDCl$_3$, 400 MHz): δ=5.69 (s, 3H), 3.89 (dd, 2H, —COOCH$_2$—), 2.93-3.00 (m, 1H), 2.59-2.68 (m, 1H), 2.44 (s, 1H), 1.38 (s, 3H), 1.27 (s, 3H), 1.17 (s, 3H), 1.16 (s, 3H), 1.11 (s, 3H), 0.96 (d, 6H, two isobutyl CH3), 0.82 (s, 3H). 13C-NMR (CDCl$_3$, 100 MHz): δ=217.2, 199.5, 176.4, 169.8, 128.5, 70.7, 61.1, 55.4, 48.4, 47.8, 45.2, 44.1, 43.3, 41.1, 39.8, 37.7, 36.7, 34.2, 32.1, 31.9, 31.1, 28.6, 28.5, 27.9, 26.5, 26.4 (2×C), 23.4, 21.4, 19.2, 18.8, 18.5, 15.7.

Isobutyl Ester (1p) of 1

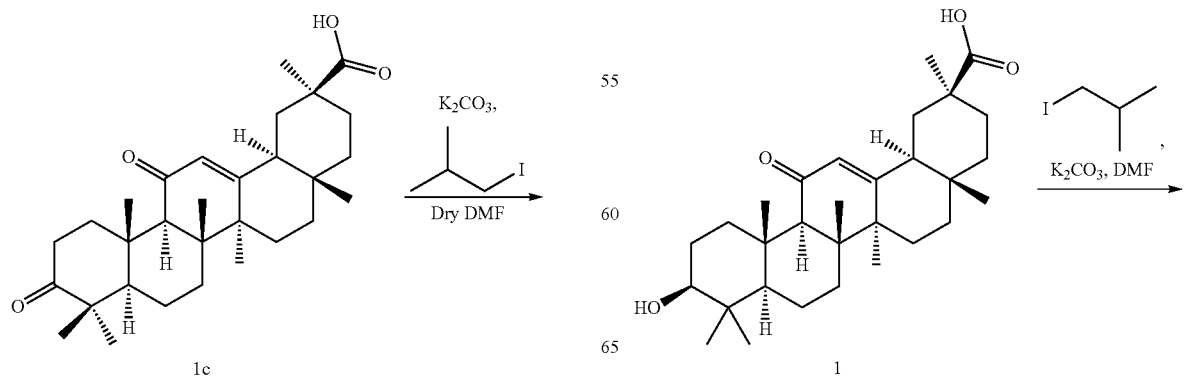

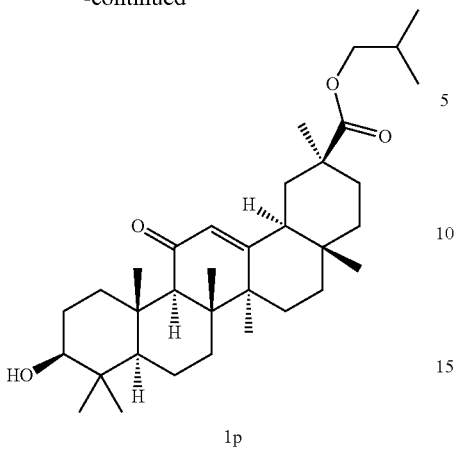

1p

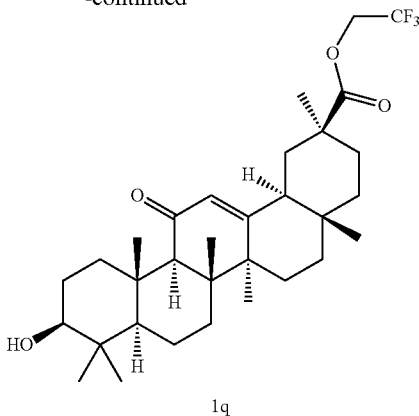

1q

In a 100 ml recovery flask was placed 18αβG (0.400 gm, 0.850 mmol), 1-iodo-2-methylpropane (0.184 gm, 1.0 mmol) and anhydrous dimethylformamide (5 ml). The mixture was stirred until homogenous and then potassium carbonate (0.138 gm, 1.0 mmol) was added. The mixture was stirred at room temperature for 16 hours. After which time, thin layer chromatography indicated complete consumption of starting material and the appearance of single less polar product. Ice water was added dropwise with stirring (~20 ml) followed by 10% hydrochloric acid (5 ml) and then again ice-cold water was added to fill the flask. The solid was isolated by suction filtration, washed with water and air dried. The product was then absorbed on 15 cc of silica gel with 50 ml of ethyl acetate. The solvent was removed by rotary evaporation and the absorbed material was placed at the top of a short silica gel column made up with ethyl acetate/hexane 1:1 to elute (solvent: ethyl acetate/hexane 1:1). Concentration of the fractions containing pure product provided a white solid, which was recrystallized from isooctane (yield=0.260 gm, 49.4%). Melting Point: 185-186° C. 1H-NMR (CDCl$_3$, 400 MHz): δ 5.56 (s, 1H), 3.89 (ddd, 2H, —COOCH$_2$—), 3.21-3.27 (m, 1H), 2.79 (ddd, 2H), 2.34 (s, 1H), 2.12 (dd, 1H), 1.80-2.08 (m, 6H), 1.58-1.68 (m, 6H), 1.37 (s, 3H), 1.16 (s, 3H), 1.14 (s, 3H), 1.13 (s, 3H), 1.01 (s, 3H), 0.96 (d, 6H, two CH3), 0.81 (s, 6H). 13C-NMR (CDCl$_3$, 100 MHz): δ=200.2, 176.5, 169.3, 128.6, 78.8, 70.6, 61.8, 54.9, 48.3, 45.4, 44.1, 43.2, 41.1, 39.1, 37.8, 37.1, 32.8, 31.9, 31.1, 28.6, 28.1, 27.9, 27.3, 26.5, 26.4 (2×C), 23.4, 19.2 (2×C), 18.7, 17.5, 16.4, 15.6.

Trifluoroethyl Ester (1q) of 1

In a 100 ml recovery flask with stir bar was placed glycyrrhetinic acid (0.940 gm, 2.0 mmol), dry dichloromethane (10 ml), 2,2,2-trifluoroethanol (0.220 gm, 2.2 mmol), N,N'-dicyclohexylcarbodiimide (0.226 gm, 1.1 mmol), 4-dimethylaminopyridine (0.600 mg, 2.9 mmol). The mixture was stirred at room temperature under nitrogen atmosphere overnight. Thin layer chromatography indicated the complete consumption of starting material to give single less polar product. Ice cold water was added dropwise with stirring. No precipitate was observed even after making the mixture acidic by adding 10% hydrochloric acid and so the product was extracted with ethyl acetate (25×3 ml), washed with brine and dried over MgSO$_4$. The product was then absorbed on 15 cc of silica gel with 50 ml of ethyl acetate. The absorbed material was placed on the top of the silica gel column made up with ethyl acetate/hexane 1:9 to elute (solvent: ethyl acetate/hexane 1:9 at first and the polarity of the solvent was gradually increased up to 1:3). Concentration of the fractions provided two solids (one desired and one some undesired products). The desired product was recrystallized from MeOH/H$_2$O (Yield=0.678 gm, 61.4%). Melting Point=160-162° C. 1H-NMR (400 MHz, CDCl$_3$): δ=0.69-0.71 (m, 1H), 0.81 (s, 3H), 1.01 (s, 3H), 1.13 (s, 3H), 1.14 (s, 3H), 1.21 (s, 3H), 1.33 (s, 3H), 2.34 (s, 3H), 2.75-2.84 (m, 1H), 3.21-3.25 (m, 1H), 4.44-4.57 (m, 2H), 5.65 (s, 1H). 13C-NMR (100 MHz, CDCl$_3$): δ=15.6, 16.4, 17.5, 18.7, 23.4, 26.4 (2×C), 27.3, 28.1 (2×C), 28.4, 31.0, 31.8, 32.8, 37.1, 37.6, 39.1, 40.8, 43.2, 44.3, 45.4, 48.1, 54.9, 59.9, 60.2, 61.8, 76.2, 78.8, 128.7, 168.5, 174.9, 200.1. 19F-NMR (376 MHz, CDCl$_3$): δ=−76.58 (t, —CH$_2$CF$_3$).

S-Naringenin (2) Derivatives

Trimethylether of S-Naringenin (2a)

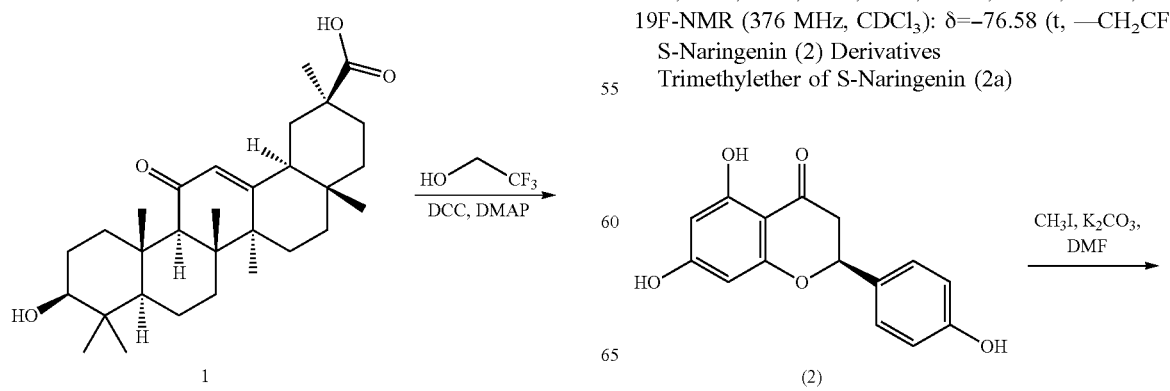

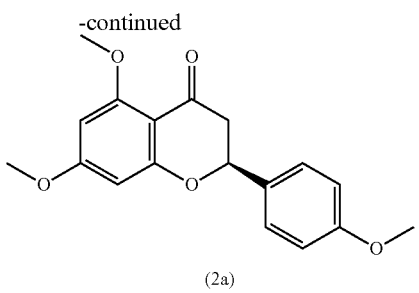

(2a)

In 100 ml recovery flask was placed naringenin (0.272 g, 1.0 mmol), dry dimethylformamide (5 ml), potassium carbonate (0.690 g, 5.0 mmol) and methyl iodide (0.710 g, 5.0 mmol). The mixture was stirred under a nitrogen atmosphere at room temperature overnight. After this time, thin layer chromatography indicated small amount of product formation and so, a further amount of methyl iodide (0.710 g, 5.0 mmol) and potassium carbonate (0.690 g, 5.0 mmol) was added. Again, the reaction was stirred overnight. After this time, thin layer chromatography showed all the reactant consumed to give products as four new spots were observed on thin layer chromatography. Then 25 ml of ice cold water was added dropwise with stirring and the mixture was made slightly acidic by dropwise addition of 10% hydrochloric acid. The flask was filled by addition of ice cold water. The product was extracted with ethyl acetate (3×50 ml), washed with water and dried over anhydrous magnesium sulfate. The solid obtained after evaporation of solvent was absorbed on 15 cc of silica gel with 50 ml of ethyl acetate and again solvent was removed by rotatory evaporation. The absorbed material was placed on the top of the silica gel column made up with hexane/ethyl acetate 4:1 to separate the product (solvent: hexane/ethyl acetate 4:1, polarity of the solvent was gradually increased up to 1:1). Concentration of the fractions provided three different solids. Solid product obtained after concentration of fractions 13-17 gave single spot on thin layer chromatography. Solid from fractions 18-23 also gave single spot but the solid product from fractions 24-28 gave two spots on thin layer chromatography. None of the fractions shared common compound. Yield, Product-1 (fractions 13-17)=0.073 g (dark brown waxy solid, melted at 70° C.), Product-2 (fractions 18-23)=0.153 g (brown solid, melted at 78° C.), Product-3 (fractions 24-28)=0.010 g (black solid, melted at 145° C.). Data for suspected compound (product-2): 1H-NMR (CDCl$_3$, 400 MHz): δ=7.29-7.46 (m, 2H), 6.82-6.90 (m, 2H), 6.16 (s, 1H), 3.86 (s, 3H), 3.83 (s, 3H), 3.76 (s, 3H), 1.26-1.30 (m, 1H), 0.80-0.90 (m, 1H).

In a 100 ml recovery flask was placed naringenin (0.544 gm, 2.0 mmol), dry dimethyl formamide (5 ml), potassium carbonate (0.552 gm, 4.0 mmol) and methyl iodide (0.710 gm, 5.0 mmol). The mixture was stirred under a nitrogen atmosphere at room temperature overnight. After this time thin layer chromatography indicated small amount of product formation and so, a further amount of methyl iodide (2.0 mmol, 0.284 gm) and potassium carbonate (0.138 gm, 1.0 mmol) was added. The reaction was stirred for six hours after which time, thin layer chromatography showed four spots and so the methyl iodide (0.248 gm, 2.0 mmol) was added so as to complete the reaction. The reaction was left to progress overnight. Thin layer chromatography was carried, which showed the complete consumption of the starting material and the formation of three new less polar products. Then, ice cold water was added dropwise with stirring to fill the flask and the mixture was made slightly acidic by dropwise addition of 10% hydrochloric acid. No solid precipitate was seen so the product was extracted with ethyl acetate (3×50 ml), washed with water and dried over anhydrous MgSO$_4$. The solid obtained after evaporation of solvent was absorbed on 15 cc of silica gel with 50 ml of ethyl acetate and again solvent was removed by rotatory evaporation. The absorbed material was placed at the top of the silica gel column made up with hexanes/ethyl acetate 3:1 to separate the product (solvent: hexanes/ethyl acetate 3:1, polarity of the solvent was gradually increased up to 1:1). Concentration of the fractions provided three different pure solids.

Product-1 (Trimethoxy Naringenin)

Yield=0.144 gm (yellow solid, recrystallized from isooctane). Melting Point: 112° C. 1H-NMR (CDCl$_3$, 400 MHz): δ=7.79 (d, 2H), 7.56 (d, 2H), 6.92 (dd, 2H), 6.02 (dd, 2H), 3.91 (s, 3H, —OCH$_3$), 3.85 (s, 3H, —OCH$_3$), 3.83 (s, 3H, —OCH$_3$). 13C-NMR (CDCl$_3$, 100 MHz): δ=192.6, 168.4, 166.0, 162.5, 161.4, 142.5, 130.1, 128.3, 125.1, 114.4, 106.4, 93.8, 91.2, 55.8, 55.6, 55.4.

Product-2 (Dimethoxy Naringenin)

Yield=0.090 gm (white solid, recrystallized from isooctane). Melting Point: 113-114° C. 1H-NMR (CDCl$_3$, 400 MHz): δ=12.02 (s, 1H), 7.38 (d, 2H), 6.95 (d, 2H), 6.05 (dd, 2H), 5.37 (dd, 1H), 3.83 (s, 3H, —OCH$_3$), 3.81 (s, 3H, —OCH$_3$), 3.06-3.14 (m, 1H), 2.78 (dd, 1H). 13C-NMR (CDCl$_3$, 100 MHz): δ=196.0, 167.9, 163.7, 164.1, 162.9, 160.1, 130.4, 127.7, 114.2, 95.1, 94.2, 79.0, 55.7, 55.3, 43.2. Matches the literature NMR data for 7,4'-dimethoxy naringenin. (Reference: Molecules, 22, 1485, 2017)

Product-3 (Monomethoxy Naringenin)

Yield=0.055 gm (light yellow solid, recrystallized from isooctane). Melting Point: 143-145° C. 1H-NMR (CDCl$_3$, 400 MHz): δ=12.04 (s, 1H), 7.37-7.29 (m, 2H), 6.90-6.92 (m, 2H), 6.07-6.10 (m, 2H), 6.08 (dd, 2H), 5.37 (dd, 1H), 5.32 (s, 1H), 3.83 (s, 3H, —OCH$_3$), 3.08-3.15 (m, 1H), 2.82-2.84 (m, 1H). 13C-NMR (CDCl$_3$, 100 MHz): δ=196.1, 168.0, 164.1, 162.9, 156.1, 142.1, 130.1, 128.0, 115.7, 103.1, 95.1, 94.3, 86.3, 79.0, 55.7, 43.2. Matches the literature NMR data for 7-methoxy naringenin. Reference: Molecules, 22, 1485, 2017

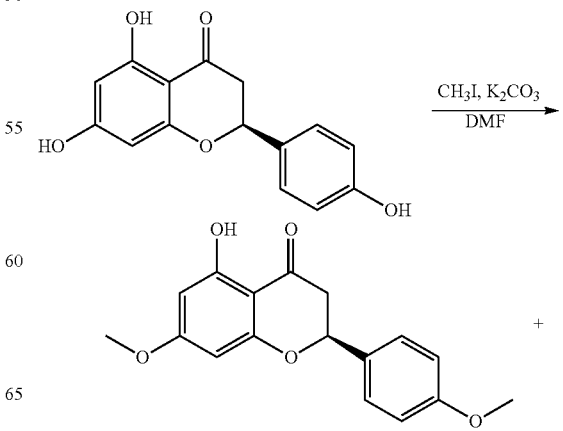

-continued

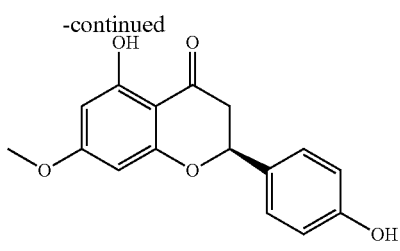

In a 100 ml recovery flask was placed naringenin (0.544 gm, 2.0 mmol), dry dimethyl formamide (5 ml), potassium carbonate (0.552 gm, 4.0 mmol) and methyl iodide (0.710 gm, 5.0 mmol). The mixture was stirred under a nitrogen atmosphere at room temperature overnight. After this time thin layer chromatography indicated small amount of product formation and so, a further amount of methyl iodide (2.0 mmol, 0.284 gm) and potassium carbonate (0.138 gm, 1.0 mmol) was added. The reaction was stirred for six hours after which time, thin layer chromatography showed four spots and so the methyl iodide (0.248 gm, 2.0 mmol) was added and the reaction was left to progress overnight. Then, ice cold water was added dropwise with stirring to fill the flask and the mixture was made slightly acidic by dropwise addition of 10% hydrochloric acid. No solid precipitate was seen so the product was extracted with ethyl acetate (3×50 ml), washed with water and dried over anhydrous MgSO$_4$. The solid obtained after evaporation of solvent was absorbed on 15 cc of silica gel with 50 ml of ethyl acetate and again solvent was removed by rotatory evaporation. The absorbed material was placed at the top of the silica gel column made up with hexanes/ethyl acetate 3:1 to separate the product (solvent: hexanes/ethyl acetate 3:1, polarity of the solvent was gradually increased up to 1:1). Concentration of the fractions provided dimethoxy and monomethoxy naringenin as solid products which were recrystallized from isooctane.

Dimethoxy Naringenin:

Yield=0.090 gm (white solid, recrystallized from isooctane). Melting Point: 113-114° C. 1H-NMR (CDCl$_3$, 400 MHz): δ=12.02 (s, 1H), 7.38 (d, 2H), 6.95 (d, 2H), 6.05 (dd, 2H), 5.37 (dd, 1H), 3.83 (s, 3H, —OCH$_3$), 3.81 (s, 3H, —OCH$_3$), 3.06-3.14 (m, 1H), 2.78 (dd, 1H). 13C-NMR (CDCl$_3$, 100 MHz): δ=196.0, 167.9, 163.7, 164.1, 162.9, 160.1, 130.4, 127.7, 114.2, 95.1, 94.2, 79.0, 55.7, 55.3, 43.2. Matches the literature NMR data for 7,4'-dimethoxy naringenin. (Reference: Molecules, 22, 1485, 2017)

Monomethoxy Naringenin:

Yield=0.055 gm (light yellow solid, recrystallized from isooctane). Melting Point: 143-145° C. 1H-NMR (CDCl$_3$, 400 MHz): δ=12.04 (s, 1H), 7.37-7.29 (m, 2H), 6.90-6.92 (m, 2H), 6.07-6.10 (m, 2H), 6.08 (dd, 2H), 5.37 (dd, 1H), 5.32 (s, 1H), 3.83 (s, 3H, —OCH$_3$), 3.08-3.15 (m, 1H), 2.82-2.84 (m, 1H). 13C-NMR (CDCl$_3$, 100 MHz): δ=196.1, 168.0, 164.1, 162.9, 156.1, 142.1, 130.1, 128.0, 115.7, 103.1, 95.1, 94.3, 86.3, 79.0, 55.7, 43.2. Matches the literature NMR data for 7-methoxy naringenin. Reference: Molecules, 22, 1485, 2017

Triacetyl Ester (2d) and 4',7-Diacetyl Ester (2c) of S-Naringenin

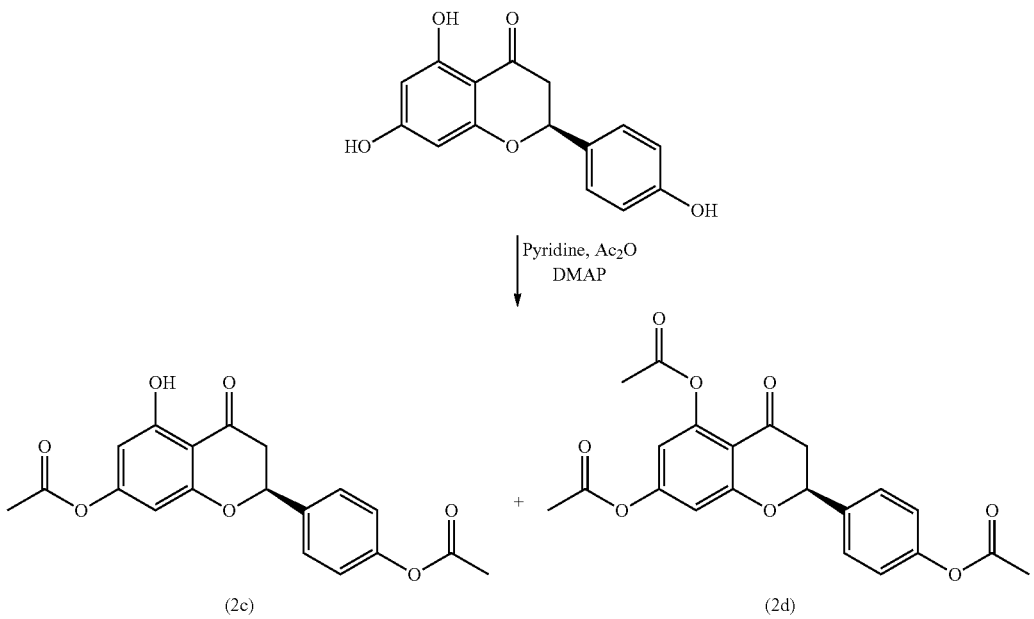

In a 100 ml recovery flask with stir bar was placed naringenin (0.272 g, 1.0 mmol), pyridine (5 ml), acetic anhydride (5 ml) and 4-dimethylaminopyridine (12.2 mg, 0.1 mmol). The mixture was stirred at room temperature overnight. Thin layer chromatography indicated all the starting material was consumed to and two new products were observed on the thin layer chromatography. Then 50 ml of cold water was added dropwise with stirring and the product was extracted with diethyl ether (50×3 ml), washed with water, dried over magnesium sulfate and solvent was evaporated. The solid product was absorbed on 15 cc of silica gel with 50 ml of ethyl acetate. The absorbed material was placed on the top of the silica gel made up with ethyl acetate/hexane 1:3 to separate the product (solvent: ethyl acetate/hexane 1:3, the polarity of the solvent was gradually increased up to 1:1). Concentration of the fractions provided two solids (triester and diester) which were recrystallized from methanol/water. Product-1 (triester): Yield=0.010 g, 2.5%. Data for product-1 (triester): Melting Point=151.5-

156.5° C. 1H-NMR (CDCl$_3$, 400 MHz): δ=7.45 (d, 2H), 7.15 (d, 2H), 6.78 (d, 1H), 6.54 (d, 1H), 5.41 (dd, 1H), 3.01-3.09 (m, 1H), 2.82 (dd, 1H), 2.39 (s, 3H), 2.33 (s, 3H), 2.30 (s, 3H). Product-2 (diester): Yield=0.148 g. Melting point=150-154° C. Data for product-2 (diester): 1H-NMR (CDCl$_3$, 400 MHz): δ=12.01 (s, 1H), 7.11-7.47 (m, 4H), 6.19 (d, 2H), 5.38 (dd, 1H), 2.95 (dd, 1H), 2.68 (dd, 1H), 2.67 (s, 3H, —OAc), 2.66 (s, 3H, —OAc). 13C-NMR (CDCl$_3$, 100 MHz): δ=21.1, 21.2, 29.7, 44.9, 78.8, 95.5, 96.9. 102.0, 105.6, 107.6, 122.4, 127.5, 136.0, 150.8, 151.9, 162.8, 164.0, 169.7, 170.4, 188.9.

Dibutanoyl Ester (2'h) of R-Naringenin (2')

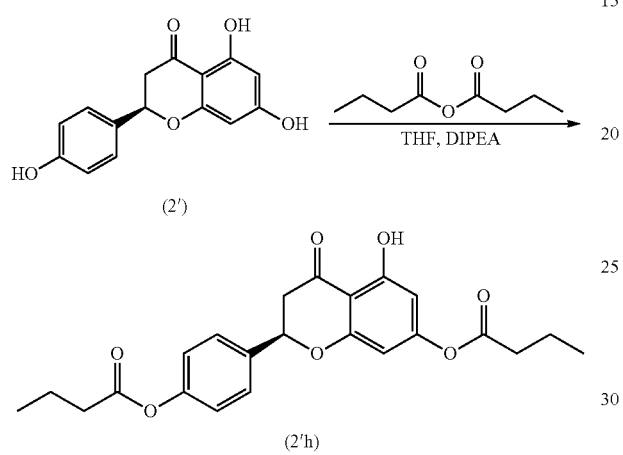

In a 100 ml recovery flask with stir bar and nitrogen inlet was placed the naringenin (0.554 g, 2.0 mmol) and dry tetrahydrofuran (10 ml). The mixture was stirred in a cold-water bath and butyric anhydride (0.95 g, 6.0 mmol) was added and the mixture was stirred for fifteen minutes. Next, three increments of diisopropylethylamine (each 0.260 g, 2.0 mmol) were added at fifteen-minute intervals to better evaluate reaction progress. An hour later excess reagents were added; butyric anhydride (0.950 g, 6.0 mmol) and diisopropylethylamine (0.78 g, 6.0 mmol). The resulting mixture was stirred overnight at room temperature and then water (~70 ml) was added dropwise with stirring. No solid product appeared even on cooling and so the mixture was made acidic by dropwise addition of hydrochloric acid but this also did not produce any solid product. The mixture was transferred to a separatory funnel using ethyl acetate and water. The phases were separated, and the organic phase was washed with water and transferred to a 500 ml recovery flask. 25 cc of silica gel was added and concentrated to dryness. The absorbed material was then placed on the top of the silica gel column made up with dichloromethane/hexane 9:1 to elute (solvent: dichloromethane/hexane 9:1). Concentration of fraction provided a solid product which was identified as a diadduct (Yield=0.390 g, 41%). Data for diadduct: Melting Point=72.0-73.0° C. 1H-NMR (DMSO-d6, 400 MHz): δ=11.94 (s, 1H), 7.57-7.60 (m, 2H), 7.18-7.21 (m, 2H), 6.36 (dd, 2H), 5.74 (dd, 1H), 3.42-3.50 (m, 1H), 2.92 (dd, 1H), 2.53-2.60 (m, 4H), 1.59-1.71 (m, 4H), 0.93-1.00 (m, 6H). 13C-NMR (DMSO-d6, 100 MHz): δ=198.2, 172.1, 171.2, 162.7, 162.5, 158.5, 151.1, 136.2, 128.5, 122.5, 106.3, 103.3, 102.2, 78.7, 42.7, 35.7, 18.3, 18.2, 13.8, 13.7.

Triacetyl Ester (3a) of Shikimic Acid (3)

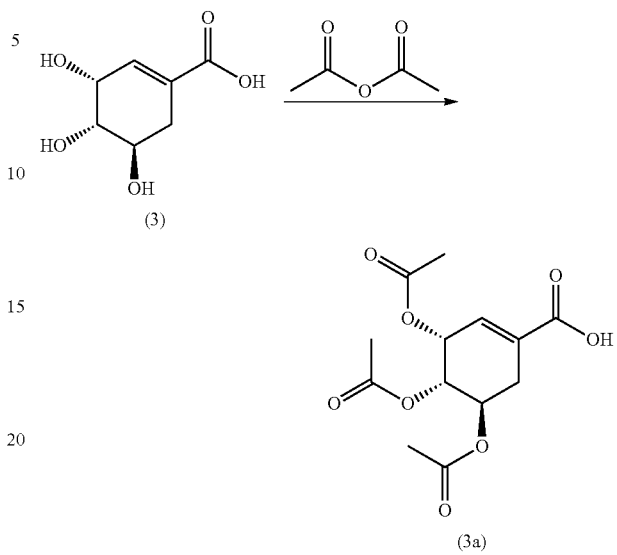

In a 250 ml round bottom flask with stir bar was placed shikimic acid (3.48 g, 20.0 mmol) and dry pyridine (25 ml). The mixture was stirred in a cold-water bath and acetic anhydride (12.0 g, 120.0 mmol) was added in portions over two minutes. This mixture was allowed to stir overnight, and thin layer chromatography indicated the absence of starting material and the presence of one new spot. The mixture was chilled in an ice water bath and 10% hydrochloric acid (75 ml) was added dropwise with stirring. There was a partially clear separation of product and so concentrated hydrochloric acid (15 ml) was then added dropwise, a clear separation was evident. The mixture was transferred to a separatory funnel with the aid of ethyl acetate (150 ml) and the phases were separated. The organic phase was washed with more 5% hydrochloric acid and then brine. The aqueous layer was extracted again with ethyl acetate (50 ml) and the combined organic extracts were dried with magnesium sulfate, filtered through a short pad of silica gel and concentrated to a viscous oil, it is kept under house vacuum. Yield=4.36 g (72.6%). 1H-NMR (400 MHz, CDCl$_3$): δ=2.08 (3H, s) 2.11 (6H, d) 2.49 (H, dd) 2.90 (H, dd) 5.31 (H, dd) 5.77 (H, dd) 5.79 (H, dd) 6.8 (H, d). 13CNMR (400 MHz), CDCl$_3$) δ 14.1, 20.7, 28.0, 65.9, 66.7, 67.4, 76.7, 77.0, 77.3, 130.5, 135.0, 169.8, 169.9.

Biphenyl Ester (3b) of 3a

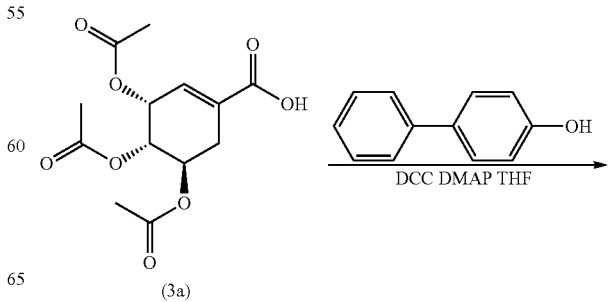

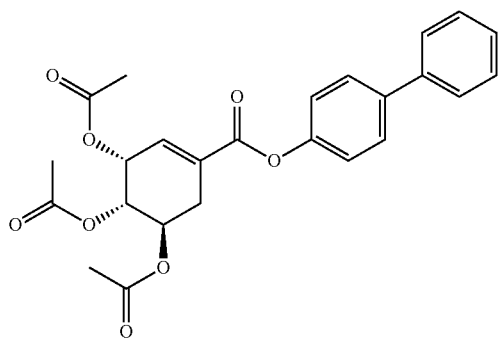

(3b)

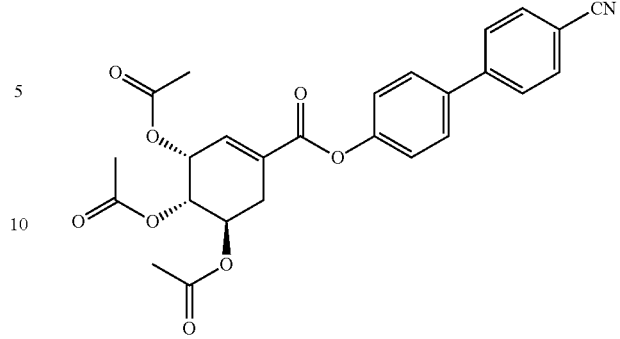

(3c)

In a 250 ml round bottom flask with stir bar was placed (3R,4S,5R)-3,4,5-tris(acetyloxy)-1-cyclohexene-1-carboxylic acid (0.52 g, 2.0 mmol), 4-phenylphenol (0.34 g. 2.0 mmol), 4-dimethylaminopyridine (4.0 mg, 0.04 mmol) and 10 ml of dry tetrahydrofuran. The mixture was stirred until all the compounds dissolved and then N,N'-dicyclohexylcarbodiimide (0.45 g, 2.0 mmol) was added. Soon after adding the N,N'-dicyclohexylcarbodiimide addition, a precipitate appeared and after two hours the mixture was checked by thin layer chromatography and a new product was there with little amount of starting material. Additional dry tetrahydrofuran and some silica gel was added to the mixture. The solvent was evaporated, and the adsorbed material was kept under vacuum overnight. Separation was performed with silica gel column made up with 90% of hexanes and 10% of ethyl acetate and eluted with a gradient up to 20% ethyl acetate. Fractions containing the product were combined and concentrated to give a white (semi) solid as a product. NMR was carried out for the main product. Yield=0.6 g (65%). 1H-NMR (400 MHz, CDCl$_3$): δ=2.12 (3H, s) 2.14 (6H, d) 2.63 (H, dd) 3.04 (H, dd) 5.39 (H, dd) 5.85 (H, dd) 5.88 (H, dd) 7.04 (H, d) 7.23 (2H, dd) 7.46 (2H, ddd) 7.58 (H, dd) 7.62 (4H, ddd). 13C-NMR (400 MHz, CDCl$_3$): δ=20.7, 21.0, 28.4, 66.1, 66.7, 67.4, 76.6, 77.0, 77.3, 121.6, 127.1, 127.4, 128.2, 128.8, 130.7, 134.6, 139.2, 140.2, 149.9, 164.0, 169.8. IR: 469.66, 524.07, 1196.08, 1732.47. GC-Ms: 451.24, 429.12, 327.15, 281.17, 207.25, 170.11, 152.14, 121.15, 111.15, 73.19.

4'-Cyanobiphenyl Ester (3c) of 3a

In a 250 ml round bottom flask with stirbar was placed (3R,4S,5R)-3,4,5-tris(acetyloxy)-1-cyclohexene-1-carboxylic acid (0.59 g, 2.0 mmol), 4-cyanobiphenyl (0.44 g. 2.0 mmol), DMAP (0.004 g, 0.04 mmol) and dry THF (10 ml). The mixture was stirred until everything was dissolved and then DCC (0.515 g, 2.5 mmol) was added. Soon after adding the DCC a precipitate appeared and after three hours the mixture was checked by TLC and a new product was present with some starting materials. Despite the presence of starting materials, the reaction was terminated by adding some silica gel and more THF to the mixture. The solvent was evaporated, and the adsorbed material was kept under vacuum overnight. Separation was done with a silica gel column made up with 90% of hexanes and 10% of ethylacetate and eluted with a gradient up to 50% ethyl acetate. A white semisolid product was obtained after evaporation of the solvent. Recrystallization was done with acetonitrile and white crystals resulted. Yield=0.39 g (39.8%). Product is: 4-Cyanobiphenyl (3R,4S,5R)-3,4,5-Tri(acetyloxy)-1-cyclohexenoate. Melting Point=59-61° C. $^1$HNMR (400 MHz, CDCl$_3$) δ 2.08 (3H, s), 2.12 (6H, d, J=3.9 Hz), 2.51 (H, dd, J=14.1, 10 Hz), 3.10 (H, dd, J=10.1, 3.9 Hz), 5.37 (H, ddd, J=10.1, 10, 3.9 Hz), 5.85 (H, dd, J=4.1, 3.9 Hz), 5.95 (H, dd, J=4.1, 3.9 Hz), 7.03 (H, ddd, J=8.9, 1.5, 0.5 Hz), 7.63 (2H, ddd, J=8.9, 1.5, 0.5 Hz), 7.69 (2H, ddd, J=8.7, 1.5, 0.5 Hz), 7.76 (4H, ddd, J=8.7, 1.5, 0.5 Hz). $^{13}$CNMR (400 MHz), CDCl$_3$ δ 20.7, 20.8, 21.0, 24.8, 25.5, 28.4, 33.7, 49.4, 66.0, 66.7, 67.4, 111.1, 118.8, 122.1, 126.9, 127.7, 128.4, 130.5, 132.6, 135.0, 137.1, 141.2, 145.2, 150.9, 169.8, 169.9. IR-1733.6, 2226.5, 2849.6, 2927.7, 3322.8 (Expected peaks-Esters-1735-1750, alkene-1600-1680, aromatics-1650-2000, nitrile-2200-2250, alkane-2850-2975). GC-MS-478.9 expected mass of the desired product is 477.

4-Nitrophenyl Ester (3d) of 3a

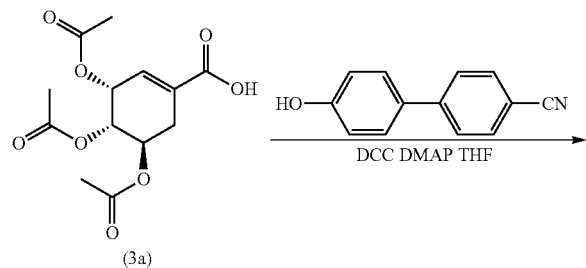

(3a)

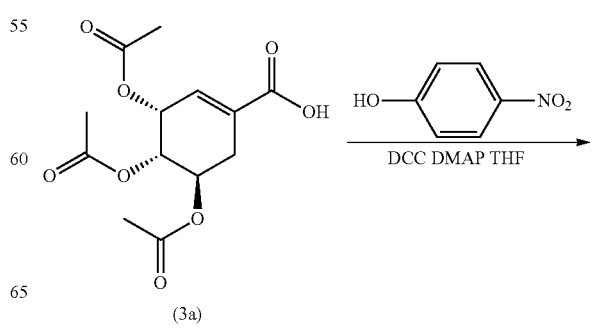

(3a)

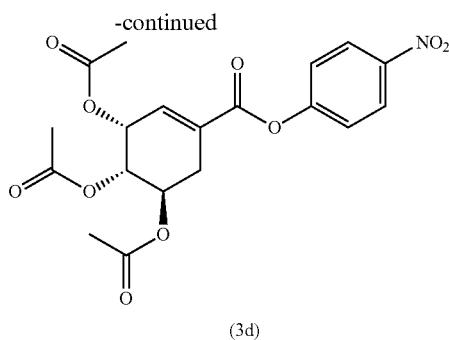

(3d)

In a 250 ml round bottom flask with stir bar was placed (3R,4S,5R)-3,4,5-tris(acetyloxy)-1-cyclohexene-1-carboxylic acid (0.59 g, 2.0 mmol), 4-nitrophenol (0.27 g, 2.0 mmol), 4-dimethylaminopyridine (4.0 mg, 0.04 mmol) and 10 ml of dry tetrahydrofuran. The mixture was stirred until all the compounds dissolved and then N,N'-dicyclohexylcarbodiimide (0.45 g, 2.0 mmol) was added. Soon after adding the N,N'-dicyclohexylcarbodiimide a precipitate appeared and after two hours the mixture was checked by thin layer chromatography and a new product was there with some starting materials. More N,N'-dicyclohexylcarbodiimide (10%) was added to the mixture and stirred for two hours and checked with thin layer chromatography. While there were some starting materials remaining the reaction was terminated. Additional dry tetrahydrofuran and some silica gel was added to the mixture. The solvent was evaporated, and the adsorbed material was kept under vacuum overnight. Separation was done with a silica gel column made up with 90% of hexanes, 10% of ethyl acetate and eluted with a gradient up to 50% ethyl acetate. White solid product was obtained after evaporation of the fractions containing product. Yield=0.94 g. 1H-NMR (400 MHz, CDCl$_3$): δ=2.07 (3H, s) 2.14 (6H, d) 2.58 (H, dd) 3.04 (H, dd) 5.37 (H, dd) 5.85 (H, dd) 7.07 (H, d) 7.36 (2H, dd) 8.32 (2H, dd). 13C-NMR (400 MHz), CDCl$_3$): δ=20.76, 66.02, 66.61, 76.7, 77.01, 77.33, 122.38, 125.34. IR: 640.43, 1038.57, 1188.84, 1736.27, 2850.34, 2928.13, 3324.16. GC-Ms: 421.0, 355.17, 327.23, 281.17, 267.1, 207.18, 191.24, 73.11, 56.08.

Acetonide (30) of Methyl Shikimate

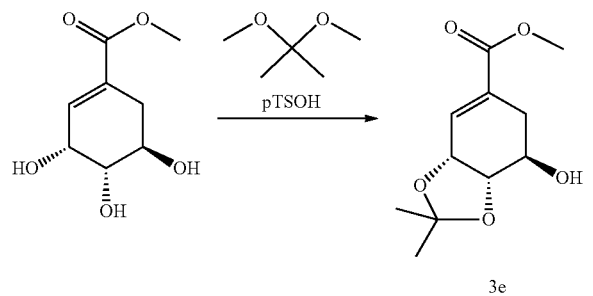

3e

In a round bottom flask methyl shikimate (0.86 g, 4.6 mmol) was added to a solution of 2,2-dimethoxypropane (12 ml) and p-TsOH (24 mg, 0.13 mmol). Reaction mixture was stirred for 15 minutes at RT. After 15 minutes mixture was checked with TLC plate. There was a new product with some starting material. So again, mixture was stirred for 15 minutes and checked with TLC. There was still starting material appeared so 5% of p-TsOH (1.2 mg, 0.0065 mmol) was added again and stirred again for 30 minutes. After that time some by products appeared while some starting material persisted. The reaction was terminated by neutralization with saturated NaHCO$_3$ and extracted with ether. The organic phase was dried over MgSO$_4$ and concentrated to give an oil product. Separation was performed with a silica gel column made up with 75% of hexanes and 25% of ethyl acetate. A colorless oil product was obtained. Yield—0.53 g (53%). Product is: Methyl-3,4-isopropylidene-(−)-shikimate. $^1$HNMR (400 MHz, CDCl$_3$) δ 1.36 (6H, s), 2.56 (1H, dd), 2.65 (1H, dd), 3.83 (3H, s), 3.92 (1H, dd), 4.21 (1H, ddd), 5.1 (1H, dd), 6.71 (1H, d). $^{13}$CNMR (400 MHz, CDCl$_3$) δ 25.7, 27.1, 29.3, 52.1, 68.6, 72.2, 77.8, 109.7, 130.5, 134.0, 166.62.

Diels-Alder Product (4a) of S-Alpha-Phellandrene (4)

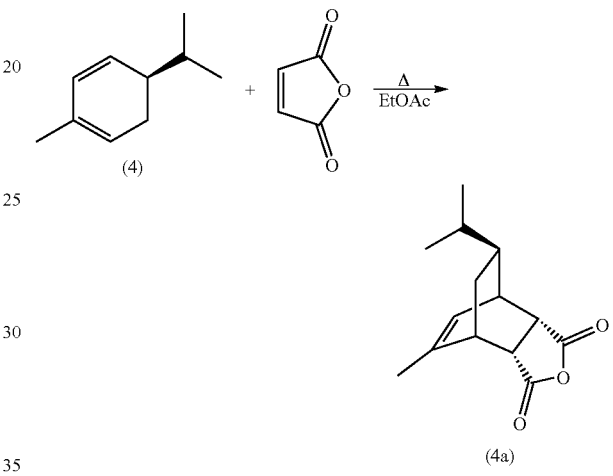

(4)

(4a)

In a 500 ml recovery flask with stir bar was placed maleic anhydride (4.90 g, 50.0 mmol) and ethyl acetate (20 ml). The mixture was stirred until all was dissolved and then α-phellandrene (7.92 g, 86% pure, 50.0 mmol) was added to give a yellow solution (charge transfer color). The mixture was stirred overnight at room temperature and the color was discharged. The mixture was boiled for two hours to ensure completion of reaction. The mixture was cooled with stirring to give a white precipitate of crystalline product to which heptane (20 ml) was added. The solid product was isolated by suction filtration, washed with some heptane and air-dried. The product was isolated in two crops totaling 9.198 g (79%). $^1$H-NMR (CDCl$_3$, 400 MHz): δ=0.89 (dd, 6H, isopropyl), 1.045-1.131 (m, 2H), 1.147-1.323 (m, 1H), 1.766-1.829 (m, 4H), 2.978-3.235 (m, 4H), 5.787 (d, 1H, alkene H).

4-Iodoanilide (4b) of 4a

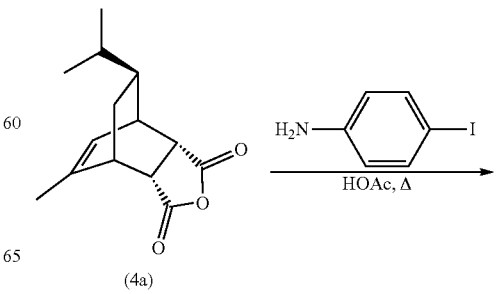

(4a)

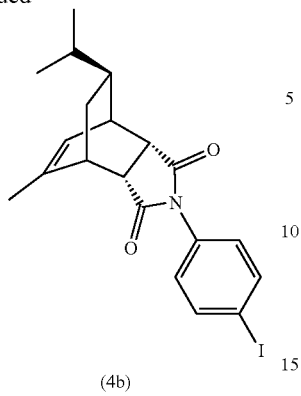

(4b)

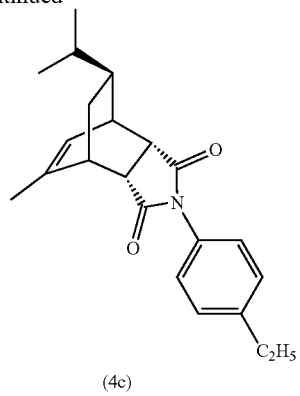

(4c)

In a 100 ml recovery flask was placed 4-iodoaniline (2.19 g, 10.0 mmol) and dry tetrahydrofuran (10 ml). The mixture was stirred, and the anhydride was added incrementally (0.585 g, 2.5 mmol) every 15 minutes and a thin layer chromatography sample was removed prior to 15 min after each addition. After the first addition a new more polar product was seen but by the time addition was complete it appeared that little reaction progress had been made. The flask was fitted with a KR bulb as condenser and the solution was boiled for 15 minutes. Thin layer chromatography showed little reaction progress. Now acetic acid (20 ml) was added and the flask was fitted with a solvent stripper. The solution was heated, and 15 ml of volatile solvent was distilled out. Now thin layer chromatography showed the presence of new product slightly less polar than the 4-iodoaniline and the absence of 4-iodoaniline and the initially formed intermediate. The reaction mixture was cooled, and water was added dropwise with stirring to produce a voluminous precipitate. This solid was collected by suction filtration, washed well with water and air dried. This material was recrystallized from 1-propanol and was collected in two crops totaling 4.096 g (94%). Melting Point=162.5-164.5° C. 1H-NMR (CDCl$_3$, 400 MHz): δ=0.89 (dd, 6H, isopropyl), 1.07-1.16 (m, 2H), 1.30-1.40 (m, 1H), 1.58-1.61 (m, 1H), 1.80-1.85 (m, 3H), 2.90-3.01 (m, 2H), 3.23-3.26 (m, 1H), 3.60 (t, 1H), 5.73 (d, 1H, alkene H), 6.91-6.93 (m, 2H), 7.75-7.75 (m, 2H). 13C-NMR (CDCl$_3$, 100 MHz): δ=20.5, 20.6, 21.1, 25.9, 30.7, 33.2, 35.7, 38.2, 43.6, 45.1, 45.9, 93.7, 122.0, 128.2 (2C), 131.7, 138.3 (2C), 141.7, 177.6, 177.9.

4-Ethylanilide (4c) of 4a

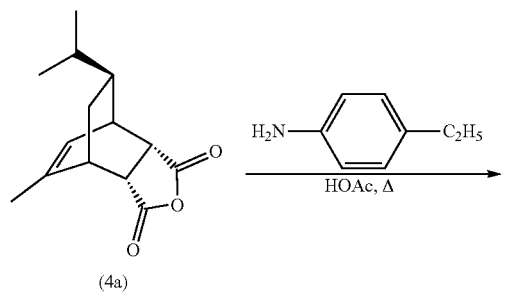

(4a)

In a 100 ml recovery flask was placed 4-ethylaniline (0.62 g, 5.0 mmol) and acetic acid (10 ml). The anhydride (1.17 g, 5.0 mmol) was added and the mixture was gradually warmed in an oil bath to boiling. The mixture was boiled for thirty minutes and thin layer chromatography indicated the absence of the 4-ethylaniline. The mixture was cooled to room temperature and water was added dropwise with stirring to fill the flask. The solid was isolated by suction filtration, washed well with water and then recrystallized from a mixture of methanol and water to give the product as white crystals (1.59 g, 96%). Melting Point=125.5° C. 1H-NMR (CDCl$_3$, 400 MHz): δ=0.88 (dd, 2H, isopropyl), 1.07-1.11 (m, 2H), 1.23 (t, 3H), 1.32-1.39 (m, 1H), 1.79-1.84 (m, 4H), 2.65 (q, 2H), 2.90-3.01 (m, 1H), 3.23-3.26 (m, 1H), 3.75 (d, 1H, alkene H), 7.03-7.05 (m, 2H), 7.25-7.27 (m, 2H). 13C-NMR (CDCl$_3$, 100 MHz): δ=15.4, 20.5, 20.7, 21.1, 28.6, 30.8, 33.3, 35.7, 38.2, 43.6, 45.1, 45.9, 122.0, 126.3 (2C), 128.7 (2C), 129.5, 141.6, 144.8, 178.2, 178.5.

2-Biphenylimide (4d) of 4a

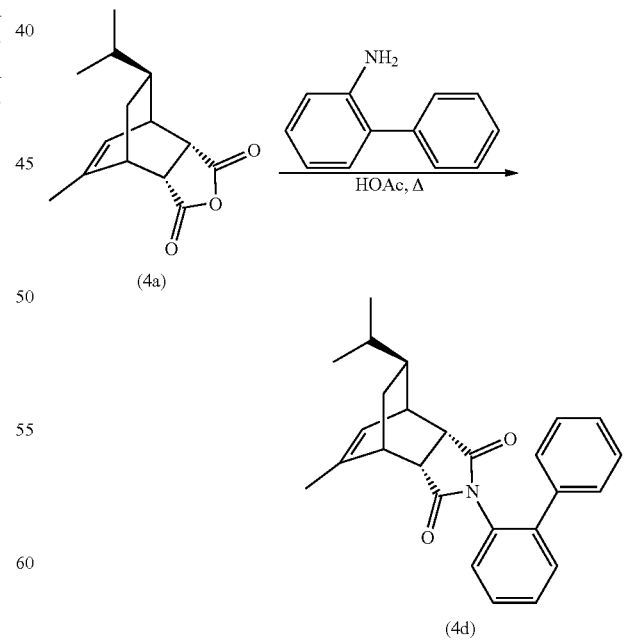

(4d)

In a 100 ml recovery flask was placed 2-aminobiphenyl (0.85 g, 5.0 mmol) and acetic acid (10 ml). The anhydride (1.17 g, 5.0 mmol) was added and the mixture was gradually warmed in an oil bath to boiling. The mixture was boiled for ninety minutes and thin layer chromatography indicated the absence of the 2-aminobiphenyl. The mixture was cooled to room temperature and water was added dropwise with stirring to fill the flask. The solid was isolated by suction filtration, washed well with water and air-dried (1.91 g, 99%). The crude material obtained is checked at this point by NMR prior to recrystallization and appears to be a mixture of isomers (the vinyl protons are the best indication and appear at δ 5.1 and δ 5.7 in a ratio of ~1:4). Of this material 1.8 g is taken on to recrystallization from methanol (1.034 g and this material shows the same vinyl protons at δ 5.1 and δ 5.7 in a ratio of ~2:3. Melting Point=139.5-140.5° C. 1H-NMR (CDCl$_3$, 400 MHz): δ=0.77-1.30 (m), 1.55-1.80 (m), 2.64-3.25 (m), 5.08 (d, alkene H, isomer I), 5.75 (d, alkene H, isomer II), 6.95-7.80 (m), 7.20-7.47 (m). 13C-NMR (CDCl$_3$, 100 MHz): δ=20.5, 20.6, 20.7, 21.1, 30.4, 30.6, 33.2, 35.2, 35.5, 37.2, 38.0, 43.4, 44.9, 45.1, 45.8, 46.0, 46.03, 121.7, 122.0, 127.4, 127.6, 128.1, 128.2, 128.3, 128.4, 128.5, 128.6, 1287, 128.9, 129.2, 129.6, 130.1, 130.7, 131.8, 138.6, 140.9, 141.2, 141.7, 141.9, 178.1, 178.5. Note: 1H-NMR and 13C-NMR spectra have more signals than the number of signals anticipated likely due to the presence of rotational isomers.

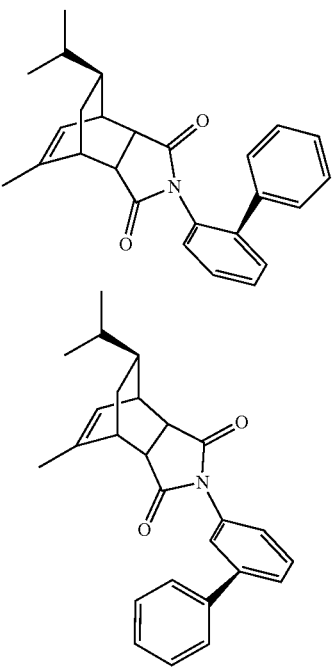

3,5-Dimethoxyanilide (4e) of 4a

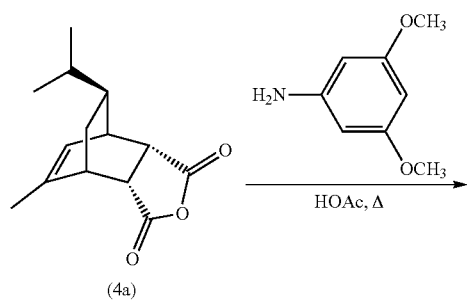

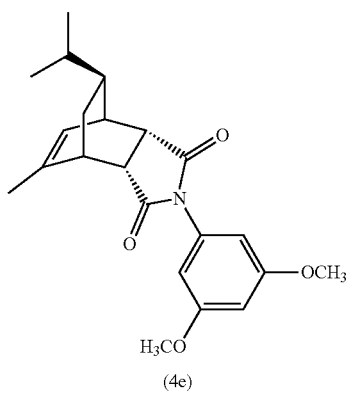

(4e)

In a 100 ml recovery flask was placed 3,5-dimethoxyaniline (0.77 g, 5.0 mmol) and acetic acid (10 ml). The mixture was warmed in an oil bath to 60° C. and the anhydride (1.17 g, 5.0 mmol) was added. The resulting mixture was refluxed for two hours after which time thin layer chromatography showed the reaction was complete. The mixture was cooled and water was added dropwise to produce a sticky solid that could not be filtered. The mixture was next transferred to a separatory funnel with ethyl acetate and the phases were separated. The organic phase was washed with washed with water and then transferred to a one-liter round bottom flask, silica gel was added (25 g) and the mixture was concentrated to dryness. This material was placed at the top of a silica gel column made up with 5% ethyl acetate/95% hexanes and eluted with a quick gradient up to 20% ethyl acetate. Fractions containing the pure product were combined and concentrated to a viscous oil that solidified under vacuum overnight. This material was crystallized as large clear rhombs from methanol. Yield=1.62 g (88%). Melting Point=N/A. 1H-NMR (CDCl$_3$, 400 MHz): δ=0.88 (dd, 6H, isopropyl H), 1.06-1.18 (m, 2H), 1.33-1.39 (m, 1H), 1.79-1.86 (m, 4H), 2.89-3.00 (m, 3H), 3.24-3.25 (m, 1H), 3.77 (s, 6H, —OCH3×2), 5.75 (d, 1H, alkene H), 5.26-5.27 (m, 2H), 6.46-6.47 (m, 1H).

4'-Pentyl-4-Biphenylanilide (4) Synthesized from 4b

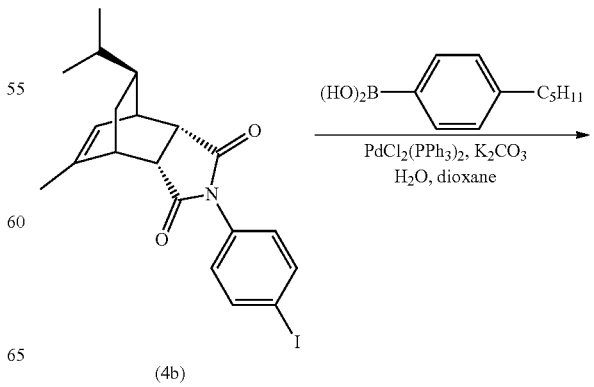

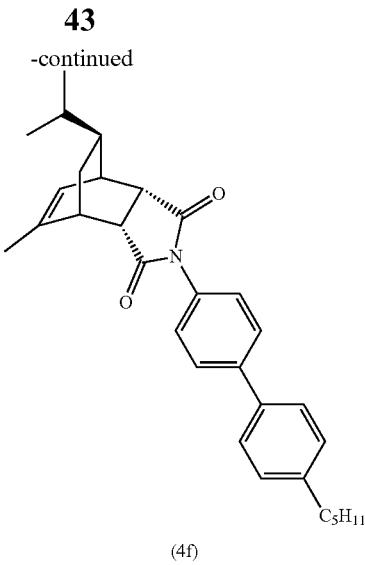

(4f)

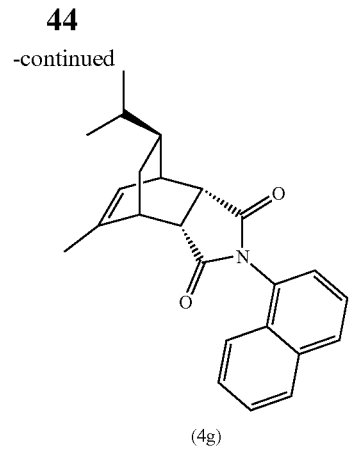

(4g)

In a 500 ml round bottom flask containing the iodide precursor (1.09 g, 2.5 mmol) was placed the 4-pentylphenylboronic acid (0.72 g, 3.75 mmol), dioxane (25 ml) and water (10 ml). The flask was fitted with a condenser and nitrogen inlet and the mixture was stirred and potassium carbonate (1.03 g, 7.5 mmol) was added and the mixture was warmed to 70 in an oil bath while degassing with nitrogen. The catalyst PdCl2(PPh3)2 (35 mg, 2%) was added and the reaction was kept at 95° C. for three hours. It was not clear from thin layer chromatography that the reaction was complete (unable to clearly differentiate the starting material and product) but all the palladium had precipitated out as metal and so the reaction was terminated. The mixture was cooled and water (125 ml) was added with stirring. A crystalline compound precipitated out and was collected by suction filtration, washed well with water and air dried (crude yield=1.330 g). The crude product was examined by 1H-NMR and it looked like the correct product so it was absorbed on 15 cc of silica gel and placed on the top of a silica gel column made up with 20% ethyl acetate/80% hexanes to elute (Solvent: ethyl acetate/hexane 1:4, polarity of the solvent was gradually increased up to 1:3). Concentration of fractions provided solid product which was recrystallized from methanol (Yield=0.949 g, 83.5%). Melting Point=195.0-196.0° C. 1H-NMR (CDCl$_3$, 400 MHz): δ=0.88 (dd, 6H, isopropyl), 0.90-0.94 (m, 3H), 1.17-1.20 (m, 2H), 1.33-1.37 (m, 5H), 1.55-1.67 (m, 2H), 1.81-1.88 (m, 4H), 2.64 (q, 2H), 2.90-3.02 (m, 3H), 3.26-3.28 (m, 1H), 5.75 (d, 1H), 7.19-7.26 (m, 4H), 7.55 (m, 4H). 13C-NMR (CDCl$_3$, 100 MHz): δ=14.1, 20.5, 20.7, 21.1, 22.6, 30.8, 31.2, 31.6, 33.3, 35.6, 35.7, 38.2, 43.7, 45.2, 46.0, 122.0, 126.7 (2C), 126.1 (2C), 127.8 (2C), 128.9 (2C), 130.8, 137.6, 141.6, 141.7, 142.6, 178.1, 178.4.

1-Naphthylimide (4g) of 4a

In a 100 ml recovery flask with stir bar was placed 1-napthylamine (0.712 g, 5.0 mmol) and acetic acid (10 ml). The mixture was made homogenous by stirring at room temperature and then the anhydride (1.170 g, 5.0 mmol) was added. After two hours thin layer chromatography indicated the formation of no product and so the mixture was refluxed overnight. Reaction was monitored by thin layer chromatography, which indicated all the reactant consumed to give product. The workup involved addition of 50 ml of cold water was added drop wise with stirring and the solid product was isolated by suction filtration. The product was then absorbed on 20 cc of silica gel with 50 ml of ethyl acetate. The absorbed material was placed on the top of the silica gel made up with ethyl acetate/hexane 1:9 to elute (solvent: ethyl acetate/hexane 1:9, the polarity of the solvent increased gradually up to 1:1). Concentration of the fractions provided solid product. The thin layer chromatography of the product showed two spots indicating the presence of rotational isomers. 0.224 g of crude product was kept separately and rest of the product was recrystallized from methanol/water. Finally, product was collected in two crops (crude=0.224 g and recrystallized=1.336 g) totaling 1.560 g (Yield=87%). Melting Point=144.8-145.8° C. 1H-NMR (Recrystallized product, isomer mixture) (CDCl$_3$, 400 MHz): δ=0.89 (dd), 1.13-1.22 (m), 1.42-1.56 (m), 1.86-1.93 (m), 3.09-3.11 (m), 3.36 (dd), 5.85 (d), 6.03 (d), 7.05-7.26 (m), 7.56-7.46 (m), 7.87-7.92 (m). 13C-NMR (Recrystallized product, isomer mixture) (CDCl$_3$, 100 MHz): δ=20.8, 21.1, 21.2, 30.7, 30.8, 33.2, 33.3, 35.5, 35.8, 38.0, 38.3, 43.8, 44.6, 45.2, 45.5, 46.2, 46.4, 122.1, 122.2, 122.3, 123.1, 125.4, 125.9, 126.2, 126.4, 126.5, 126.8, 127.0, 128.5, 128.6, 129.0, 129.2, 129.4, 129.6, 129.8, 129.9, 134.4, 141.8, 142.5, 178.4, 178.6, 178.7. Note: 1H-NMR and 13C-NMR spectrums have more signals than the number of signals anticipated likely due to the presence of two rotational isomers.

Diacetyl Ester (5a) of Betulin (5)

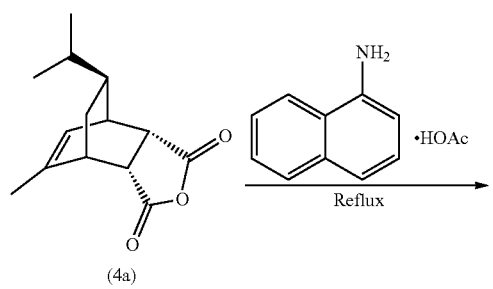

(4a)

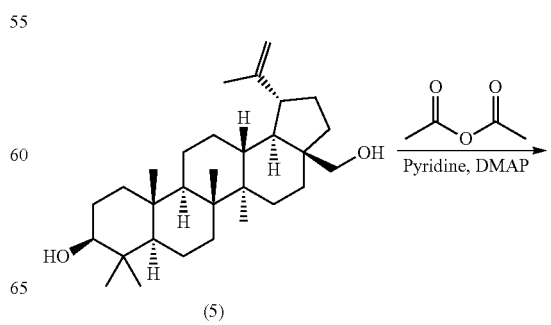

(5)

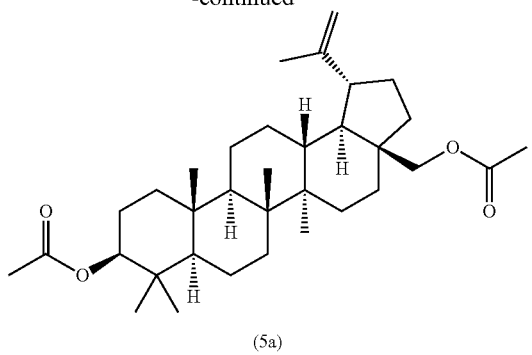

(5a)

In a 100 ml recovery flask with stir bar was placed betulin (0.443 g, 1.0 mmol), dry pyridine (10 ml), acetic anhydride (0.306 g, 3.0 mmol), and 4-dimethylaminopyridine (12.2 mg). The mixture was stirred under nitrogen atmosphere at room temperature overnight. Thin layer chromatography indicated all the reactant consumed to give one less polar product. Then 25 ml water and 25 ml dichloromethane was added drop wise with stirring. The mixture was made acidic by adding 10% hydrochloric acid and the organic phase was extracted with dichloromethane (3×25 ml), washed and dried over magnesium sulfate. The product was then absorbed on 15 cc of silica gel and the absorbed material was placed on the top of the silica gel column made up with ethyl acetate/hexane 1:9 solvent to elute (Solvent: ethyl acetate/hexane 1:9, polarity of the solvent was gradually increased up to 1:3). Concentration of the fractions containing the product provided white solid that was recrystallized from methanol (Yield=0.349 g, 61%). Melting Point=220-221° C.
1H-NMR (400 MHz, CDCl$_3$): δ=0.83 (s, 3H), 0.84 (s, 3H), 0.97 (s, 3H), 1.03 (s, 3H), 1.39 (s, 3H), 1.68 (s, 3H), 2.04 (s, 3H), 2.07 (s, 3H), 2.40-2.49 (m, 1H), 3.84 (d, 1H), 4.24 (d, 1H), 4.46 (dd, 1H), 4.59 (s, 1H), 4.69 (s, 1H).

Diheptanoyl Ester (5b) and Betulin-28-Heptanoate (5c) from Betulin (5)

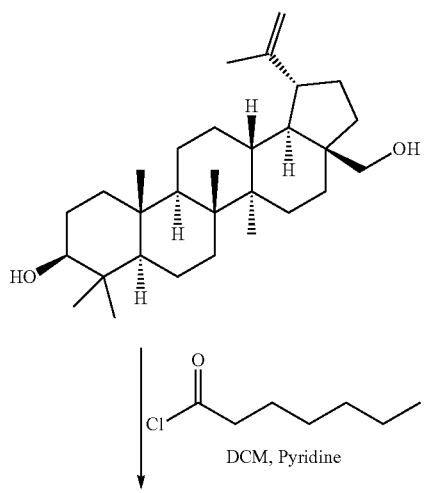

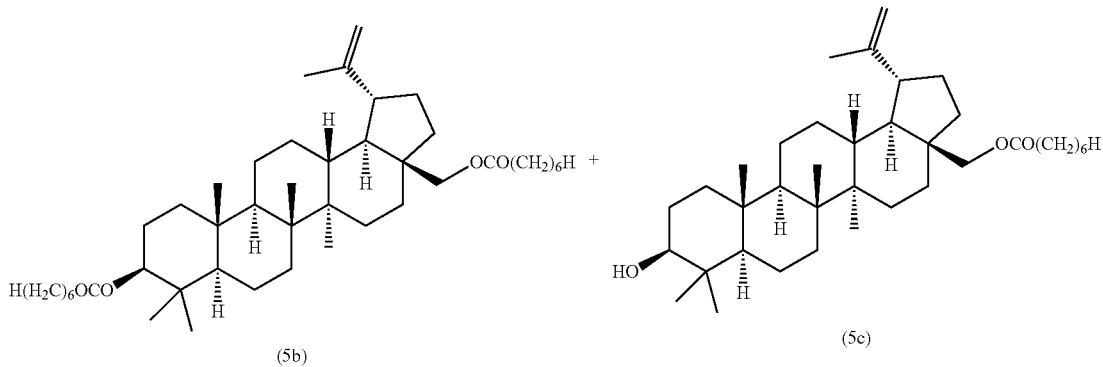

(5b)      (5c)

In a 100 ml recovery flask with stir bar was placed betulin (0.443 g, 1.0 mmol), dry dichloromethane (10 ml), heptanoyl chloride (0.327 g, 2.2 mmol) and pyridine (1 ml). The mixture was protected under nitrogen atmosphere and was stirred at room temperature overnight. After 3 hours, additional heptanoyl chloride (0.149 g, 1.0 mmol) was added to ensure the completion of reaction and the mixture was stirred overnight. Thin layer chromatography indicated formation of two compounds one slightly polar and one less polar. Then 50 ml of cold water was added dropwise with stirring but no solid ppt. was observed and so the product was extracted with dichloromethane (3×25 ml), washed with water and dried over anhydrous magnesium sulfate. Solvent was evaporated and the liquid obtained was absorbed on 15 cc of silica gel with 50 cc of ethyl acetate. The absorbed material was placed on the top of the silica gel made up with ethyl acetate/hexane 1:9 to elute (solvent: ethyl acetate/hexane 1:9, the polarity of the solvent was gradually increased up to 1:3). Concentration of fractions containing the individual pure products provided two different colorless viscous liquids. They are identified as monoester and diester. Data for monoester: Yield=0.300 g, 45%. 1H-NMR (CDCl$_3$, 400 MHz): δ=4.68 (d, 1H), 4.58-4.61 (m, 1H), 4.44-4.49 (m, 1H), 4.25 (d, 1H), 3.83 (d, 1H), 2.40-2.50 (m, 1H), 2.27-2.34 (m, 3H), 1.90-2.00 (m, 1H), 1.41-2.34 (m, 15H), 1.10-1.41 (m, 17H), 1.06-1.15 (m, 2H) 1.01 (s, 3H), 0.90 (s,), 0.83-0.89 (m, 12H), 0.77-0.79 (m, 1H). 13C-NMR (CDCl$_3$, 100 MHz): δ=14.0, 14.7, 16.0, 16.2, 16.6, 18.2, 19.1, 20.8, 22.5, 23.7, 25.0, 25.1, 27.0, 27.9, 28.9, 29.6, 29.7, 31.4, 34.1, 34.5, 34.6, 34.9, 37.1, 37.5, 37.8, 38.4, 40.8, 42.7, 46.4, 47.7, 48.8, 50.3, 55.4, 62.5, 109.9, 150.2, 173.7, 174.4. Data for diester: Yield=0.343 g, 51%. 1H-NMR (CDCl$_3$, 400 MHz): δ=4.68 (d, 1H), 4.58-4.59 (m, 1H), 4.25 (d, 1H), 3.83 (d, 1H), 3.16-3.21 (m, 1H), 2.40-2.50 (m, 1H), 2.30-2.37 (m, 4H), 1.45-2.01 (m, 17H), 1.15-1.43 (m, 23H), 1.04-1.14 (m, 2H), 1.02 (s, 3H), 0.90-1.00 (m, 5H), 0.84-0.93 (m, 8H), 0.82 (s, 3H), 0.67-0.69 (m, 1H). 13C-NMR (CDCl$_3$, 100 MHz): δ=14.0 (2×C), 14.8, 15.4, 16.0, 16.1, 18.3, 19.1, 20.8, 22.5, 22.5, 24.7, 25.0, 25.2, 27.0, 27.3, 28.0, 28.7, 28.8, 29.6, 29.8, 31.4, 31.5, 33.9, 34.2, 34.5, 34.6, 37.1, 37.6, 38.7, 38.8, 40.9, 42.7, 46.4, 47.7, 48.8, 50.4, 55.3, 62.5, 79.0, 109.8, 150.2, 174.4, 179.2.

Dibutanoyl Ester (5d) and Betulin-28-Butanoate (5e) from Betulin (5)

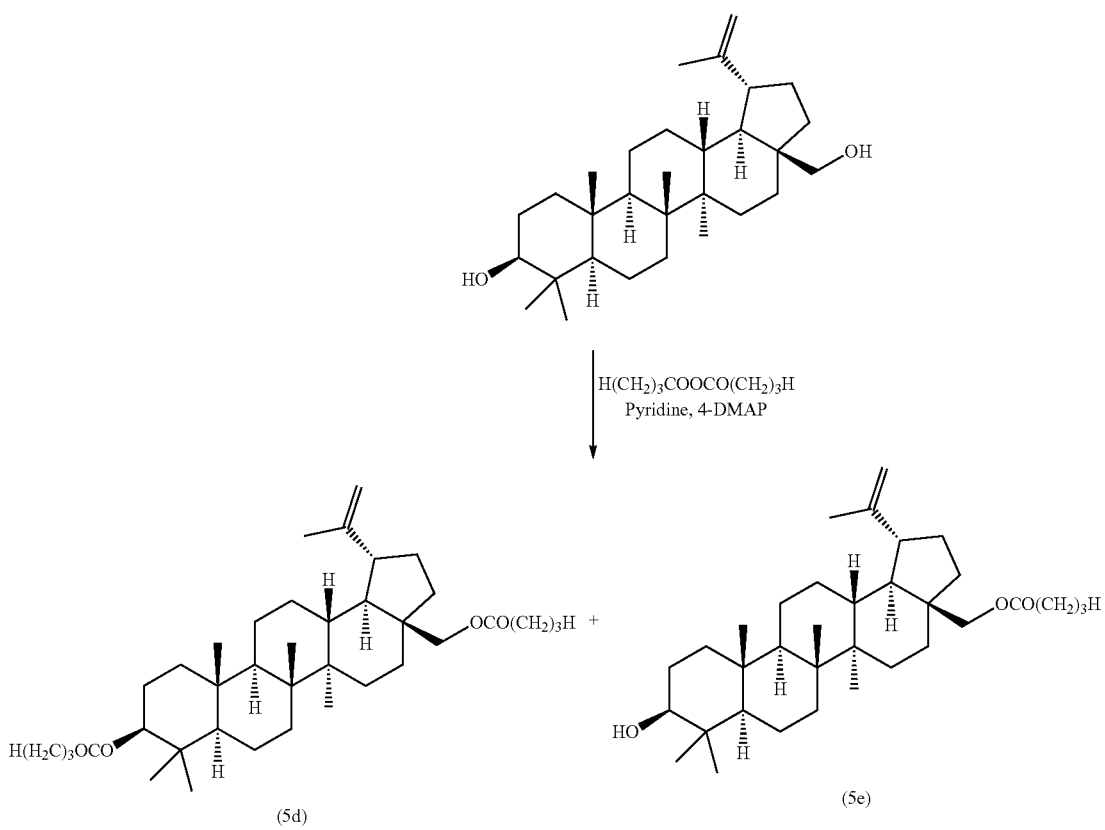

(5d)

(5e)

In a 100 ml recovery flask with stir bar was placed betulin (0.443 g, 1.0 mmol), pyridine (10 ml), butyric anhydride (0.475 g, 3.0 mmol), and 4-dimethylaminopyridine (12.2 mg). The mixture was stirred under nitrogen atmosphere at room temperature overnight (though the reactant was completely consumed after one hour). Thin layer chromatography indicated formation of two new compounds (one slightly polar and other less polar). Then 50 ml of ice-cold water was added dropwise with stirring. No precipitate was observed even after making the solution acidic by adding 10% hydrochloric acid and so the product was extracted with dichloromethane (25×3 ml), washed with water and dried over anhydrous magnesium sulfate. The product was then absorbed on 15 cc of silica gel and solvent was evaporated to dryness. Then the absorbed material was placed on the top of the silica gel column made up with ethyl acetate/hexane 1:9 to elute (solvent: ethyl acetate/hexane 1:9, the polarity of the solvent was gradually increased up to 1:3). Concentrations of the fractions containing the individual pure products provided two colorless solids which were identified as monoadduct and diadduct. Data for Monoadduct (Recrystallized from isooctane): Yield=0.029 g, 5%. Melting Point=149.5-150.5° C. 1H-NMR (CDCl₃, 400 MHz): δ=4.68 (d, 1H), 4.58-4.60 (m, 1H), 4.45-4.50 (m, 1H), 4.26 (dd, 1H), 3.84 (d, 1H), 2.41-2.49 (m, 1H), 2.27-2.33 (m, 3H), 1.90-2.00 (m, 1H), 1.71-1.86 (m, 2H), 1.59-1.70 (m, 9H), 1.56 (s, 3H), 1.48-1.53 (m, 1H), 1.35-1.44 (m, 4H), 1.15-1.32 (m, 5H), 1.04-1.13 (m, 2H), 1.03 (s, 3H), 0.93-0.97 (m, 7H), 0.83-0.89 (m, 9H), 0.77-0.81 (m, 1H). 13C-NMR (CDC, 100 MHz): δ=13.7, 14.7, 15.4, 16.0, 16.1, 18.2, 18.5, 19.1, 20.8, 25.2, 27.0, 27.4, 27.9, 29.6, 29.8, 34.1, 34.6, 36.4, 37.2, 37.6, 38.7, 38.9, 40.9, 42.7, 46.4, 47.7, 48.8, 55.3, 62.5, 79.0, 109.8, 150.2, 174.2. Data for diadduct (Recrystallized from methanol): Yield=0.362 g, 62%. Melting Point=102-104° C. 1H-NMR (CDCl₃, 400 MHz): δ=4.68 (d, 1H), 4.58-4.59 (m, 1H), 4.26 (dd, 1H), 3.85 (d, 1H), 3.16-3.20 (m, 1H), 2.41-2.49 (m, 1H), 2.31 (t, 2H), 1.91-2.05 (m, 1H), 1.50-1.87 (m, 16H), 1.34-1.45 (m, 5H), 1.15-1.33 (m, 8H), 1.05-1.15 (m, 1H), 1.03 (s, 3H), 0.93-0.99 (m, 8H), 0.85-0.89 (m, 5H), 0.82 (s, 3H), 0.76 (s, 3H), 0.76 (s, 3H), 0.67-0.69 (m, 1H). 13C-NMR (CDCl₃, 100 MHz): δ=13.7, 14.7, 16.0, 16.1, 16.6, 18.1, 18.5, 18.6, 19.1, 20.8, 23.7, 25.2, 27.0, 28.0, 29.6, 29.8, 34.1, 34.6, 36.4, 36.7, 37.1, 37.6, 37.8, 38.4, 40.9, 42.7, 46.4, 47.7, 48.8, 50.3, 55.4, 62.5, 80.6, 109.8, 150.2, 173.4, 174.2.

Di-p-Toluyl Ester (5f) of Betulin (5)

1:3 to elute (solvent: ethyl acetate/hexane 1:3). Concentration of the fractions provided a solid product which was recrystallized from 1-PrOH (Yield=0.089 g, 13%). Melting Point=207-209° C. 1H-NMR (CDCl₃, 400 MHz): δ=7.91-7.95 (m, 4H), 7.22-7.25 (m, 4H), 4.68-4.73 (m, 2H), 4.61-4.62 (m, 1H), 4.51 (d, 1H), 4.07 (d, 1H), 2.49-2.57 (m, 1H), 2.39-2.43 (m, 6H), 1.72 (s, 3H), 1.57 (s, 6H), 1.06 (s, 3H), 1.02 (s, 3H), 0.99 (s, 3H), 0.91 (s, 3H). 13C-NMR (CDCl₃, 100 MHz): δ=14.1, 14.8, 16.1, 16.2, 16.8 (×2C), 18.2, 19.2, 20.9, 21.6, 21.7, 22.7, 23.8, 25.2, 27.2, 28.1, 29.7, 30.0, 34.1, 34.7, 37.1, 37.7, 38.2, 38.4, 40.9, 42.8, 46.7, 47.8, 48.9, 50.3, 55.5, 63.1, 81.3, 109.9, 127.8, 128.3, 129.0, 129.1, 129.5, 129.6 (×2C), 143.3, 143.5, 150.2, 166.4, 167.1.

Dimethyl Ether (5g) of Betulin

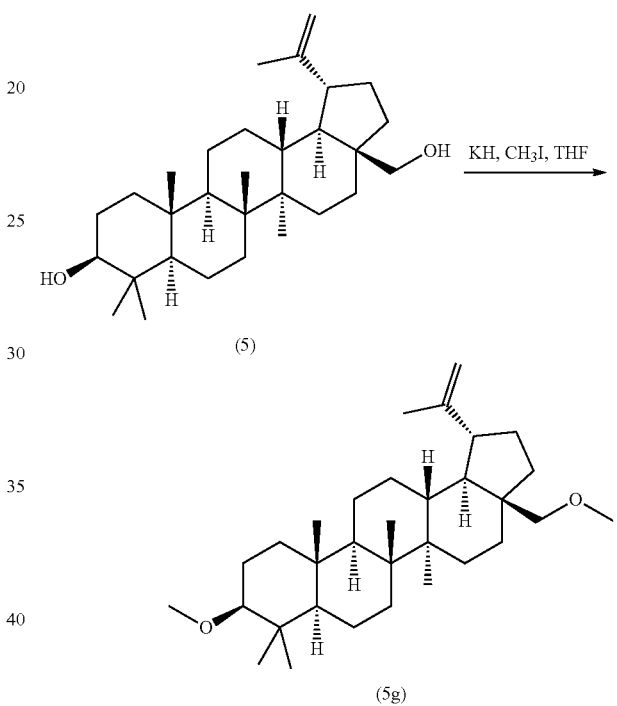

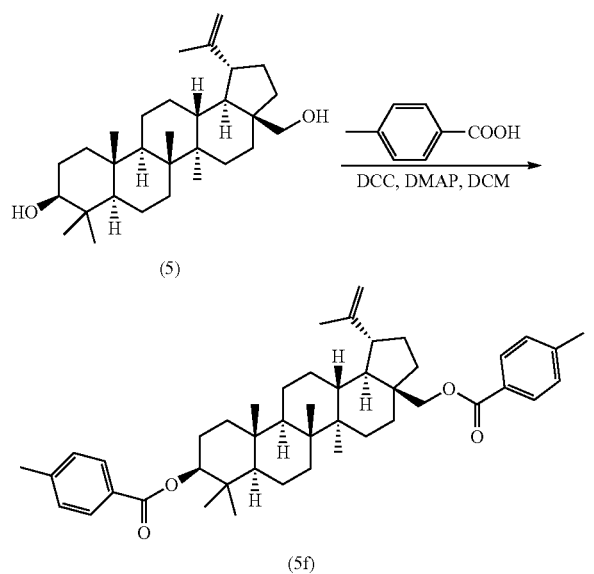

In a 100 ml recovery flask with stir bar was placed betulin (0.443 g, 1.0 mmol), p-toluic acid (0.286 g, 2.1 mmol), N,N'-dicyclohexylcarbodiimide (0.433 g, 2.1 mmol), 4-dimethylaminopyridine (0.122 g, 1.0 mmol) and dry dichloromethane (20 ml). The mixture was stirred at room temperature under nitrogen atmosphere for 5 hours. Thin layer chromatography indicated all the reactant consumed to give single product. Then, 50 ml of ice-cold water was added dropwise with stirring. No product was observed even after making the mixture acidic by adding 10% hydrochloric acid and so the product was extracted with dichloromethane (25×3 ml), washed and dried over magnesium sulfate. The product was then absorbed on 15 cc of silica gel with 50 ml of ethyl acetate. The absorbed material was placed on the top of the silica gel column made up with ethyl acetate/hexane In 100 ml recovery flask with stir bar was placed betulin (0.442 g, 1.0 mmol), dry tetrahydrofuran 10 ml, potassium hydride (0.553 g, 4.0 mmol, 30% dispersed in mineral oil) and methyl iodide (0.568 g, 4.0 mmol). The mixture was stirred under nitrogen atmosphere at room temperature overnight (though the thin layer chromatography indicated all the starting material consumed to give single product after an hour). Then the mixture was made acidic by adding 5.5 ml of 10% hydrochloric acid and diluted by adding 50 ml of ice-cold water. The solid precipitate obtained was isolated by suction filtration and absorbed on 15 cc of silica gel with 50 ml of ethyl acetate. The solvent was evaporated to dryness and the absorbed material was placed on the top of the silica gel column made up with ethyl acetate/hexanes 1:9 to elute (solvent: ethyl acetate/hexanes 1:9). Concentration of the fractions containing the product provided white solid which was recrystallized from acetonitrile (Yield=0.429 g, 91%). Melting point=177-180° C. 1H-NMR (CDCl₃, 400 MHz): δ=1.68 (s, 3H), 2.63 (mt, 1H); 3.04 (d, 1H), 3.48 (d, 1H), 3.35 (s, 6H, 2×OCH3), 4.58 (m, 1H), 4.68 (m, 1H).

Dibenzyl Ether (5h) of Betulin

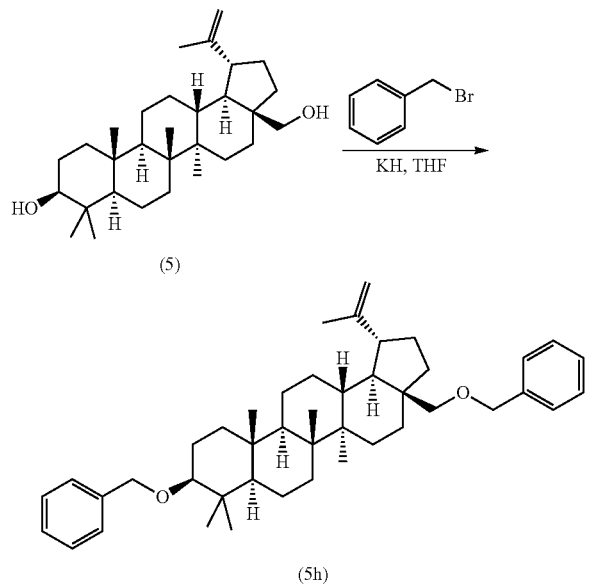

In a 100 ml recovery flask with stir bar was placed betulin (0.442 g, 1.0 mmol), dry tetrahydrofuran (10 ml), potassium hydride (0.553 g, 4.0 mmol, 30% dispersed in mineral oil) and benzyl bromide (0.513 g, 3.0 mmol). The mixture was stirred at room temperature overnight (though all the starting material was consumed to give single product as indicated by thin layer chromatography). Then 2 ml 10% hydrochloric acid was added dropwise and ice-cold water was added to fill the flask. The precipitate obtained was isolated by suction filtration, air dried and absorbed on 15 cc of silica gel with 50 cc of ethyl acetate. Solvent was evaporated and the absorbed material was placed on the top of the silica gel column made up with ethyl acetate/hexane 1:9 to elute (solvent: ethyl acetate/hexane 1:9). Concentration of fractions provided a solid product which was recrystallized from acetonitrile (Yield=0.596 g, 96%). Melting point=141-143° C. 1H-NMR (CDCl$_3$, 400 MHz): δ=7.25 (m, 10H), 4.40-4.46 (m, 6H), 3.50 (d, 1H), 3.09 (d, 1H), 2.88 (dd, 1H), 2.32-2.39 (m, 1H), 1.67 (s, 3H), 1.55 (s, 3H), 1.26 (s, 3H), 0.97 (s, 3H), 0.93 (s, 3H), 0.83 (s, 3H), 0.81 (s, 3H). 13C-NMR (CDCl$_3$, 100 MHz): δ=14.1, 14.8, 15.8, 16.1, 16.4, 18.3, 19.1, 20.8, 22.7, 22.9, 25.2, 27.1, 28.2, 29.4, 29.9, 30.0, 30.1, 31.9, 34.2, 34.9, 37.1, 37.4, 38.6, 39.0, 40.9, 42.6, 47.3, 47.9, 48.8, 50.4, 55.8, 68.0, 71.3, 73.4, 86.5, 109.5, 127.2, 127.5, 127.6, 128.2, 128.3, 139.0, 139.5, 150.8.

Di-Allyl-Ether (51) of 5

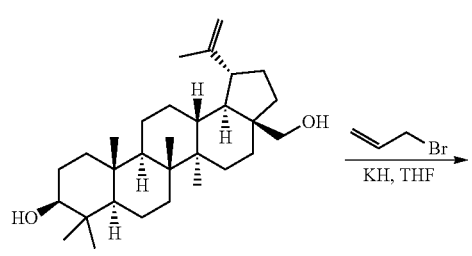

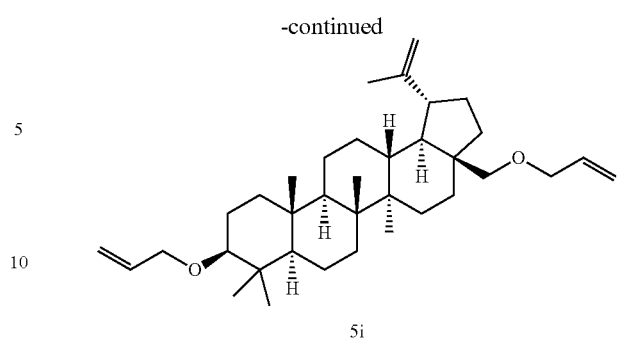

In a 100 ml recovery flask with stir bar was placed betulin (0.442 g, 1.0 mmol), dry THF (15 ml), potassium hydride (0.400 g, 3.0 mmol, 30% dispersed in mineral oil). The mixture was stirred at room temperature under nitrogen atmosphere overnight. After this time thin layer chromatography indicated all the starting material was consumed to give a single less polar product. For the workup 2 ml 10% hydrochloric acid was added dropwise and ice-cold water was added dropwise to fill the flask. The precipitate obtained was isolated by suction filtration, air dried and absorbed on 15 cc of silica gel with 50 cc of ethyl acetate. Solvent was removed and the absorbed material was placed at the top of the silica gel column made up with ethyl acetate/hexane 1:9 to elute (solvent: ethyl acetate/hexane 1:9). Concentration of the fractions provided solid product, which was recrystallized from acetonitrile (yield=0.510 g, 98%). Melting Point: 125-127° C. 1H-NMR (CDCl$_3$, 400 MHz): δ=5.88-5.97 (m, 2H), 5.11-5.30 (m, 4H), 4.62 (dd, 2H, H29), 3.85-4.15 (m, 4H, 2x—OCH2-), 3.53 (d, 1H, H28), 3.08 (d, 1H, H28), 2.79 (dd, 1H, H3), 2.40 (ddd, 1H, H19), 1.68 (s, 3H), 1.01 (s, 3H), 0.96 (s, 3H), 0.95 (s, 3H), 0.83 (s, 3H), 0.78 (s, 3H). 13C-NMR (CDCl$_3$, 100 MHz): δ=14.8, 16.0, 16.1, 16.3, 18.3, 19.11, 20.9, 23.1, 25.2, 27.2, 28.1, 29.7, 30.0, 34.2, 34.8, 37.1, 37.5, 38.6, 38.9, 41.0, 42.6, 47.2, 48.0, 48.9, 50.4, 55.8, 68.1, 70.7, 72.5, 86.3, 109.5, 115.9, 116.7, 135.4, 135.9, 150.8

Bis-Trifluoroacetyl Ester (51) of Betulin (5)

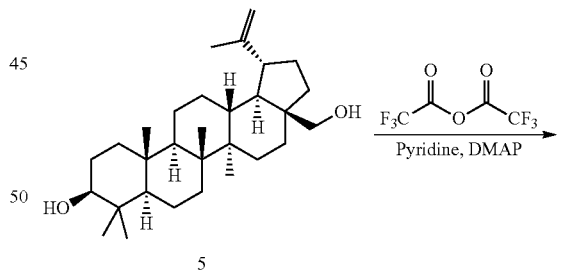

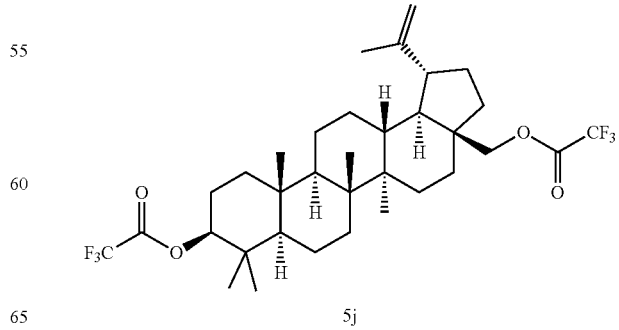

In a 100 ml recovery flask with stir bar was placed betulin (0.443 g, 1.0 mmol), dry pyridine (10 ml), trifluoroacetic anhydride (0.105 g, 5.0 mmol), and 4-dimethylaminopyridine (0.366 g, 3.0 mmol). The mixture was stirred under nitrogen atmosphere at room temperature for one hour. Thin layer chromatography indicated all the reactant was consumed to give one less polar product. The mixture was diluted with 20 ml of ethyl acetate and 15 ml of 10% hydrochloric acid was added dropwise with stirring. Then ice cold water added dropwise with stirring to fill the flask. No ppt was observed and so the organic phase was extracted with ethyl acetate (50×2 ml), washed with brine and dried over anhydrous MgSO$_4$. The product was then absorbed on 15 cc of silica gel with 50 ml of ethyl acetate. Solvent was removed and the absorbed material was placed at the top of the silica gel column made up with ethyl acetate/hexane 1:9 solvent to elute (Solvent: ethyl acetate/hexane 1:9). Concentration of the fractions provided solid product which was recrystallized from isooctane (Yield=0.162 gm, 26%). Melting Point=208-210° C. $^1$H NMR (400 MHz, CDCl$_3$): δ=4.60-2.72 (m, 3H), 4.57 (d, 1H), 4.13 (d, 1H), 2.40-2.47 (m, 1H), 1.69 (s, 3H), 1.05 (s, 3H), 0.99 (s, 3H), 0.90 (s, 3H), 0.89 (s, 3H), 0.88 (s, 3H). $^{19}$F NMR (376 MHz, CDCl$_3$) δ=−75.28 and −74.86 (s each, 2×CF$_3$).

Bis-Pentanoyl Ester (5k) of 5

In a 100 ml recovery flask with stir bar was placed betulin (0.443 g, 1.0 mmol), dry pyridine (10 ml), valeric anhydride (0.306 g, 5.0 mmol), and 4-dimethylaminopyridine (0.366 gm, 3.0 mmol). The mixture was stirred under nitrogen atmosphere at room temperature overnight. Thin layer chromatography indicated the complete consumption of starting material and the formation of single less polar product. The mixture was diluted with 25 ml ethyl acetate and made acidic by adding 10 ml 10% hydrochloric acid. The flask was then filled with ice cold water. No precipitate was observed and so the organic phase was extracted with ethyl acetate (2×50 ml), washed with brine and dried over MgSO$_4$. The product was then absorbed on 15 cc of silica gel with 50 ml of ethyl acetate. Solvent was removed by rotatory evaporation and the absorbed material was placed on the top of the silica gel column made up with ethyl acetate/hexane 1:9 to elute (Solvent: ethyl acetate/hexane 1-9). Concentration of the fractions provided a semisolid product which did not crystallize on long standing (Yield=0.583 gm, 96%). 1H-NMR (400 MHz, CDCl$_3$): δ=0.67-0.69 (m, 1H), 0.84 (s, 6H), 0.85 (s, 3H), 0.97 (s, 3H), 0.85-0.95 (m, 7H), 1.03 (s, 3H), 1.91-2.05 (m, 1H), 2.28-2.35 (m, 4H), 2.41-2.49 (m, 1H), 3.85 (d, 1H), 4.26 (dd, 1H), 4.41-4.49 (m, 1H), 4.48-4.59 (m, 1H), 4.68 (d, 11H). 13C-NMR (100 MHz, CDCl$_3$): δ=13.8, 14.7, 16.0, 16.2, 16.6, 18.2, 19.1, 20.8, 22.3 (2×C), 23.7, 25.1, 27.0, 27.1, 27.3, 28.0, 29.6, 29.8, 34.1, 34.3, 34.6 (2×C), 37.1, 37.6, 37.8, 38.4, 40.9, 42.7, 46.4, 47.7, 48.8, 50.3, 55.4, 62.5, 75.0, 80.6, 109.9, 150.2, 173.7, 174.4.

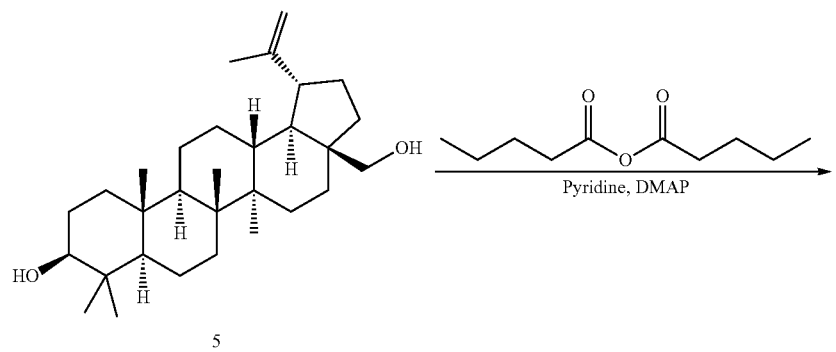

5

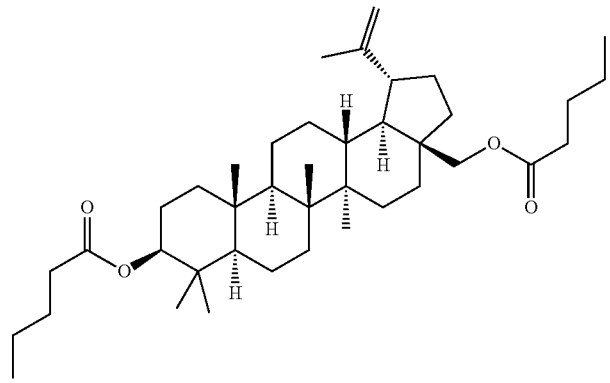

5k

Dihydrobetulin (5m)

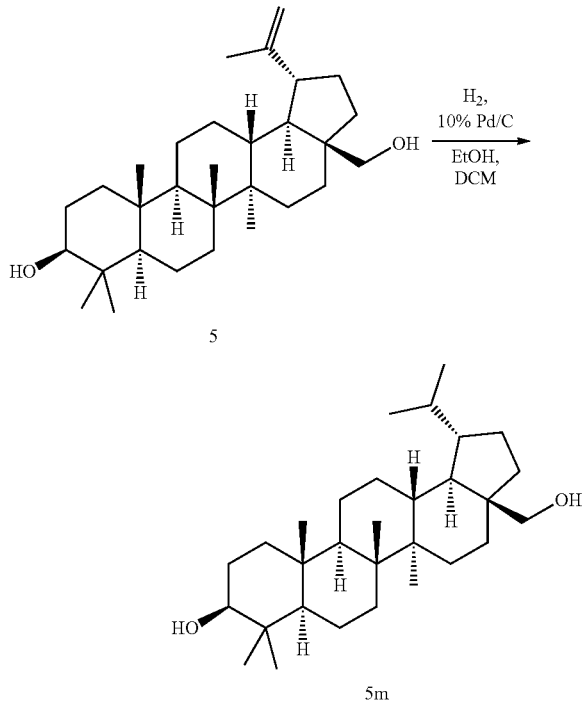

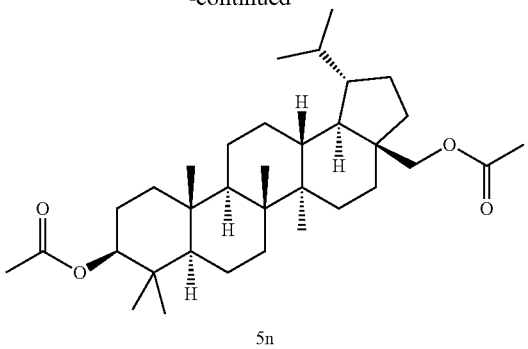

In a 200 ml recovery flask with stir bar was placed betulin (4.420 g, 10.0 mmol), ethanol (40 ml), anhydrous dichloromethane (40 ml) and 10% Pd on carbon (0.442 g). The flask was evacuated and backfilled with hydrogen gas from a hydrogen-balloon attached by means of an adaptor to the flask. The evacuation and backfilling process was repeated three times and then the mixture was stirred under hydrogen atmosphere at room temperature overnight. Then the mixture was diluted with 50 ml ethyl acetate and filtered through the short pad of Celite. The filter cake was washed with ethyl acetate and the solvent was removed and the solid obtained was triturated with water. The product was isolated by suction filtration and air dried. 1H-NMR showed the product formed was in pure form (Yield=2.490 gm, 56%). Melting point=269-271° C. 1H-NMR (400 MHz, CDCl$_3$): δ=0.76 (s, 3H), 0.77 (s, 3H), 0.77 (s, 3H), 0.83 (s, 3H), 0.85 (s, 3H), 0.96 (s, 3H), 0.97 (s, 3H), 1.03 (s, 3H), 3.20 (dd, 1H), 3.30 (d, 1H), 3.77 (d, 1H).

Di-Acetyl Ester (5n) of 5m

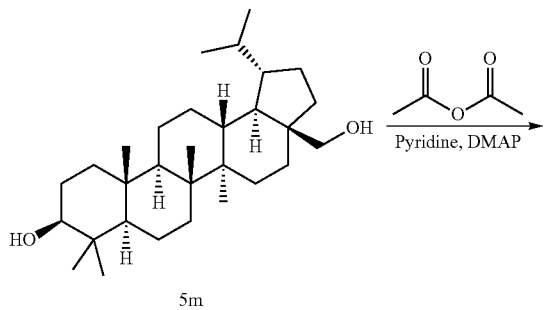

In a 100 ml recovery flask with stirbar was placed dihydrobetulin (0.444 gm, 1.0 mmol), pyridine (10 ml), 4-dimethyaminopyridine (0.061 g, 0.5 mmol) and acetic anhydride (0.306 g, 3.0 mmol). The mixture was stirred at room temperature under nitrogen atmosphere overnight. After which time, thin layer chromatography indicated the complete consumption of the starting material and the formation of single les polar product. Then, 50 ml of ice-cold water was added dropwise with stirring. The precipitate obtained was isolated by suction filtration, washed with water and air dried. The crude product obtained was then absorbed on 15 cc of silica gel with 50 ml ethyl acetate and evaporated to dryness. The absorbed material was placed at the top of the silica gel column made up with hexanes/ethyl acetate 4:1 to elute (solvent: hexanes/ethyl acetate 4:1). Concentration of the fractions containing product provided a solid which was recrystallized from isooctane (yield=0.404 g, 77%). Melting point=251-253° C. 1H-NMR (400 MHz, CDCl$_3$): δ=4.46 (dd, 1H), 4.24 (d, 1H), 3.82 (d, 1H), 2.08 (s, 3H, CH3CO—), 2.04 (s, 3H, CH$_3$CO—), 1.03 (s, 3H), 0.95 (s, 3H), 0.85 (s, 3H), 0.84 (s, 3H), 0.83 (s, 3H), 0.77 (d, 6H).

Racemic 1'-Phenylethyl-Malicimide (6a) from D (+)-Malic Acid (6)

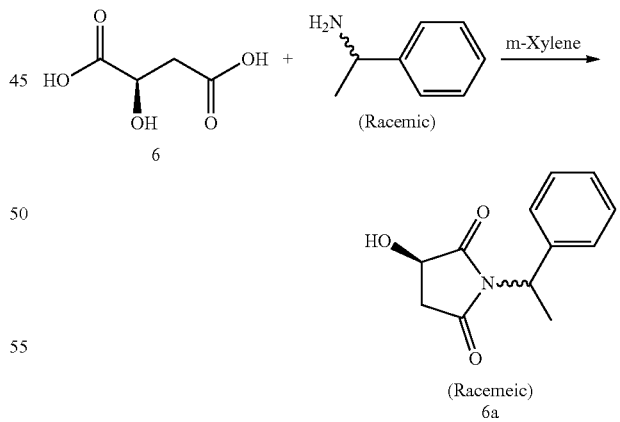

In a 100 ml recovery flask with stir bar was placed D-(+)-malic acid (1.056 g, 8.0 mmol), xylene (20 ml) and (±)-1-phenylethylamine (1.089 g, 9.0 mmol). A Kugelrohr bulb was fitted to the flask as a condenser and the mixture was refluxed for 7 hours under a nitrogen atmosphere. On refluxing a few drops of water were deposited on the inner wall of the bulb. Thin layer chromatography indicated all the starting material was consumed to give a single less polar product. The mixture was cooled in an ice bath and a viscous insoluble substance was obtained. The solvent was removed under vacuum and the product was absorbed on 15 cc of silica gel with 50 cc of ethyl acetate. Solvent was removed under reduced pressure and the absorbed material was placed on the top of a column made up with ethyl acetate/hexanes 1:1 to elute (Solvent: ethyl acetate/hexanes 1:1). Concentration of the fractions containing pure material provided a solid product which was recrystallized from isooctane (yield=0.501 g, 29%). Melting point: 85-87° C. 1H-NMR (CDC, 400 MHz): δ=1.82 (dd, 3H), 2.59-2.67 (m, 1H), 2.94-3.05 (m, 1H), 4.49-4.57 (m, 1H), 5.40 (q, 1H), 7.27-7.44 (m, 5H). 13C-NMR (CDCl$_3$, 100 MHz): δ=16.5, 16.6, 37.0, 37.1, 50.5, 50.7, 66.7, 127.5, 127.5, 128.0, 128.5, 128.6.

(R)-(+)-α-Methylbenzylimide (6a') of D-(+)-Malic Acid (6)

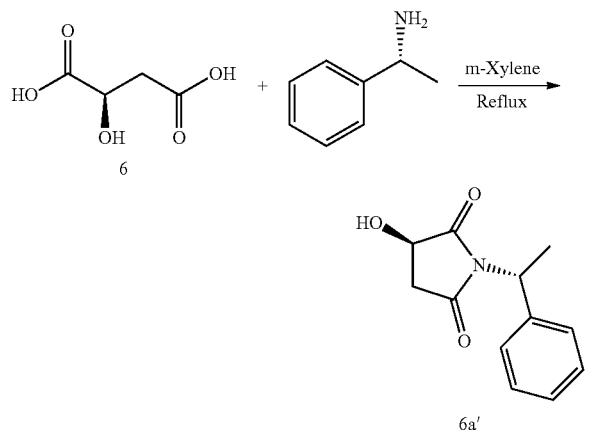

In a 100 ml recovery flask with stir bar was placed D-(+)-malic acid (1.056 g, 8.0 mmol), xylene (20 ml), and R-(+)-α-methylbenzylamine (1.089 g, 9.0 mmol). The flask was fitted with Dean Stark apparatus, reflux condenser and nitrogen inlet. The mixture was refluxed for eight hours. After which time the TLC indicated all the starting material was consumed to give a single less polar and so the mixture was cooled in an ice bath. A viscous substance insoluble in xylene appeared on cooling. The solvent was removed under vacuum and the product was absorbed on 20 cc of silica gel with 50 cc of EtOAc. The solvent was removed, and the absorbed material was placed on the top of the silica gel column made up with ethyl acetate/hexanes 1:1 to elute (solvent: ethyl acetate/hexanes 1:1). Concentration of the fractions provided a solid product which was recrystallized from isooctane (yield=0.595 g, 34%). Melting Point: 102-103° C. 1H-NMR (400 MHz): δ=1.81 (d, 3H), 2.62 (dd, 1H), 3.00 (dd, 1H), 3.26 (s, 1H, —OH) 4.47-4.51 (m, 1H), 5.40 (q, 1H), 7.27-2.34 (m, 5H). 13C-NMR (100 MHz): δ=16.6, 37.1, 50.5, 66.7, 127.5 (2×C), 128.0, 128.5 (2×C), 139.0, 173.7, 178.2.

Benzoyl Ester (6b) of 6a Made from Racemic Alpha Methylbenzylamine

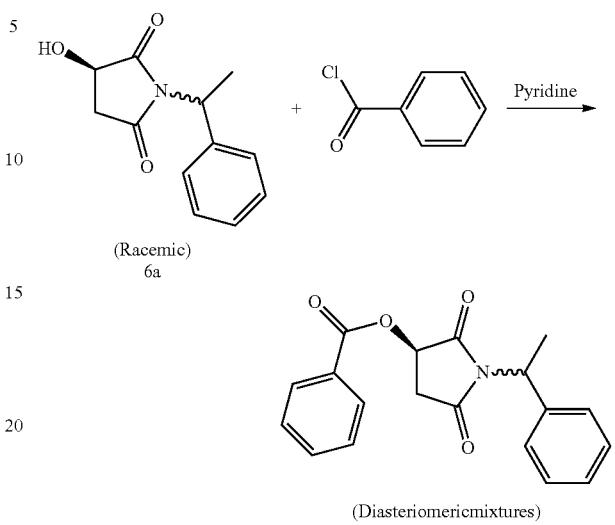

In a 100 ml recovery flask with stir bar was placed the imide (0.250 g, 1.14 mmol, dry pyridine (10 ml). The mixture was stirred under nitrogen in an ice bath until all the imide dissolved. Ice bath was removed and benzoyl chloride (0.280 g, 2.0 mmol) was added dropwise. The mixture was stirred at room temperature overnight. Thin layer chromatography indicated all the starting material consumed to give a single less polar product and so the reaction was quenched by adding ice cold water. The precipitate obtained was isolated by suction filtration, washed with water and air dried. The product was absorbed on cc of silica gel with 50 ml of ethyl acetate and the solvent was evaporated to dryness. The absorbed material was placed on the top of the silica gel column made up with ethyl acetate/hexanes 1:3 to elute (Solvent: ethyl acetate/hexanes 1:3). Concentration of the fraction provided a solid product which was recrystallized from isooctane (yield=0.243 g, 66%). Melting Point: 109-111° C. 1H-NMR (CDCl$_3$, 400 MHz): δ=1.87 (dd, 3H), 2.74-2.84 (m, 1H), 3.17-3.26 (m, 1H), 5.47-5.65 (m, 2H), 7.32-7.68 (m, 7H), 8.03-8.06 (m, 2H). 13C-NMR (CDC, 100 MHz): δ=16.6, 16.7, 35.8 (2×C), 50.8, 50.1, 67.7, 67.8, 127.6, 127.7, 128.0, 128.5, 130.0, 133.8, 139.0, 139.2, 165.5, 172.8, 173.1

S-(−)-α-Methylbenzylimide (6a") of Malic Acid (6)

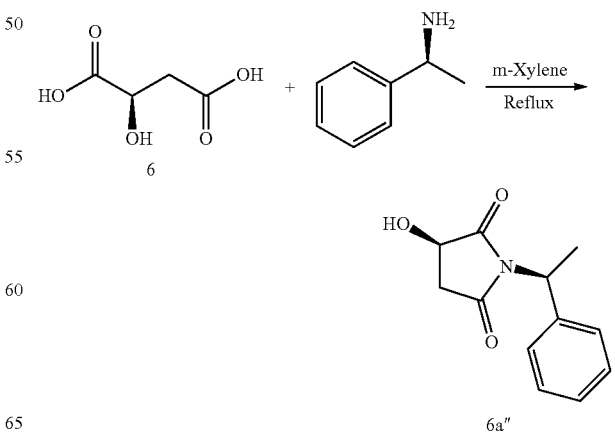

In a 200 ml recovery flask with stir bar was placed D-(+)-malic acid (2.680 g, 20.0 mmol), xylene (100 ml) and S-(-)-α-methylbenzylamine (2.662 g, 22.0 mmol). The flask was fitted with Dean Stark trap, reflux condenser and nitrogen inlet. The mixture was refluxed for eight hours and the water formed during the reaction was removed with the Dean Stark trap. Thin layer chromatography indicated all the starting material consumed to give a single less polar product. The flask was cooled in an ice bath and the precipitate obtained was isolated, washed with ether, air dried and recrystallized from 1-PrOH (yield=3.302 g, 75%). Melting Point: 179-182° C. 1H-NMR (DMSO-d6, 400 MHz): δ=1.48 (d, 3H), 2.32 (dd, 1H), 2.51 (dd, 1H), 3.87 (dd, 1H), 4.39 (q, 1H), 7.35-7.46 (m, 5H). 13C-NMR (DMSO-d6, 100 MHz): δ=21.4, 42.34, 50.4, 66.48, 127.1, 128.7, 128.8, 128.9, 129.1, 140.2, 172.8, 177.3.

p-Butylbenzoyl Ester (6c) of 6a"

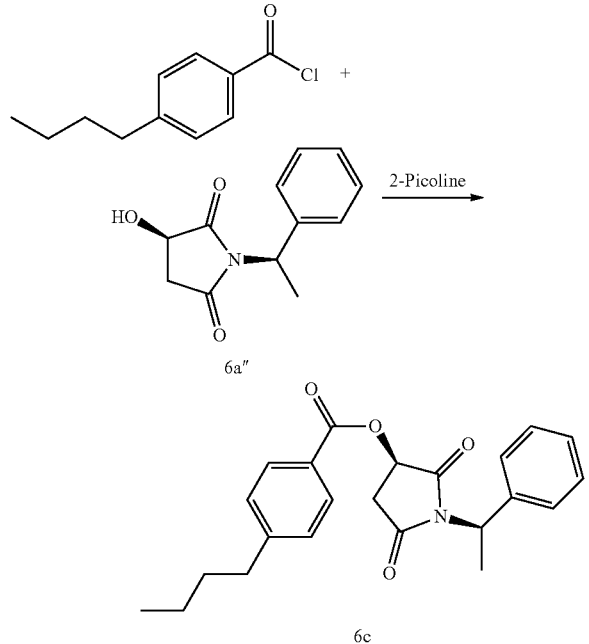

6c

In 100 ml recovery flask with stir bar was placed (S)-3-hydroxy-1-(1-phenylethyl)-pyrolidine-2,5-dione (0.329 g, 1.5 mmol), 2-picoline (10 ml) and p-n-butylbenzoyl chloride (0.393 g, 2.0 mmol). The mixture was stirred at room temperature under nitrogen atmosphere for 2 hours. After which time TLC indicated appearance of a new less polar product. Again p-n-butylbenzoyl chloride (0.196 gm, 1.0 mmol) was added and the mixture was stirred at room temperature overnight to ensure the completion of reaction. Then, ice cold water was added dropwise with stirring. The precipitate obtained was isolated by suction filtration, washed with water and air dried. The product was absorbed on cc of silica gel with 50 ml of ethyl acetate and the solvent was removed under reduced pressure. The absorbed material was placed on the top of the silica gel column made up with ethyl acetate/hexanes 1:9 to elute (solvent: ethyl acetate/hexanes 1:9 at first and then the polarity of the solvent was gradually increased up to 1:3). Concentration of the fractions provided a solid product which was recrystallized from isooctane (yield=0.080 g, 14%). Melting Point: 123-124° C. 1H-NMR (CDCl3, 100 MHz): δ=0.92 (t, 3H), 1.29-1.38 (m, 5H), 1.55-1.65 (m, 5H), 2.64 (dd, 2H), 5.30-5.37 (m, 1H), 6.32 (d, 1H), 7.21-7.70 (m, 9H). 13C-NMR (CDCl3, 400 MHz): δ=13.9, 14.1, 21.7, 22.3, 22.7, 29.4, 29.7 (2×C), 31.9, 33.4, 35.5, 49.1, 126.3, 126.9, 127.4, 128.6 (2×C), 128.7, 131.9 (2×C), 143.2, 146.9, 166.5.

Benzylimide (6d) of D-(+)-Malic Acid (6)

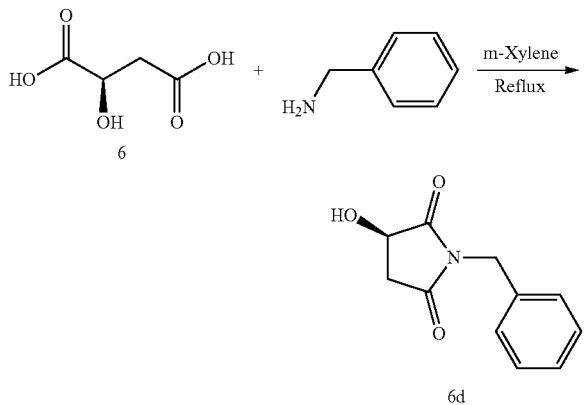

In a 200 ml recovery flask with stir bar was placed D-(+)-malic acid (3.350 g, 25.0 mmol), xylene (100 ml) and benzylamine (2.889 g, 27.0 mmol). The flask was fitted with Dean Stark trap, reflux condenser and nitrogen inlet. The mixture was refluxed for eight hours and the water formed during the reaction was removed with the Dean Stark trap. Thin layer chromatography indicated all the starting material was consumed to give a single less polar product. The flask was cooled to room temperature and then placed in house vacuum. The residue obtained was then absorbed on 15 cc of silica gel and the absorbed material was placed at the top of the silica gel column made up with ethyl acetate/hexanes 1:1 to elute (Solvent: ethyl acetate/hexanes 1:1). Concentration of the fractions provided a solid product which was recrystallized form isooctane/MeOH (yield=1.948 g, 38%). Melting Point: 102-103° C. 1H-NMR (CDCl3, 400 MHz): δ=7.29-7.41 (m, 5H), 4.63-4.72 (m, 3H), 3.05 (dd, 1H), 2.71 (dd, 1H). 13C-NMR (CDCl3, 100 MHz): δ=178.0, 173.8, 135.2, 128.9 (2×C), 128.8 (2×C), 128.2, 67.0, 42.5, 37.1.

p-Butylbenzoyl Ester (6e) Made from 6a'

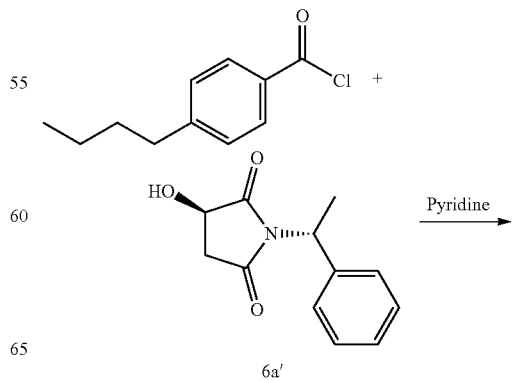

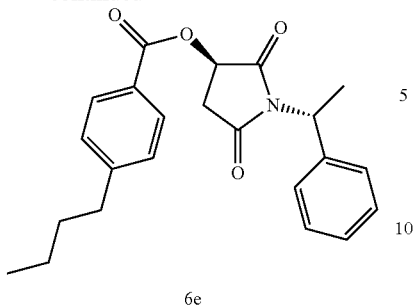

6e

In a 100 ml recovery flask with stir bar was placed 3-hydroxy-1-(1-phenylethyl)-pyrolidine-2,5-dione (0.329 g, 1.5 mmol), pyridine (10 ml) and p-n-butylbenzoyl chloride (0.393 g, 2.0 mmol). The mixture was stirred at room temperature under nitrogen atmosphere overnight. After which time thin layer chromatography indicated appearance of a new less polar product. Then, ice cold water was added dropwise with stirring. The precipitate obtained was isolated by suction filtration, washed with water and air dried. The thin layer chromatography of crude product showed two spots (one of butylbenzoyl chloride and other of new product). Then the crude product was absorbed on 15 cc of silica gel with 50 ml of ethyl acetate and the solvent was removed under reduced pressure. The absorbed material was placed on the top of the silica gel column made up with ethyl acetate/hexanes 1:9 to elute (solvent: ethyl acetate/hexanes 1:9 at first and then the polarity of the solvent was gradually increased up to 1:4). Concentration of the fractions provided a pure solid product. which was recrystallized from isooctane (yield=0.282 g, 50%). Melting Point: 67-69° C. 1H-NMR (CDCl₃, 400 MHz): δ=7.94-7.96 (m, 2H), 7.24-7.50 (m, 7H), 5.20-5.56 (m, 2H), 3.21 (dd, 1H), 2.76 (dd, 1H), 2.67 (t, 2H), 1.87 (d, 3H), 1.57-1.65 (m, 2H), 1.32-1.39 (m, 2H), 0.93 (t, 3H). 13C-NMR (CDCl₃, 100 MHz): δ=13.9, 16.6, 22.3, 33.2, 35.8 (2×C), 50.8, 67.7, 125.9, 127.7 (2×C), 128.0, 128.5 (2×C), 128.6 (2×C), 130.1 (2×C), 139.0, 149.7, 165.6, 172.9, 173.3.

p-Butylbenzoyl Ester (6f) of 6d

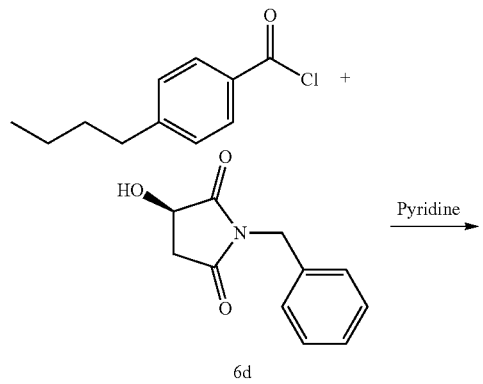

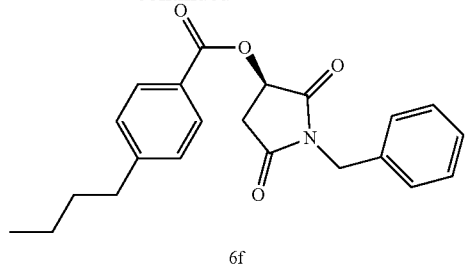

6f

In a 100 ml recovery flask with stirbar was placed 1-benzyl-3-hydroxy-pyrrolidine-2,5-dione (0.308 g, 1.5 mmol), pyridine (10 ml) and p-n-butylbenzoyl chloride (0.589 g, 2.0 mmol). The mixture was stirred at room temperature under nitrogen atmosphere overnight. Thin layer chromatography showed complete consumption of the starting material and then cold water was added dropwise with stirring to fill the flask. No precipitate was observed even after acidification and so the product was extracted with ethyl acetate (25×3 ml). Solvent was removed by rotatory evaporator and the solid product was absorbed on 15 cc of silica gel with 50 ml of ethyl acetate. Ethyl acetate was removed under reduced pressure and the absorbed material was placed on the top of the silica gel column made up with ethyl acetate/hexanes 1:9 to elute (Solvent: ethyl acetate/hexanes 1:9 and the polarity of the solvent was gradually increased up to 1:3). Concentration of the fraction provided a solid product which was recrystallized form isooctane (yield=0.440 g, 80%). Melting Point: 76-78° C. 1H-NMR (CDCl₃, 400 MHz): δ=7.94-7.96 (m, 2H), 7.25-7.44 (m, 7H), 5.64-5.67 (m, 1H), 4.71-4.79 (m, 2H), 3.27 (dd, 1H), 2.81 (dd, 1H), 2.67 (t, 2H), 1.56-1.63 (m, 2H), 1.32-1.37 (m, 2H), 0.93 (t, 3H). 13C-NMR (CDCl₃, 100 MHz): δ=173.2, 173.0, 165.6, 149.8, 135.2, 130.1 (2×C), 129.0 (2×C), 128.8 (2×C), 128.7 (2×C), 128.2, 125.8, 67.8, 42.8, 36.0, 35.8, 33.2, 22.3, 13.9.

Phenylethylimide (6g) of D-(+)-Malic Acid (6)

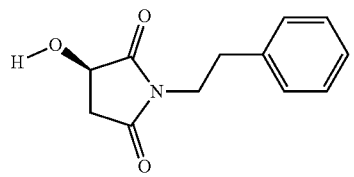

6g

In a 200 ml recovery flask with stirbar was placed D-(+)-malic acid (3.35 g, 25.0 mmol), m-xylene (75 ml) and phenethylamine (3.03 g, 25.0 mmol). The flask was fitted with a solvent stripper, condenser and nitrogen inlet and the stripper was filled with xylene (~25 ml). The mixture was gradually warmed to reflux, kept at this temperature overnight and then xylene was removed (~50 ml). The mixture was cooled with stirring and toluene (20 ml) was added. The mixture was stirred in an ice bath; the solid was isolated by suction filtration, washed with cold toluene and air dried. Yield 4.26 gm (78%). Melting point: 131-133° C. 1H-NMR (CDCl₃, 400 MHz): δ=2.62 (dd, 1H), 2.89 (t, 2H), 3.01 (dd, 1H), 3.75 (t, 2H), 4.54 (dd, 1H), 7.18-7.35 (m, 5H). 13C-NMR (CDCl₃, 100 MHz): δ=178.1, 173.8, 137.4, 128.8, 128.6, 126.8, 66.8, 40.0, 37.1, 33.4.

Benzoyl Ester (6h) of 6g

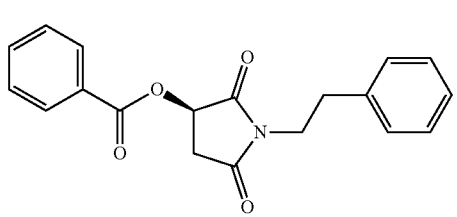

6h

In a 100 ml recovery flask was placed the imide (1.08 g, 5.0 mmol) and dry pyridine. The mixture was stirred under nitrogen until all was dissolved and then it was chilled in an ice bath. Benzoyl chloride (0.84 g, 6.0 mmol) was added dropwise and the mixture was stirred and allowed to warm to room temperature overnight. The next day the mixture was chilled in an ice bath and water was added dropwise with stirring to fill the flask. The resulting solid was collected by suction filtration, washed with water and air dried. This product was taken up in boiling 1-propanol, filtered through fluted filter paper and the filtrate was allowed to cool. The product appeared as tiny needles and was collected by suction filtration, washed with cold 1-propanol and air dried. Yield 1.28 g, 79%. Melting point: 145-146° C. 1H-NMR (CDC, 400 MHz): δ=2.74 (dd, 1H), 2.96 (ddd, 2H), 3.21 (dd, 1H), 3.84 (ddd, 2H), 5.58 (dd, 1H), 7.22-7.65 (m, 8H), 8.05 (d, 2H). 13C-NMR (CDCl$_3$, 100 MHz): δ=33.3, 35.8, 40.2, 67.9, 126.8, 128.5, 128.6, 128.8, 130.0, 133.9, 137.5, 165.5, 173.0, 173.2.

p-Trifluoromethylbenzoyl Ester (6i) of 6g

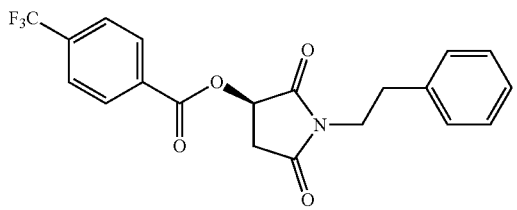

6i

In a 100 ml recovery flask was placed the imide (1.08 g, 5.0 mmol) and dry pyridine. The mixture was stirred under nitrogen until all was dissolved and then it was chilled in an ice bath. Next, 4-trifluoromethylbenzoyl chloride (1.250 g, 6.0 mmol) was added dropwise and the mixture was stirred briefly in the ice bath and for five hours at room temperature. Water (8 drops) was added and the mixture was stirred at room temperature for an hour and then water was added dropwise to fill the flask. The resulting solid was collected by suction filtration, washed with water and air dried. This was recrystallized from 1-propanol, to give the product appeared as a white solid. Yield 1.51 g, 77%. Melting point: 128-129° C. 1H-NMR (CDCl$_3$, 400 MHz): δ=2.75 (dd, 1H), 2.97 (ddd, 2H), 3.23 (dd, 1H), 3.85 (ddd, 2H), 5.60 (dd, 1H), 7.22-7.33 (m, 5H), 7.73 (d, 2H), 8.15 (d, 2H). 13C-NMR (CDCl$_3$, 100 MHz): δ=33.3, 35.7, 68.2, 125.6, 125.7, 126.9, 128.6 (2×C), 128.9 (2×C), 130.5 (2×C), 131.7, 135.5, 137.3, 164.3, 172.7, 172.8.

p-Methoxy-Anilide (6j) of Malic Acid (6)

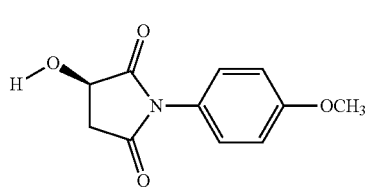

6j

In a 200 ml recovery flask with stirbar was placed D-(+)-malic acid (3.350 g, 25.0 mmol), m-xylene (75 ml) and p-anisidine (3.210 g, 26.1 mmol). The flask was fitted with a solvent stripper condenser and nitrogen inlet. The mixture was gradually warmed to reflux in an oil bath and reflux was maintained over four hours. During this time xylene and water was removed in increments leaving only xylene (~30 ml). The mixture was cooled, and the remaining xylene was removed under house vacuum overnight. Isopropanol (100 ml) was added to the solid residue and the mixture was boiled and stirred and then allowed to cool gradually to room temperature and then finally was stirred in an ice bath. The grey precipitate was isolated by suction filtration, washed with some cold isopropanol and air-dried. Yield: 4.40 g, 80%. Melting point: 175-178° C. 1H-NMR (DMSO-d6, 400 MHz): δ=2.60 (dd, 1H), 3.11 (dd, 1H), 3.79 (s, 3H), 6.18 (dd, 1H), 7.10 (dd, 4H). 13C-NMR (DMSO-d6, 100 MHz): δ=38.4, 55.8, 66.9, 114.6, 121.0, 121.6, 125.3, 128.6, 159.3, 174.7, 178.1.

N-Butyl-Malic Imide (6k)

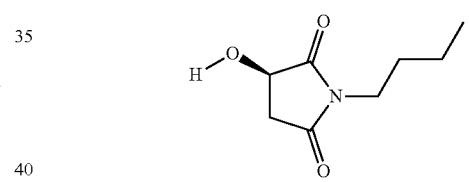

6k

In a 200 ml recovery flask with stirbar was placed D-(+)-malic acid (5.360 g, 40.0 mmol), m-xylene (50 ml) and 1-aminobutane (2.940 g, 25.0 mmol). The flask was fitted with a solvent stripper, condenser and nitrogen inlet and the stripper was filled with xylene (~25 ml). The mixture was gradually warmed to reflux (since the amine is relatively volatile the reaction was not immediately set up to run at full boil). After the first hour of reflux water and xylene was removed (50 ml) in increments over the next four hours. The resulting mixture was cooled to room temperature and the remaining solvent was removed under house vacuum overnight. 1H-NMR (CDCl$_3$, 400 MHz): δ=0.943 (t, 3H), 1.34 (m, 2H). 1.57 (m, 2H), 2.69 (dd, 1H), 3.07 (dd, 1H), 3.53 (t, 2H), 4.65 (dd, 1H). 13C-NMR (CDCl$_3$, 100 MHz): δ=13.6, 20.0, 29.6, 37.1, 38.8, 66.9, 174.2, 178.1.

Nootkatone (8) from Valencene (7)

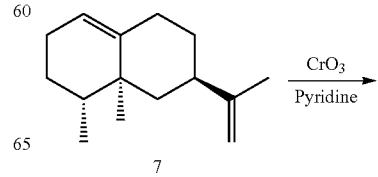

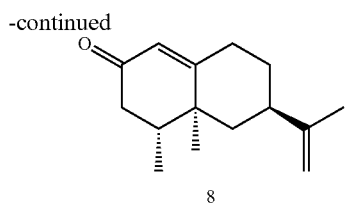

8

A 250 ml round bottom flask containing dry pyridine (50 ml) was cooled to (~15° C.) in an ice-salt bath under a nitrogen atmosphere. Next, $CrO_3$ (4.74 g, 30.0 mmol) was added over a period of 5 min, through a glassine paper cone inserted in the neck of the flask. Stirring was continued for 6 hr, during which time no further ice was added to the bath. The initially formed bright yellow viscous mixture gradually turned into a bright red, crystalline slurry. Next, valencene (4.0 g, 20.0 mmol) was added to the mixture at room temperature. After stirring for 25 hr mixture became a dark red colored oil. The reaction was checked by GC-MS and a product peak at 218.0 was obtained. The reaction was terminated, and the solvent was evaporated under vacuum. Separation was done with a silica gel column made up with 90% of hexanes and 10% of ethyl acetate and eluted with a gradient up to 25% ethyl acetate. A yellow oil was obtained after evaporation of the fractions containing the product. There were some impurities in the final product when checked with TLC. Another separation was done with a silica gel column made up with 90% of hexanes and 5% of ethyl acetate to give the product as a yellow oil. Yield=1.41 gm (44%). Product is: 4-α,5-dimethyl-1,2,3,4,4α,5,6,7-octahydro-7-keto-3-isopropenylnaphthalene. $^1$HNMR (400 MHz, $CDCl_3$) δ 0.990 (3H, d), 1.134 (3H, s), 1.356 (2H, ddt), 1.753 (3H, s), 2.000 (2H, dddd), 2.268 (1H, dddd), 2.351 (2H, dd), 2.406 (1H, dt), 2.561 (2H, ddt), 4.760 (2H, d), 5.785 (1H, s). $^{13}$CNMR (400 MHz, $CDCl_3$) δ 16.3, 20.6, 30.1, 31.5, 35.8, 38.3, 40.7, 41.9, 110.0, 123.9, 147.9, 168.6, 197.5. GC-Ms-218.2

2-(4-Butylbenzoyloxy)Valencene (7a) from 7

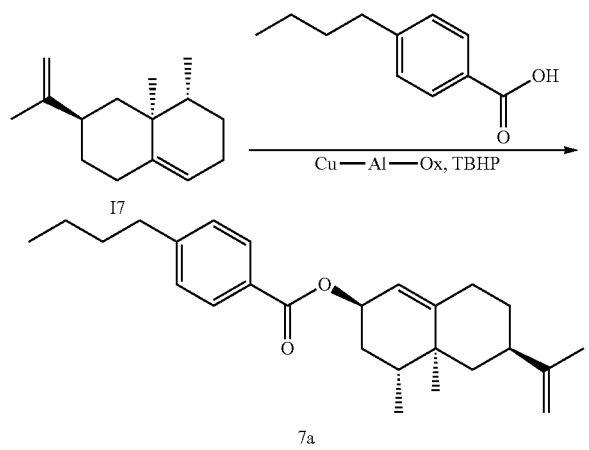

In a 100 ml round bottom flask Cu—Al-Ox (30 mg) was dissolved in acetonitrile (2 ml) under the open atmosphere. Next p-n-butylbenzoic acid (0.83 g, 5.0 mmol) was added to the system and the mixture was stirred for 10 minutes to dissolve the acid. Next valencene (1.02 g, 5.0 mmol) and TBHP (0.13 g, 1.5 eq) were added. The reaction mixture was stirred at 82° C. for 24 hr. After 24 hrs mixture was checked with TLC and there were two new products with some starting material. Then more valencene (0.51 g, 2.5 mmol) and TBHP (0.064 g, 0.75 eq) were added and the reaction was run for another 12 hr. After this time the reaction mixture was checked with TLC and there was some starting material present in the mixture and again it was stirred for another 6 hrs. After 12 hrs mixture was checked with TLC and same amount of starting material was present in the mixture. The reaction was terminated. Saturated aq $Na_2SO_3$ solution (5 ml) was added and solution mixture was extracted with ethyl acetate and washed with saturated EDTA solution (5 ml) and dried over anhydrous $Na_2SO_4$. Then mixture was filtered through silica and solvent was removed using rotary evaporation. Separation was done with a silica gel column made up with 95% of hexanes and 5% of ethyl acetate. There were some impurities due to hexane. Anther separation was done with a silica gel column made up with 100% pure hexane. A colorless oil product was obtained. For further discussion see García-Cabeza, A. L.; Marín-Barrios, R.; Moreno-Dorado, F. J.; Ortega, M. J.; Massanet, G. M.; Guerra, F. M. Allylic Oxidation of Alkenes Catalyzed by a Copper-Aluminum Mixed Oxide. Org. Lett. 2014, 16 (6), 1598-1601.

Yield—0.264 g (14.0%). $^1$HNMR (400 MHz, $CDCl_3$) δ 0.89 (3H, t), 0.96 (3H, d), 1.13 (3H, s), 1.76 (3H, s), 2.70 (H, t), 4.76 (2H, d), 5.33 (1H, d), 5.61 (H, ddd), 7.28 (2H, ddd), 8.01 (2H, ddd). $^{13}$CNMR (400 MHz, $CDCl_3$) δ 13.8, 15.6, 18.4, 20.8, 22.3, 25.9, 27.1, 32.7, 33.1, 33.2, 35.6, 35.7, 40.9, 41.0, 44.9, 68.2, 108.2, 109.2, 120.1, 128.5, 129.6, 130.2, 149.3, 171.6.

2-(4-Butyloxybenzoyloxy)Valencene (7b) from 7

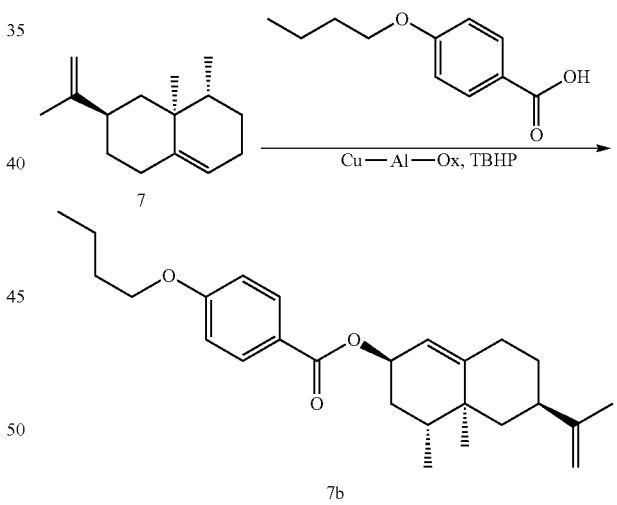

In a 100 ml round bottom flask Cu—Al-Ox (300 mg) was dissolved in acetonitrile (20 ml) under the open atmosphere. Next, p-n-butoxybenzoic acid (0.97 g, 5.0 mmol) was added to the system and the mixture was stirred for 10 minutes to dissolve the acid. Next valencene (1.02 g, 5.0 mmol) and TBHP (0.675 g, 1.5 eq) were added. The reaction mixture was stirred at 820 for 24 hr. After 24 hr the mixture was checked with TLC and there were two new products with some starting material. Then valencene (0.102 g, 0.1 mmol) and TBHP (0.067 g, 0.1 eq) were added and kept running continuously for another 24 hr. After 24 hrs reaction mixture was checked with TLC and there was some starting material present in the mixture and again valencene (0.102 g, 0.1 mmol), TBHP (0.067 g, 0.1 eq) and Cu—Al-Ox (30 mg) were added with acetonitrile (2 ml). After 24 hrs the mixture was checked with TLC and the same amount of starting material was present in the mixture. The reaction was terminated by addition of aq Na$_2$SO$_3$ solution (10 ml) and the mixture was extracted with ethyl acetate and washed with saturated EDTA solution (5 ml) and dried over anhydrous Na$_2$SO$_4$. The mixture was filtered through silica and the solvent was removed by rotary evaporation. Separation was done with a silica gel column made up with 95% of hexanes and 5% of ethyl acetate but NMR indicated impurities mostly in the δ 1.0-2.5 region. Another separation was done with a silica gel column made up with 98% of pure hexanes and 2% of ethyl acetate. A colorless oil product was observed. Yield—0.09 g (4.5%). $^1$HNMR (400 MHz, CDCl$_3$) δ 0.90 (3H, t), 0.97 (3H, d), 1.14 (3H, s), 1.76 (3H, s), 4.02 (2H, t), 4.73 (2H, d), 5.36 (1H, d), 5.63 (H, ddd), 6.92 (2H, ddd), 8.01 (2H, ddd). $^{13}$CNMR (400 MHz, CDCl$_3$) δ 13.8, 16.3, 19.3, 20.6, 20.8, 30.2, 31.1, 31.7, 35.2, 36.0, 38.4, 38.6, 40.8, 67.8, 68.9, 110.0, 114.4, 114.4, 120.0, 122.1, 132.0, 132.0, 148.1, 152.3, 160.5, 165.6.

2-(4-Methoxybenzoyloxy) Valencene (7c) from 7

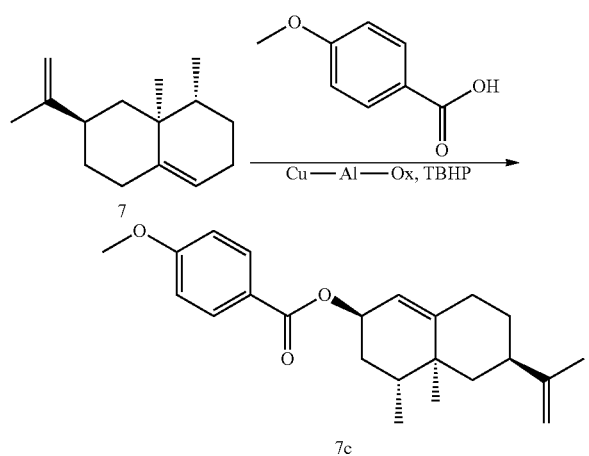

In a 100 ml round bottom flask Cu—Al-Ox (300 mg) was dissolved in acetonitrile (20 ml) under open atmosphere. Anisic acid (0.83 g, 5.0 mmol) was added to the system and the mixture was stirred for 10 minutes to dissolve the anisic acid. Next valencene (1.53 g, 5.0 mmol) and TBHP (0.739 g, 1.5 eq) were added. The reaction mixture was stirred at 820 for 24 hr. After 36 hrs the mixture was checked with TLC and there were two new products with some starting material. Based on previous experience the reaction was terminated. Saturated aq Na$_2$SO$_3$ solution (5 ml) was added and the mixture was extracted with ethyl acetate and washed with saturated EDTA solution (5 ml) and dried over anhydrous Na$_2$SO$_4$. Then mixture was filtered through silica and solvent was removed by rotary evaporation. Separation was done with a silica gel column made up with 95% of hexanes and 5% of ethyl acetate. Upon evaporation of the solvent a colorless oil was obtained. Another column was run with a silica gel column made up with 95% of pure hexane and 5% of ethyl acetate. Yield—0.433 g (24.4%). $^1$HNMR (400 MHz, CDCl$_3$) δ 0.91 (3H, d), 0.97 (3H, s), 1.58 (10H, dddd), 1.73 (2H, ddd), 1.95 (1H, ddd), 3.88 (3H, s), 4.73 (2H, s), 5.36 (1H, d), 5.59 (1H, ddd), 6.93 (2H, ddd) 8.03 (2H, dd). $^{13}$CNMR (400 MHz, CDCl$_3$) δ 16.8, 18.1, 20.8, 32.7, 33.1, 35.8, 40.5, 44.4, 55.4, 68.0, 108.6, 113.4, 117.9, 120.3, 123.5, 131.6, 150.1, 150.7, 163.1, 166.0.

Malononitrile Adduct 8a from Nootkatone 8

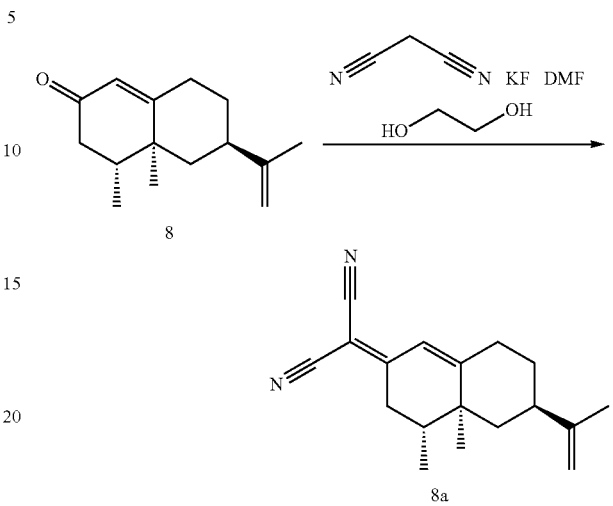

In a 100 ml round bottom flask, nootkatone (0.5 g, 2.2 mmol), malononitrile (1.5 g, 22.7 mmol), anhydrous potassium fluoride (0.4 g, 6.8 mmol) and ethylene glycol (8 ml) in DMF were dissolved and stirred for 3 hrs. After that time reaction mixture was checked with TLC and there were two new products with some starting materials. Reaction mixture was stirred for another two hrs. After two hours, no starting material remained, and the reaction was terminated. The mixture was extracted with water and ethyl acetate to give a bright red crude product. Separation is performed with a silica gel column made up with 95% of hexanes and 5% of ethyl acetate and a yellow oil was obtained as product. Yield—0.34 g (50.6%). $^1$HNMR (400 MHz, CDCl$_3$) δ 1.02, 1.04 (3H, d), 1.09 (3H, s), 1.28 (3H, s), 1.586 (H, dd), 1.73 (1H, dddd), 1.76 (1H, dddd), 2.01 (H, dd), 2.356 (1H, dddd), 2.41 (1H, qdd), 2.57 (H, dd) 2.82 (H, dd), 4.74 (1H, d), 4.78 (1H, d), 6.527 (1H, s). $^{13}$CNMR (400 MHz, CDCl$_3$) δ 16.8, 18.1, 20.8, 32.7, 33.1, 35.8, 40.5, 44.4, 55.4, 68.0, 108.6, 113.4, 117.9, 120.3, 123.5, 131.6, 150.1, 150.7, 163.1, 166.0

Synthesized materials were evaluated in LC formulations for optical and physical properties relevant to agile optical filter applications. Important material properties for this project are described herein. Among those listed, helical pitch is used as a screening parameter to determine if a liquid crystal formulation is suitable for further property testing. If the helical pitch passes (i.e. is measured to be within the visible wavelength region) a preliminary screening, additional relevant properties will be chosen for further evaluation.

Host Materials

Figure 3:
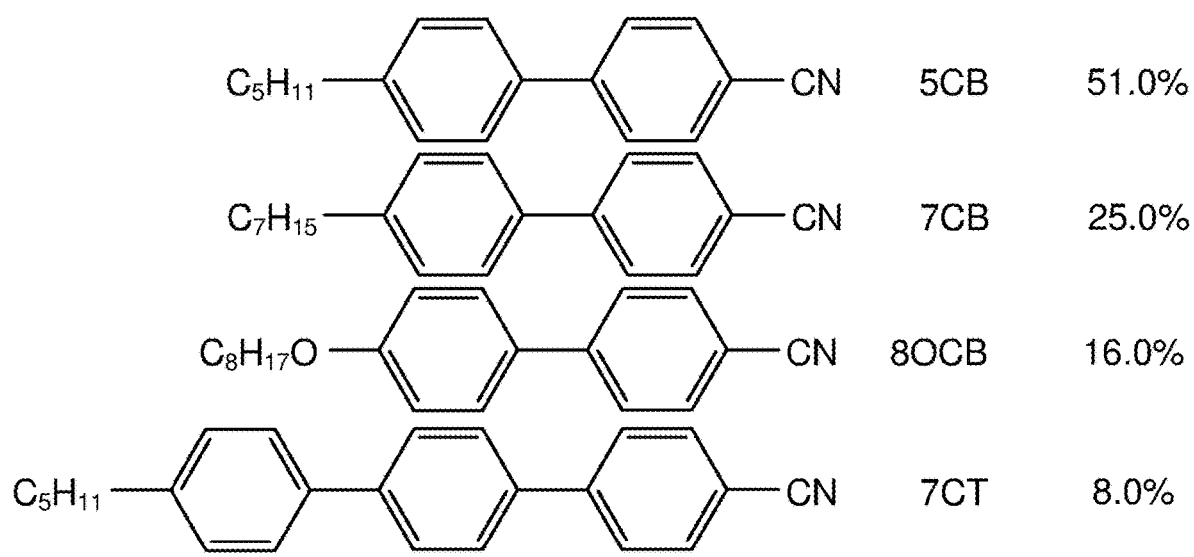
FIG. 3 depicts the constituents for nematic mixture E7.

Two nematic host materials for the evaluation of the biotarget derivatives were used: the pure nematic 5CB and the commercial nematic mixture E7, shown below. The first is 5CB, a pure material, 4-cyano-4'-pentylbiphenyl. 5CB is a commonly used nematic with chemical formula C18H19N. Its nematic temperature range is 18° C. to 35° C. The second is E7, a commercial mixture containing cyanobiphenyl and cyanoterphenyl components. Its composition is shown in FIG. 3. Its nematic temperature range is −10° C. to 60° C. The bioreachable derivatives synthesized above were mixed as chiral dopants (twist agents) with these nematic host materials at various concentrations. These cholesteric liquid crystal formulations were screened for their pitch and helical twisting power, aiming to obtain a system with a pitch in the visible wavelength region.

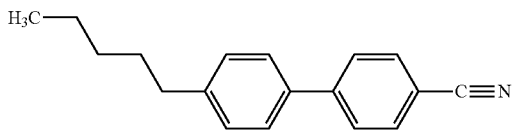

Betulin 4-Butylbenzoic Acid Diester (5o)

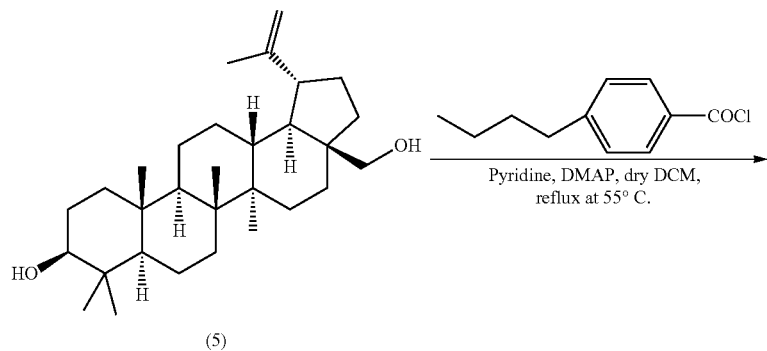

(5)

In a 100 ml recovery flask with stir bar was placed betulin (0.443 g, 1.0 mmol), dry dichloromethane (10 ml), p-n-butylbenzoyl chloride (0.558 g, 3.0 mmol), pyridine (10 ml) and 4-dimethylaminopyridine (0.366 g, 3.0 mmol). The mixture was protected under nitrogen atmosphere and warmed at 55° C. for five hours. After this time thin layer chromatography indicated the formation of two new products. Additional pyridine (3.0 ml), 4-dimethylaminopyridine (0.122 g, 1.0 mmol) and p-n-butylbenzoyl chloride (0.392 g, 2.0 mmol) was added and the mixture was left stirring at 55° C. overnight. After this time, thin layer chromatography indicated the complete consumption of the starting material to give single less polar product. Then cold water (50 ml) and 10% HCl (5 ml) was added dropwise with stirring. The product was extracted with ethyl acetate (3×25 ml), washed with water and dried over anhydrous $MgSO_4$. Solvent was evaporated and the liquid obtained was absorbed on 20 cc of silica gel with 50 ml of ethyl acetate. After concentration to dryness, the absorbed material was placed at the top of the silica gel column made up with ethyl acetate/hexanes 1:9 to elute (solvent: ethyl acetate/hexanes 1:9). Concentration of the fractions provided a solid product which was recrystallized from 1-PrOH/$H_2O$ (yield=0.410 g, 54%). Melting

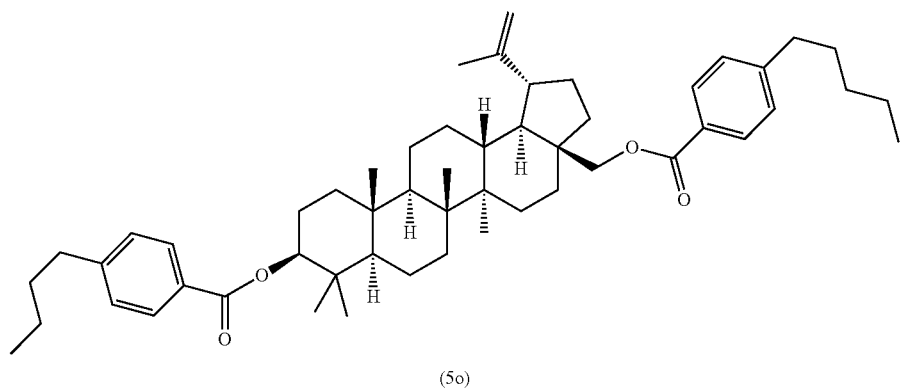

(5o)

Point: 69-71° C. 1H-NMR (CDCl$_3$, 400 MHz): δ=7.93-7.97 (m, 4H), 7.23-7.26 (m, 4H), 2.68-4.72 (m, 2H), 4.61-4.62 (m, 1H), 4.51 (d, J=10.8 Hz, 1H), 4.07 (d, J=11.0 Hz, 1H), 2.63-2.68 (m, 4H), 2.50-2.57 (m, 1H), 1.72 (s, 3H), 1.08 (s, 3H), 1.02 (s, 3H), 0.99 (s, 3H). 13C-NMR (CDCl$_3$, 100 MHz): δ=167.1, 166.4, 150.2, 148.5, 148.3, 129.6, 129.6, 128.5, 128.4, 128.4, 127.9, 109.9, 81.3, 63.1, 55.5, 50.3, 48.9, 47.8, 46.7, 42.8, 40.9, 38.4, 38.2, 37.7, 37.1, 35.7, 34.8, 34.1, 33.3, 30.0, 29.7, 29.7, 29.6, 28.1, 27.1, 25.2, 23.8, 22.3, 20.8, 19.2, 18.2, 16.8, 16.2, 16.1, 14.8, 13.9. IR (cm$^1$): 2926, 2868, 1714, 1610, 1455, 1269, 1176, 1105, 971

Betulin 4-Heptylbenzoic Acid Diester (5p)

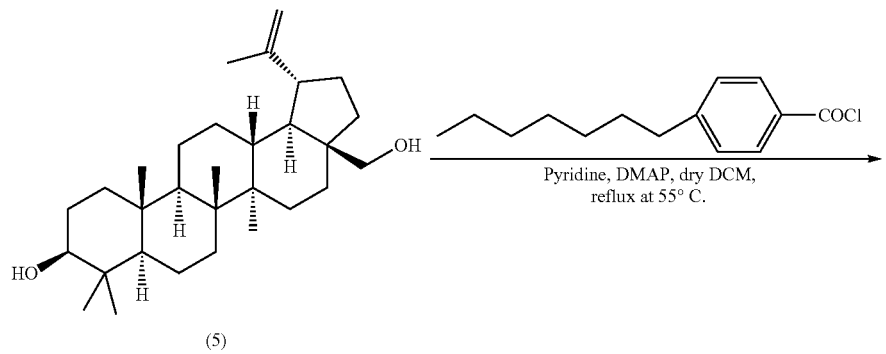

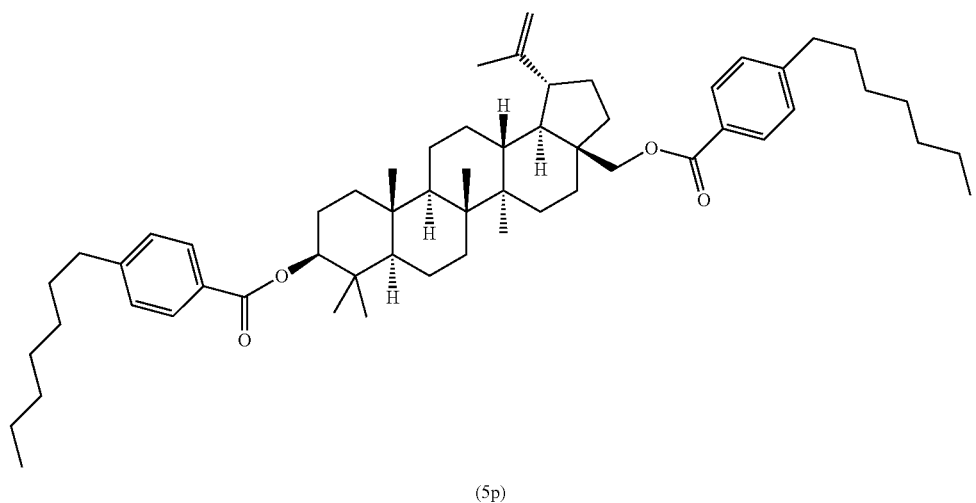

In a 200 ml recovery flask with stir bar was placed betulin (2.215 g, 5.0 mmol), dry dichloromethane (25 ml), p-n-heptylbenzoyl chloride (4.780 g, 20.0 mmol), pyridine (25 ml) and 4-dimethylaminopyridine (1.830 g, 15.0 mmol). The mixture was protected under nitrogen atmosphere and warmed at 55° C. overnight. After this time, thin layer chromatography indicated complete consumption of betulin to give single less polar product along with some unreacted acid chloride. Then cold water (50 ml) followed by hydrazine solution (10% v/v, 10 ml) was added dropwise and the mixture was stirred at room temperature for another 25 minutes to remove excess acid chloride from the mixture. The product was extracted with ethyl acetate (3×25 ml), washed with water and dried over anhydrous $MgSO_4$. Solvent was evaporated and the liquid obtained was absorbed on 30 cc of silica gel with 50 ml of ethyl acetate. After concentration to dryness, the absorbed material was placed at the top of the silica gel column made up with ethyl acetate/hexanes 1:9 to elute (solvent: ethyl acetate/hexanes 1:9). Concentration of fractions containing product provided a viscous liquid which was shown to be pure by 1H-NMR. Yield=3.758 g, 89%. 1H-NMR (CDCl$_3$, 400 MHz): δ=7.93-7.97 (m, 4H), 7.22-7.26 (m, 4H), 4.61-4.70 (m, 2H), 4.51 (d, J=10.8 Hz, 1H), 4.31 (t, J=6.6 Hz, 1H), 4.07 (d, J=11.2 Hz, 1H), 2.63-2.68 (m, 4H), 2.49-2.56 (m, 1H), 1.56 (s, 3H), 1.08 (s, 3H), 1.02 (s, 3H), 0.99 (s, 3H). 13C-NMR (CDCl$_3$, 100 MHz): δ=167.1, 166.4, 150.2, 148.5, 148.3, 129.6, 129.6, 128.4, 128.3, 127.9, 109.9, 81.3, 64.6, 63.1, 55.5, 50.3, 48.9, 47.8, 46.7, 42.8, 41.0, 38.4, 37.7, 37.1, 36.0, 34.8, 34.2, 31.8, 31.2, 30.8, 30.3, 30.0, 29.7, 29.2, 29.1, 28.1, 27.1, 25.2, 23.8, 22.6, 20.9, 19.3, 19.2, 18.2, 16.8, 16.2, 16.1, 14.8, 14.1, 13.8. IR (cm$^1$): 2924, 2854, 1713, 1456, 1269, 1175, 1105, 1018, 970

Betulin 2-Ethylhexanoic Acid Diester (5q)

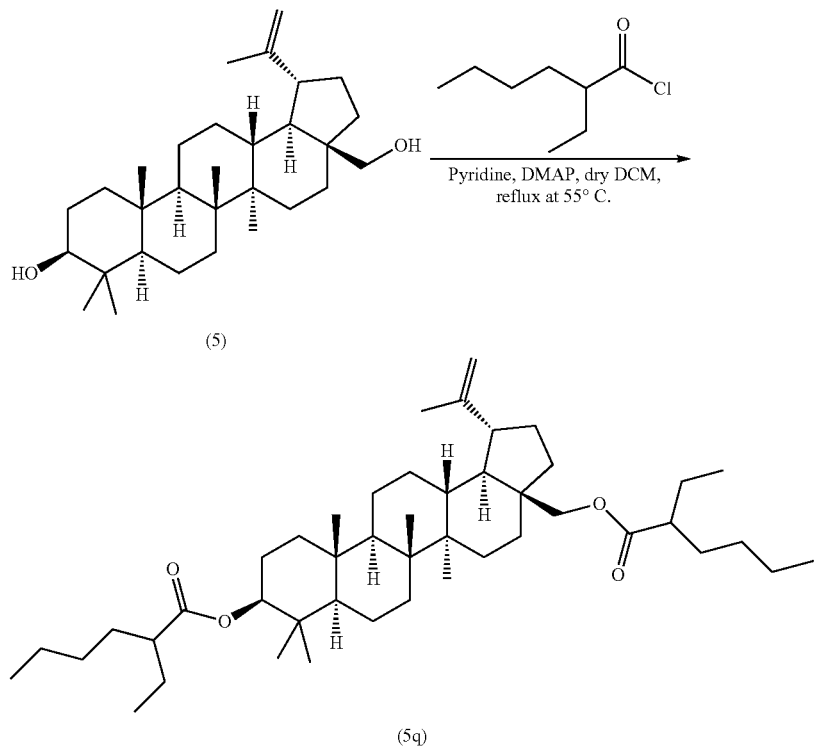

In a 100 ml recovery flask with stir bar was placed betulin (0.886 g, 2.0 mmol), dry dichloromethane (10 ml), 2-ethylhexanoyl chloride (1.134 g, 7.0 mmol), pyridine (10 ml) and 4-dimethylaminopyridine (0.366 g, 3.0 mmol). The mixture was protected under nitrogen atmosphere and warmed at 55° C. overnight. After this time TLC indicated complete consumption of the starting material to give single less polar product. Then cold water (50 ml) and 10% HCl (10 ml) was added dropwise with stirring. The product was extracted with EtOAc (3×25 ml), washed with water and dried over anhydrous MgSO$_4$. Solvent was evaporated and the liquid obtained was absorbed on 20 cc of silica gel with 50 ml of ethyl acetate. After concentration to dryness, the absorbed material was placed at the top of the silica gel column made up with ethyl acetate/hexanes 1:9 to elute (solvent: ethyl acetate/hexanes 1-9). Concentration of the fractions containing product provided a viscous liquid which was shown to be pure by 1H-NMR. Yield=1.197 gm, 86%. $^1$HNMR (CDCl$_3$, 400 MHz): δ=4.68 (d, J=1.9 Hz, 1H), 4.58-4.59 (m, 1H), 4.45-4.49 (m, 1H), 4.28 (d, J=11.1 Hz), 3.81 (d, J=11.1 Hz), 2.41-2.48 (m, 1H), 2.17-2.39 (m, 3H), 1.04 (s, 3H). 13C-NMR (CDCl$_3$, 100 MHz): δ=176.8, 176.1, 109.8, 80.4, 62.4, 55.4, 50.3, 48.8, 47.7, 47.9, 47.7, 47.6, 46.4, 42.7, 40.9, 38.3, 37.8, 37.6, 37.0, 34.7, 34.1, 32.0, 31.8, 31.6, 29.9, 29.7, 29.7, 29.6, 28.0, 27.0, 25.7, 25.5, 25.5, 25.2, 23.8, 22.6, 20.8, 19.1, 18.2, 16.6, 16.1, 16.0, 14.8, 14.1, 13.9, 11.9. IR (cm$^{-1}$): 2930, 2870, 1728, 1457, 1377, 1173, 1142, 978, 882

For HTP measurements, a flat glass plate and a cylindrical lens were cleaned and coated with polyimide. The polyimide alignment layer on both surfaces was unidirectionally rubbed with a velvet fabric. A lens was then placed on the flat glass substrate, and a small amount of the sample mixture was placed on the substrate as close to the center of the lens as possible. Capillary action then ensures that the sample liquid coats the cylindrical Cano wedge—the lens and the substrate. The director field relaxes with time, and the disclination lines form concentric circles around the symmetry axis of the lens. The resulting pattern is viewed and photographed in the polarizing microscope. The image then is analyzed via MatLab and the ring spacing is determined from the analysis. The spacing of the rings, together with the radius of the lens give the pitch P of the sample. Repeating measurements on samples with different dopant concentrations allow determination of HTP. The helical twisting power was determined and the results are summarized in Table 1 below.

TABLE 1

| Compound | HTP (1/μm) | Pitch (μm) (at wt %) |
|---|---|---|
| 1a | 7.78 | 2.5 (5.0 wt %) |
| 1e | 8.66 | 2.28 (5.1 wt %) |
| 1b | 10.9 | 14.63 (1.0 wt %) |
| 1d | 18.2 | 2.97 (1.85 wt %) |
| 1g | 14.0 | 3.57 (2.0 wt %) |
| 1f | 7.44 | 12.89 (1.8 wt %) |
| 1k | 2.58 | 22.0 (1.76 wt %) |
| 1i | 4.31 | |
| 1m' | 11.38 | |
| 1j | 9.8 | |
| 1n | 12.05 | |
| 1h | 10.34 | |
| 4a | 7.01 | 2.76 (5.1 wt %) |
| 4b | 5.37 | |
| 4c | 11.66 | |
| 4d | 2.72 | |
| 4f | 9.52 | |
| 4g | 0.68 | |
| 3b | 2.25 | |
| 3c | 1.5 | |
| 3e | 2.06 | |

TABLE 1-continued

| Compound | HTP (1/μm) | Pitch (μm) (at wt %) |
|---|---|---|
| 4b | 8.77 | 18.42 (1.0 wt %) |
| 4c | 9.88 | 1.82 (4.8 wt %) |
| 4d | 3.98 | 26.2 (0.96 wt %) |
| 4f | 8.90 | 6.23 (1.76 wt %) |
| 4g | 2.23 | 22.43 (2.0 wt %) |
| 5a | 17.0 | 2.94 (1.9 wt %) |
| 5b | 16.49 | |
| 5d | 18.8 | 2.80 (1.9 wt %) |
| 5g | 16.6 | 3.55 (1.7 wt %) |
| 5f | 27.23 | |
| 6h | 2.43 | |
| 6i | 5.96 | |
| 6b | 5.35 | |
| 6f | 7.26 | |
| 5o | 28.0 | 5.07 (1.0 wt %) |
| 5p | 24.5 | |
| 5q) | 13.8 | 6.98 (1.0 wt %) |

What is claimed is:

1. A liquid-crystalline material comprising at least one chiral dopant selected from the group consisting of the structures

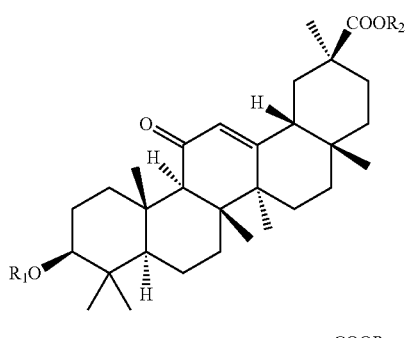

(I)

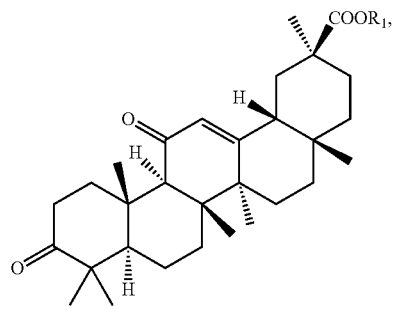

(II)

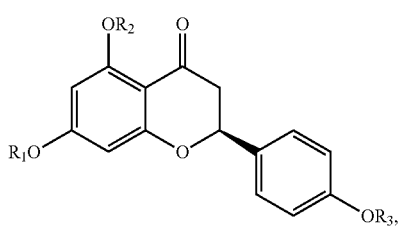

(III)

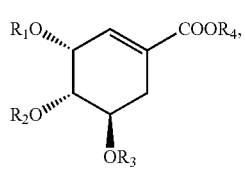

(IV)

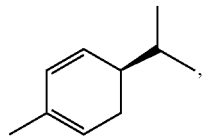

(VII)

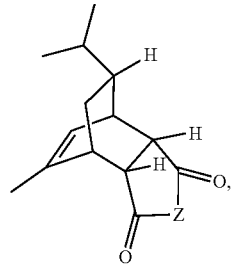

(VIII)

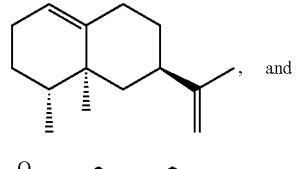

(IX)

and (X)

wherein $R_1$, $R_2$, $R_3$, and $R_4$ are each independently hydrogen, an aliphatic moiety, an aryl moiety, an arylalkylene moiety, an alkyl arylene moiety, an alkanoyl moiety, an arylalkanoyl moiety, or any halogenated derivative of the foregoing moieties, and wherein Z is selected from C(H)R$_5$, —CR$_5$=CR$_5$—, O, S, or NRs, wherein $R_5$ is independently hydrogen, an aliphatic moiety, an aryl moiety, an arylalkylene moiety, an alkyl arylene moiety, an alkanoyl moiety, an arylalkanoyl moiety, or any halogenated derivative of the foregoing moieties, and a nematic or a nematogenic substance.

2. The liquid-crystalline material according to claim 1, wherein the at least one chiral dopant is present in an amount of at least 0.001 wt %, based on the weight of the liquid-crystalline material.

3. The liquid-crystalline material according to claim 1, wherein the at least one chiral dopant is present in an amount of not greater than 20 wt %, based on the weight of the liquid-crystalline material.

4. The liquid-crystalline material according to claim 1, further comprising at least one polymerizable mesogenic compound having at least one polymerizable functional group.

5. The liquid-crystalline material according to claim 4, wherein the at least one polymerizable functional group includes an epoxy group, a vinyl group, an allyl group, an acrylate, a methacrylate, an isoprene group, an alpha-amino carboxylate, or any combination thereof.

6. The liquid-crystalline material according to claim 1, wherein the nematic or the nematogenic substance is selected from azoxybenzenes, benzylideneanilines, biphenyls, terphenyls, phenyl benzoates, cyclohexyl benzoates, phenyl esters of cyclohexanecarboxylic acid, cyclohexyl esters of cyclohexanecarboxylic acid, phenyl esters of cyclohexylbenzoic acid, cyclohexyl esters of cyclohexylbenzoic acid, phenyl esters of cyclohexylcyclohexanecarboxylic acid, cyclohexyl esters of cyclohexylcyclohexanecarboxylic acid, cyclohexylphenyl esters of benzoic acid, cyclohexylphenyl esters of cyclohexanecarboxylic acid, cyclohexylphenyl esters of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenylpyrimidines, cyclohexylpyrimidines, phenylpyridines, cyclohexylpyridines, phenylpyridazines, cyclohexylpyridazines, phenyldioxanes, cyclohexyldioxanes, phenyl-1,3-dithianes, cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, halogenated stilbenes, benzyl phenyl ether, tolanes, substituted cinnamic acids, or any combination thereof.

* * * * *